United States Patent [19]
Yoshida

[11] Patent Number: 6,082,811
[45] Date of Patent: Jul. 4, 2000

[54] REINFORCEMENT FOR VEHICLE HOLLOW STRUCTURAL MEMBER, HAVING DECREASING-THICKNESS END PORTIONS

[75] Inventor: Akio Yoshida, Toyota, Japan

[73] Assignee: Kyoho Machine Works, Ltd., Toyota, Japan; a part interest

[21] Appl. No.: 09/058,249

[22] Filed: Apr. 10, 1998

[30]     Foreign Application Priority Data

Jun. 6, 1997  [JP]  Japan .................................. 9-148792
Nov. 11, 1997 [JP]  Japan .................................. 9-309000

[51] Int. Cl.$^7$ ...................................................... B60J 7/00
[52] U.S. Cl. ........................ 296/188; 296/189; 296/146.6
[58] Field of Search ................................ 296/188, 189, 296/146.6; 49/502, 501; 52/731.6

[56]              References Cited

U.S. PATENT DOCUMENTS

| 5,124,186 | 6/1992 | Wycech ..................................... 296/146 |
| 5,203,436 | 4/1993 | Weiting et al. .......................... 296/146 |
| 5,255,487 | 10/1993 | Wieting et al. . |
| 5,277,469 | 1/1994 | Klippel .................................. 296/146.6 |

FOREIGN PATENT DOCUMENTS

| 0 479 401 | 4/1992 | European Pat. Off. . |
| 0 577 409 | 1/1994 | European Pat. Off. . |
| 43 00 897 | 7/1994 | Germany . |
| 4-238727 | 8/1992 | Japan . |
| 6-91325 | 4/1994 | Japan . |
| WO 94/13503 | 6/1994 | WIPO . |

*Primary Examiner*—D. Glenn Dayoan
*Assistant Examiner*—Lori L. Coletta
*Attorney, Agent, or Firm*—Oblon, Spivak, McClelland, Maier & Neustadt, P.C.

[57]              ABSTRACT

A vehicle hollow structural member including a hollow body portion, and a reinforcement having a hollow structure fixedly disposed within the body portion in close contact with the inner surface of the hollow body portion. The reinforcement includes a thick-walled portion as a longitudinal central portion thereof, and two decreasing-thickness portions longitudinally opposite end portions. Each decreasing-thickness portion has a wall thickness which continuously decreases in a longitudinal direction from the thick-walled portion toward the longitudinal end of the corresponding end portion of the reinforcement, such that the wall thickness at the longitudinal end is substantially zero.

15 Claims, 35 Drawing Sheets

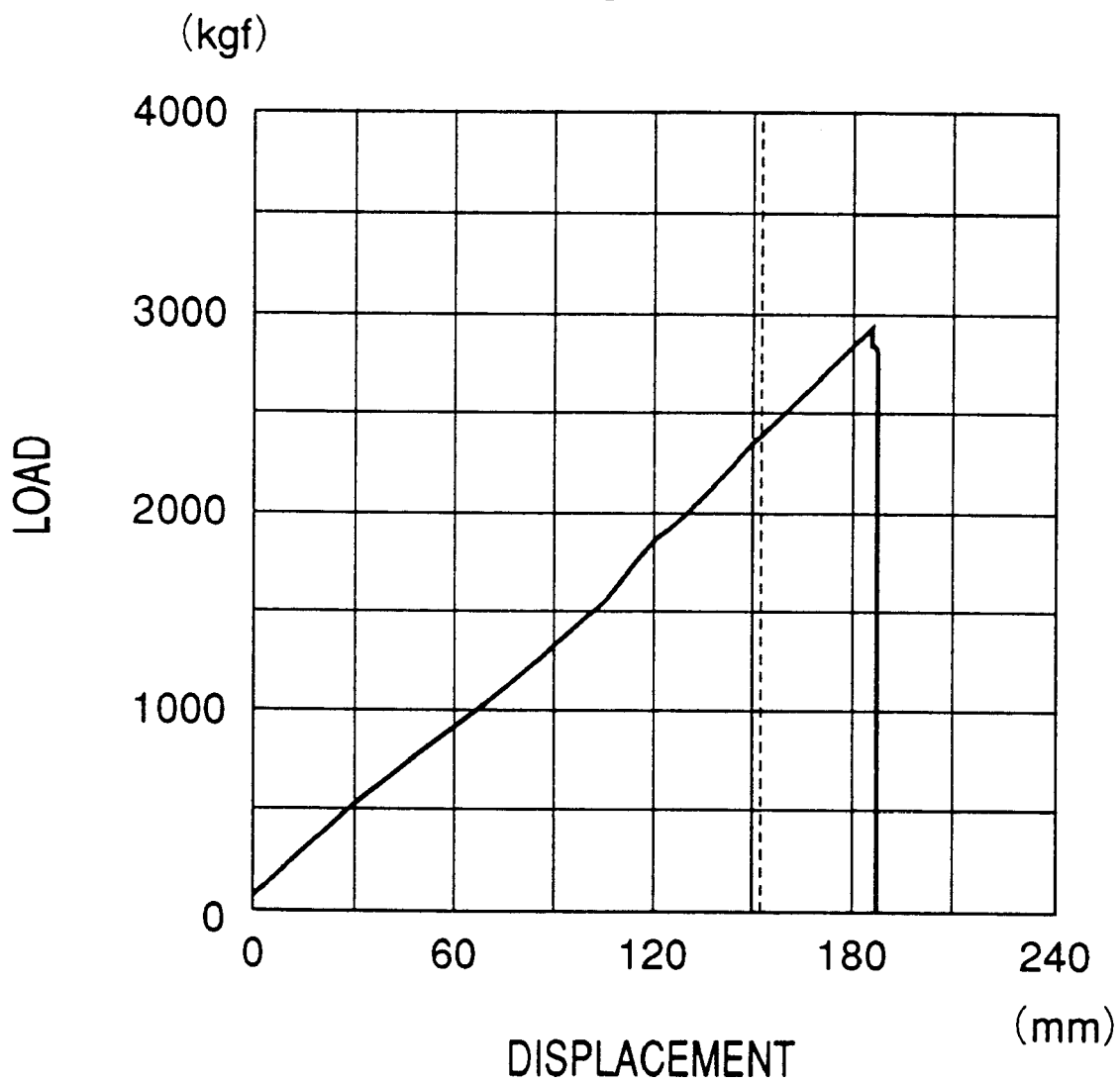

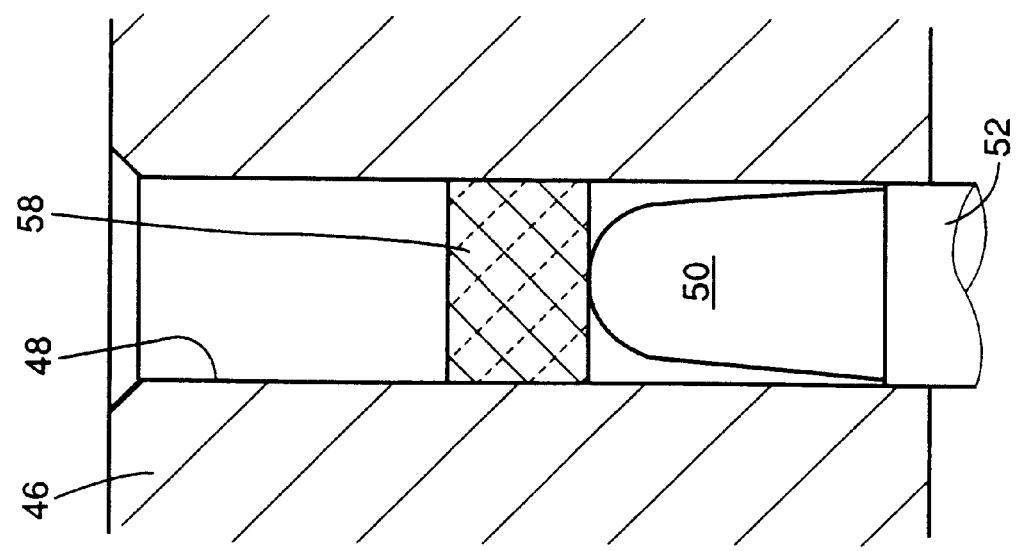
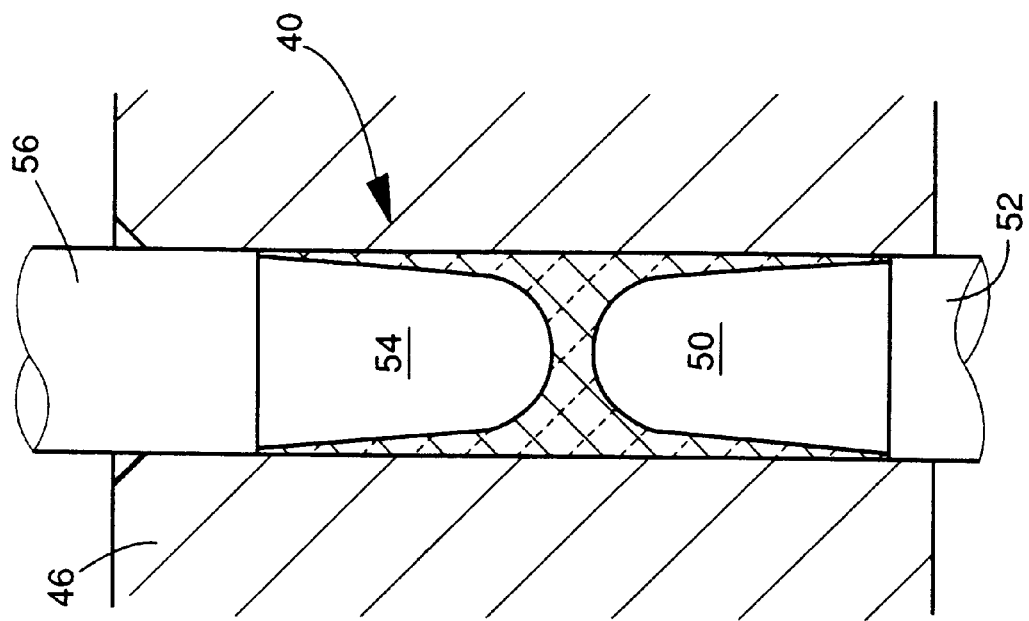
FIG. 12(a)
FIG. 12(b)

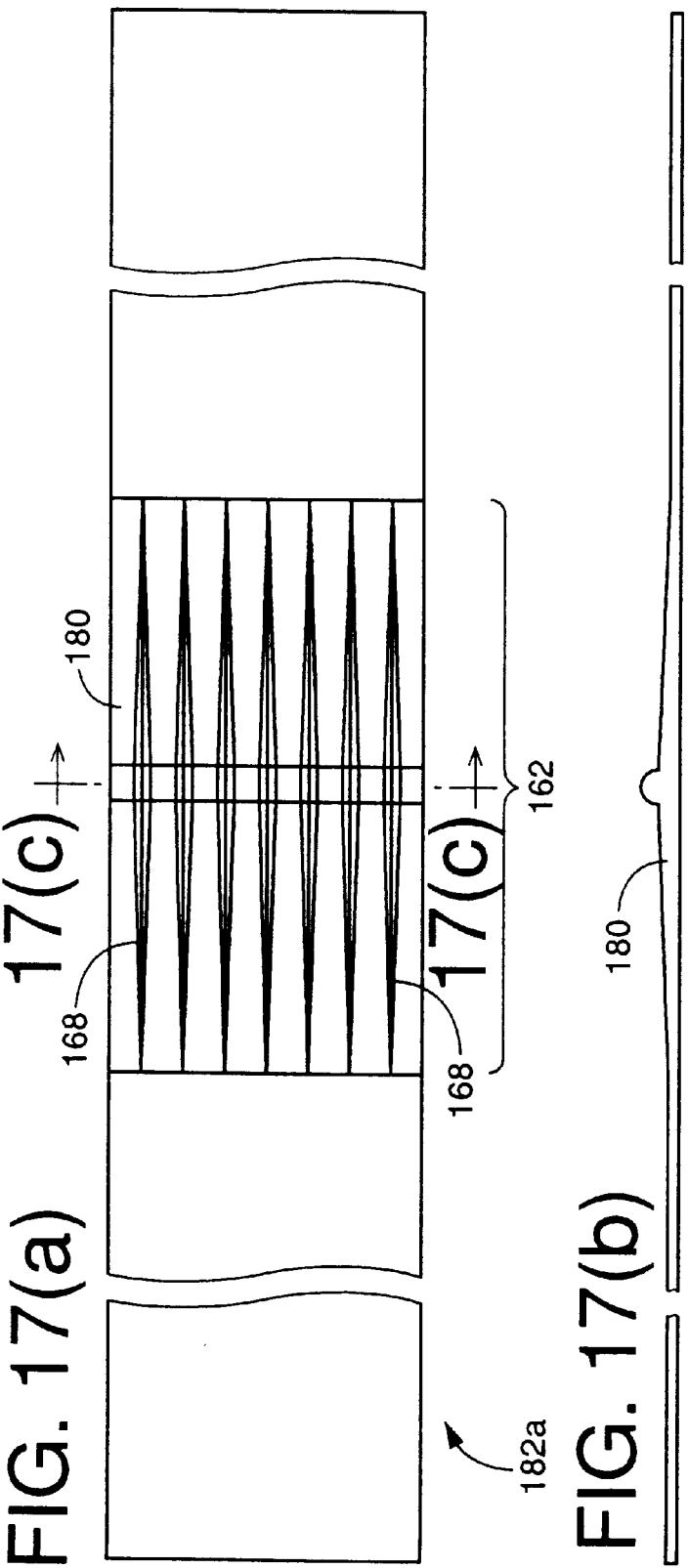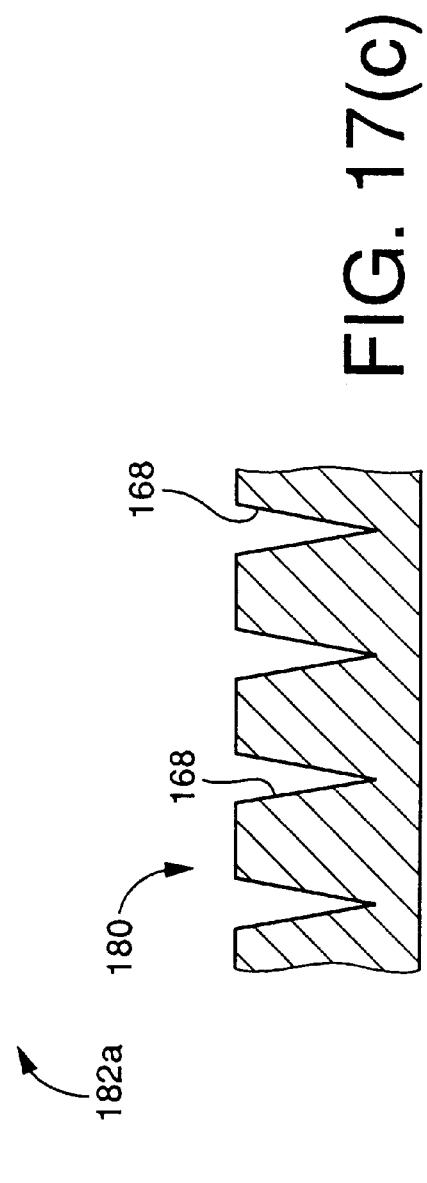
FIG. 17(a)
FIG. 17(b)
FIG. 17(c)

FIG. 24

| No. | DISPLACEMENT = 152mm || MAXIMUM DISPLACEMENT ||||
|---|---|---|---|---|---|---|
| | ABSORBED ENERGY (kgf·m) | AVERAGE LOAD (kgf) | DISPLACEMENT (mm) | ABSORBED ENERGY (kgf·m) | MAXIMUM LOAD (kgf) | AVERAGE LOAD (kgf) |
| 1 | 175.9 | 1158.0 | 202.3 | 318.7 | 3367 | 1576.9 |
| 2 | 176.2 | 1159.2 | 185.4 | 265.3 | 2944 | 1431.0 |
| 3 | 163.8 | 1077.6 | 196.7 | 276.5 | 2833 | 1405.7 |
| 4 | — | — | 143.0 | 131.9 | 1958 | 922.3 |
| 5 | — | — | 121.9 | 112.3 | 1876 | 921.2 |

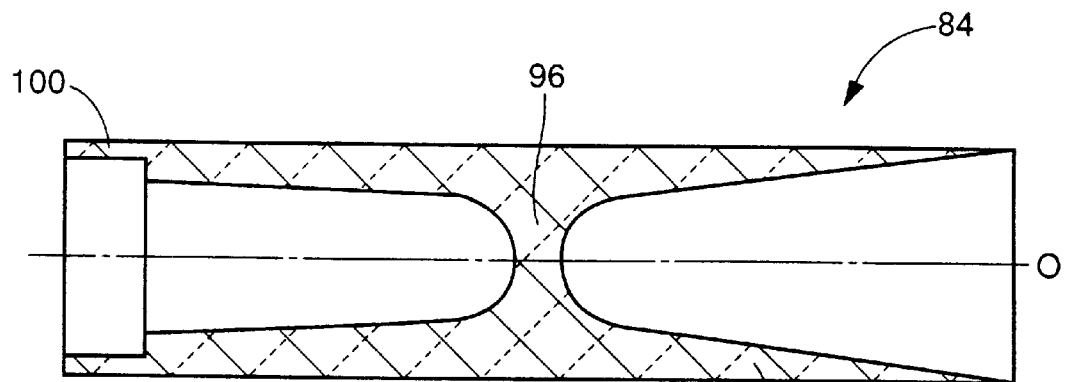
FIG. 27
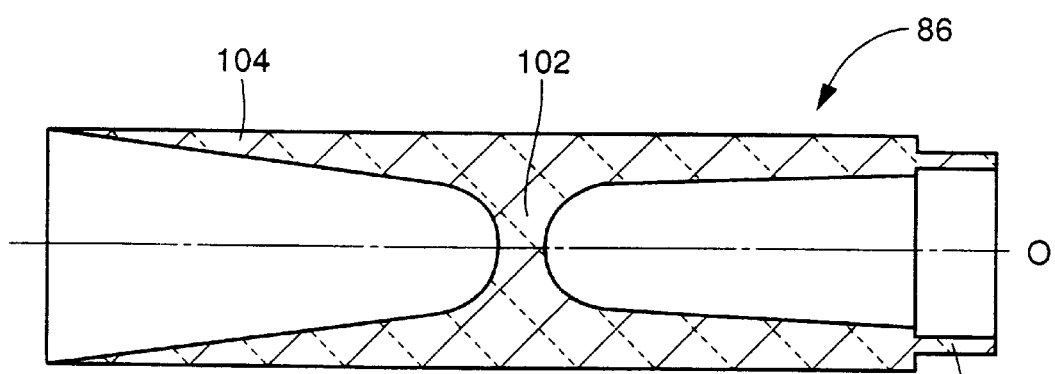
FIG. 28
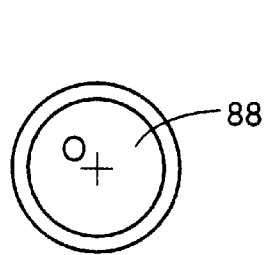 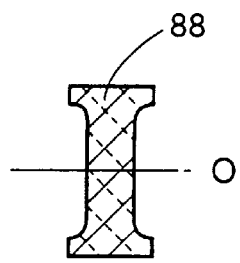
FIG. 29(a)  FIG. 29(b)

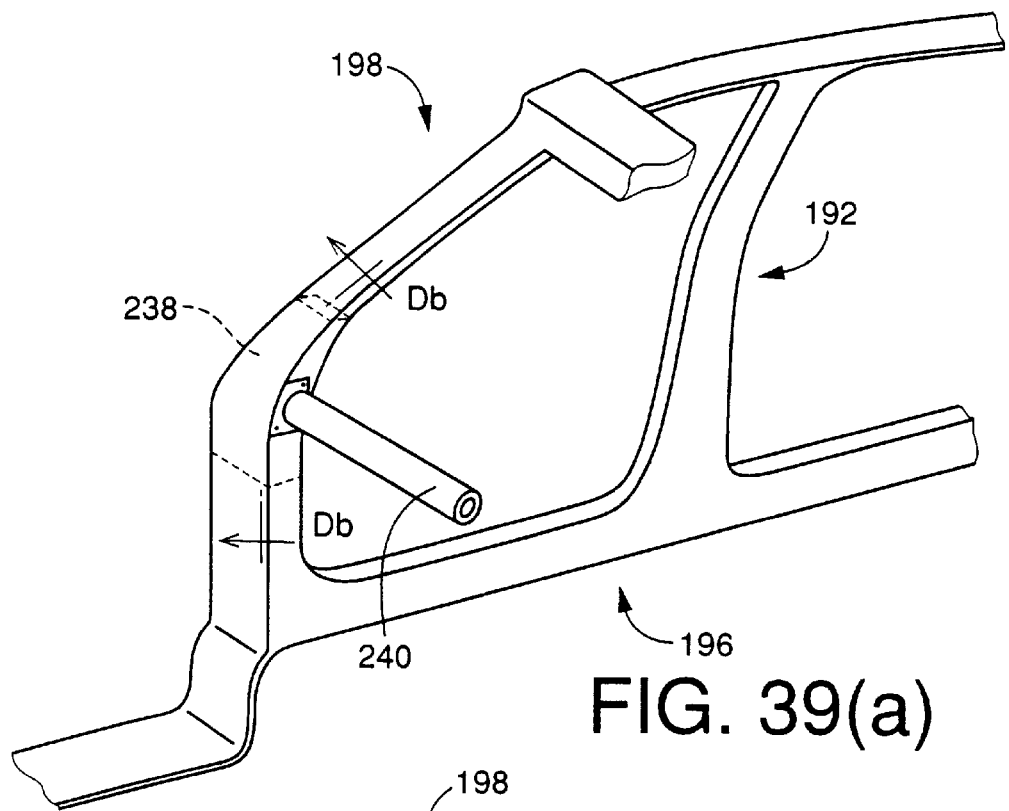
FIG. 39(a)
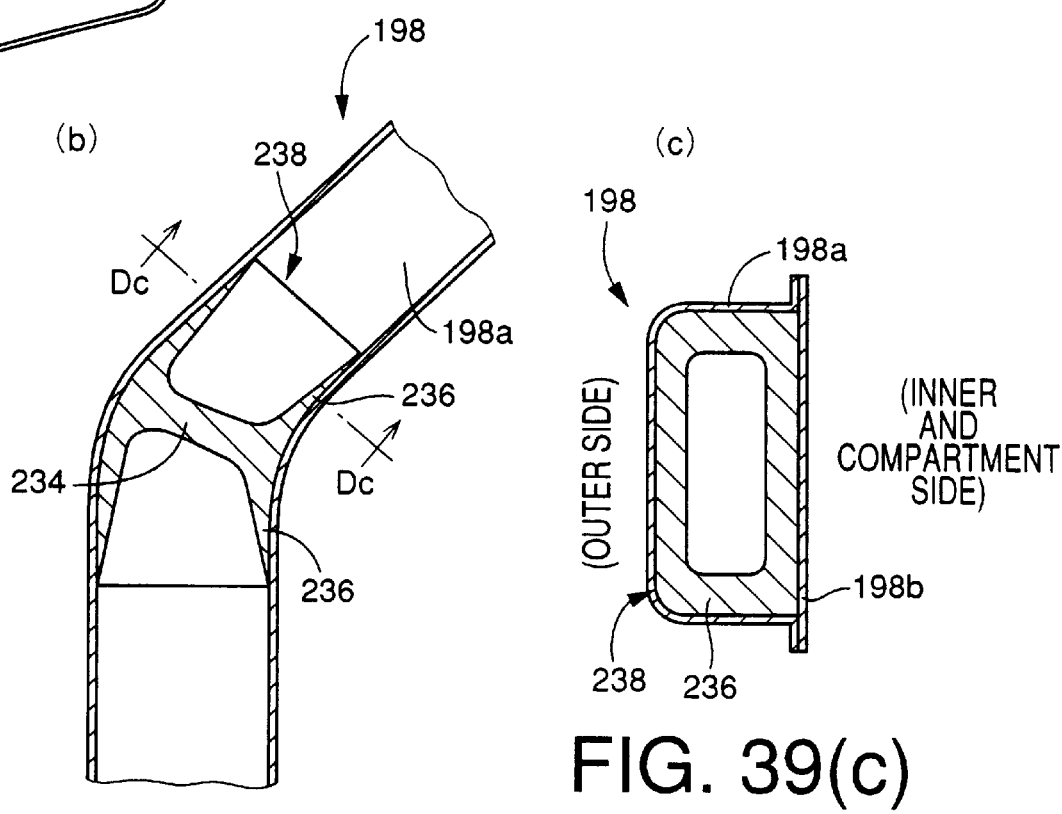
FIG. 39(b)
FIG. 39(c)

REINFORCEMENT FOR VEHICLE HOLLOW STRUCTURAL MEMBER, HAVING DECREASING-THICKNESS END PORTIONS

This application is based on Japanese Patent Applications Nos. 9-148792 and 9-309000 filed Jun. 6 and Nov. 11, 1997, respectively, the contents of which are incorporated hereinto by reference.

BACKGROUND OF THE INVENTION

1. Field of the Invention

The present invention relates in general to a hollow structural member of a body structure of a motor vehicle, and more particularly to such a hollow structural member provided with an internal reinforcement.

2. Discussion of the Related Art

The body structure of a motor vehicle includes various stationary hollow structural members each of which includes a hollow body portion such as tubular body portion. These hollow structural members include impact beams, side door waists, center pillars and front pillars. The mechanical strength of each hollow structural member can be increased by a reinforcement disposed inside the body portion. For instance, the impact beam disposed within a side door of a passenger vehicle is provided to minimize inward deformation of the side door due to an impact load applied thereto laterally of the vehicle body upon collision of the vehicle at the side door with a given object. Generally, the impact beam includes a tubular body portion having a circular transverse cross sectional shape, and a pair of fixing portions integrally fixed to the longitudinal opposite ends of the body portion. The impact beam is fixedly attached at its fixing portions to the frame of the side door, such that the body portion of the impact beam extends in the longitudinal or running direction of the vehicle. There has been proposed an impact beam of the type in which a reinforcement is disposed inside a longitudinal central part of the tubular body portion, in order to increase the bending strength of the central part so as to prevent buckling thereof, while minimizing an increase in the weight of the impact beam. Examples of this type of impact beam are disclosed in JP-A-4-238727 and JP-6-91325, which use a tubular reinforcement or a cylindrical solid reinforcement. The buckling of the impact beam is interpreted to mean bending of the tubular body portion into a curved flattened shape due to an impact load laterally applied thereto. The bending strength is a value of the load at which the buckling or fracture of the impact beam occurs.

In the conventional tubular structural member as described above, the bending strength or rigidity considerably changes at and near the opposite ends of a reinforcement provided in the tubular body portion, so that the stress tends to be concentrated around the ends of the reinforcement, increasing the possibility of cracking or fracture at the corresponding parts of the tubular body portion. Thus, the conventional tubular structural member suffers from a problem of insufficient improvement in the bending strength.

Explained more specifically referring to FIGS. 9 and 10, a test on an impact beam 10' (not provided with a reinforcement) using a pendulum 30 revealed a stress distribution as indicated in the graph of FIG. 10. In the test, the end face of the pendulum 30 was forced onto the impact beam 10', at a longitudinal center point S of the impact beam 10'. A FEM (finite-element method) analysis showed the stress distribution of FIG. 10 in which the stress continuously decreases in the opposite longitudinal directions of the impact beam 10', with an increase in the distance from the point (S) of application of the load, as indicated at (1) through (4) in FIG. 9. The stress has a maximum value σmax at the load application point or center point S. In the graph of FIG. 10, the distance (mm) from the load application point S is taken along the abscissa (right and left direction in FIG. 9), while the value of the stress on the upper side of the impact beam 10' is taken along the ordinate. It will be understood from the graph of FIG. 10 that a stress value σ40 at the positions 40 mm away from the load application point S is still considerably large. Accordingly, where a reinforcement having a length of about 80 mm is disposed within the tubular body portion of the impact beam 10' such that the opposite ends of the reinforcement are spaced about 40 mm away from the load application point S, stress concentration takes place at or near the opposite ends of the reinforcement, and the impact beam 10' is likely to be fractured. It is considered that the use of a reinforcement having a sufficiently large length is effective to reduce the stress values around the ends of the reinforcement and prevent the fracture of the impact beam 10'. However, this potential solution inevitably results in an undesirable increase in the weight and material cost of the reinforcement.

JP-A-7-506067 discloses the use of a reinforcement in the form of a generally elongate plate whose width dimension decreases in the longitudinal opposite directions toward its opposite ends, with a decrease in the bending moment applied to the elongate plate. This reinforcement also suffers from considerable changes of the bending strength around the longitudinal ends of the elongate plate. Further, the elongate plate whose width dimension is still comparatively large at the longitudinal ends tends to have cracking due to stress concentration at its end portions. There is also proposed to reinforce a local portion of a tubular structural member such as a center pillar or a side sill of a vehicle body, by using a reinforcement consisting of two metal plates which are welded together and disposed within the tubular body portion of the structural member. This type of reinforcement also suffers from drawbacks as described above.

SUMMARY OF THE INVENTION

It is therefore an object of the present invention to provide a hollow structural member for a body structure of a motor vehicle, which is reinforced with a lightweight, inexpensive reinforcement which has an effectively improved bending strength or energy absorption property.

A second object of the invention is to provide such a reinforcement for use with a hollow structural member of a body structure of a motor vehicle.

The first object indicated above may be achieved according to a first aspect of this invention, which provides a hollow structural member comprising a hollow body portion fixedly disposed on a motor vehicle, the hollow structural member further comprising a reinforcement having a hollow structure which has an outer surface and which is fixedly disposed within the hollow body portion having an inner surface such that the outer surface of the hollow structure is in substantially close contact with the inner surface of the hollow body portion, and wherein the reinforcement includes a longitudinally central portion having highest bending rigidity, and longitudinally opposite end portions each having bending rigidity which continuously decreases in a longitudinal direction from the longitudinally central portion toward a longitudinal end of a corresponding one of the longitudinally opposite end portions, such that the bending rigidity at the longitudinal end is substantially zero.

The hollow structural member according to the first aspect of this invention comprises the reinforcement including the longitudinally central portion having a higher degree of bending rigidity than the other portion, and the longitudinally opposite end portions each of which has bending rigidity that continuously decreases in the longitudinal direction from the central portion toward the longitudinal end of the corresponding end portion, such that the bending rigidity is substantially zero at the longitudinal end of each end portion. Therefore, the hollow structural member provides a sufficient degree of buckling resistance at the central portion of the reinforcement, and does not suffer from stress concentration around the opposite ends of the reinforcement, whereby the structural member used as an impact beam for a side door of the vehicle has an effectively improved and practically sufficient bending strength, while minimizing the amounts of increase in the weight and cost of the structural member due to the provision of the reinforcement. The reinforcement constructed as described above has a relatively high degree of freedom in the choice of its material, and may be suitably formed of a light metal alloy such as an aluminum alloy, making it possible to further reduce the weight of the structural member.

The first object may also be achieved according to a second aspect of this invention, which provides a hollow structural member fixedly disposed on a motor vehicle, the hollow structural member further comprising a reinforcement having a hollow structure which has an outer surface and which is fixedly disposed within the hollow body portion having an inner surface such that the outer surface of the hollow structure is in substantially close contact with the inner surface of the hollow body portion, and wherein the reinforcement includes a thick-walled portion as a longitudinal central portion thereof, and two decreasing-thickness portions as longitudinally opposite end portions thereof disposed on opposite sides of the thick-walled portion. Each of the two decreasing-thickness portions has an inner surface which is formed such that a wall thickness of each decreasing-thickness portion continuously decreases in a longitudinal direction from the thick-walled portion toward a longitudinal end of a corresponding one of the longitudinally opposite end portions and such that the wall thickness at the longitudinal end is substantially zero.

The hollow structural member according to the second aspect of the invention may be considered to be one form of the hollow structural member according to the first aspect of the invention. The hollow structure member according to the second aspect comprises the longitudinally central thick-walled portion, and the longitudinally opposite decreasing-thickness end portions each having the wall thickness which continuously decreases in the longitudinal direction from the thick-walled central portion toward the longitudinal end of the corresponding end portion of the reinforcement, such that the wall thickness is substantially zero at the longitudinal end of each end portion of the reinforcement. The present hollow structural member has substantially the same advantages as described above with the hollow structural member according to the first aspect of the invention.

The hollow body portion of the hollow structural member is preferably a generally tubular member, as discussed below, but may be a hollow member having a polygonal shape in transverse cross section. Where the hollow body portion is a generally tubular member, the tubular member preferably has a substantially circular transverse cross sectional shape. However, the tubular body portion may have an elliptical or oval shape in transverse cross section. Although the hollow body portion may be a tube commercially available, it may be formed by bending a suitable straight metal plate into a tube such that the opposite edges of the plate are butted together, and then seam welding the tube along the butted edges, by arc welding, for example. The metal plate may be a steel plate whose tensile strength is as high as about 130 kgf/mm$^2$. It is noted that 1 kgf/mm$^2$ is approximately equal to 9.8N/mm$^2$.

Where the hollow structural member is an impact beam installed in a side door of a motor vehicle, for example, the hollow body portion is generally fixed at its longitudinal opposite ends to the frame of the side door, through respective fixing portions, such that the hollow structural member extends in the longitudinal or running direction of the vehicle. While the fixing portions may be separate parts fixed to the opposite ends of the hollow body portion by welding, for example, the fixing portions may be integrally formed with the body portion. Where the body portion is formed from a straight metal plate, for instance, the fixing portions may be formed by bending appropriate portions of the plate while the body portion is formed into a hollow structure. The hollow body portion such as an impact beam may be formed integrally with the frame or other part of the vehicle member such as a side door.

The reinforcement disposed within the hollow body portion may preferably be formed of a metal material such as a carbon steel (e.g., S45C, JIS) or an aluminum alloy (e.g., A5056, JIS). However, the reinforcement may be formed of any other materials such as FRP (fiber-reinforced plastics) or other composite material. It is desirable that the reinforcement be fixedly disposed within a longitudinally central portion of the hollow body portion (e.g., impact beam), by suitable means such as press-fitting, bonding with an adhesive agent, and welding.

In the hollow structural member according to the second aspect of the invention, the bending rigidity of the reinforcement is adjusted by suitably changing the wall thickness of the reinforcement in the longitudinal direction. According to the first aspect of the invention, however, the bending rigidity may be adjusted by cutting slits the reinforcement at its appropriate positions so as to extend in the longitudinal direction, or by using different materials at different longitudinal portions of the reinforcement. For easier installation of the reinforcement within the hollow body portion, the reinforcement is preferably formed symmetrically with respect to the centerline so that the wall thickness at any longitudinal position is constant around the centerline. Where an impact load acts on the hollow structural member in a lateral direction perpendicular to the centerline, for instance, stress distribution on the structural member is asymmetric with respect to the centerline, as indicated in the graph of FIG. 9. In this respect, the reinforcement may be formed asymmetrically with respect to the centerline, so as to follow the asymmetric stress distribution. For instance, the reinforcement may be formed such that the wall thickness on one side of the centerline remote from the point of application of the impact load is smaller than that on the other side, or such that the longitudinal dimension is shorter on the above-indicated one side. Similarly, the reinforcement is preferably symmetrical with respect to its longitudinally central portion (thick-walled portion), but may be asymmetric with respect to the central portion.

For preventing cracking or fracture of the hollow structural member due to stress concentrations near the ends of opposite ends of the reinforcement, the wall thickness value at the opposite ends of the reinforcement is desirably as small as substantially zero. However, the wall thickness value at the opposite ends need not be zero, but may be small enough to prevent the cracking or fracture of the structural member at the desired maximum load, for example, 2400 kgf or 2700 kgf, when the structural member is subjected, at its portion corresponding to the reinforcement, to an impact load as applied by a testing apparatus as shown n FIG. 4. Alternatively, the wall thickness values at the opposite ends of the reinforcement may be suitably determined depending upon the desired maximum amount of energy absorption (e.g., about 200 kgf·m or about 250 kgf·m) or the desired average load (e.g., about 1200 kgf or about 1350 kgf). The rate of decrease of the wall thickness and the longitudinal dimension of each decreasing-thickness end portion are also desirably determined so as to satisfy the requirement indicated above, and the wall thickness and the longitudinal dimension of the thick-walled central portion are desirably determined so as to prevent buckling of the structural member under the condition described above.

The wall thickness value at the opposite ends of the reinforcement for satisfying the above requirement varies depending upon the bending rigidity (material, wall thickness and diameter) of the hollow body portion. Where the reinforcement is formed of a carbon steel (e.g., S45C, JIS) usually used for a structural member, the wall thickness at the opposite ends of the reinforcement is preferably about 0.5 mm or smaller, or about 0.3 mm or smaller. Where the reinforcement is formed of an aluminum alloy (e.g., A5056, JIS), the wall thickness is preferably about 0.8 mm or smaller or about 0.6 mm or smaller.

The above-indicated specific values of the desired maximum load, maximum amount of energy absorption and average load, and the above-indicated specific values of the wall thickness at the ends of the reinforcement are provided for illustrative purpose only, in the case where the hollow structural member is used as an impact beam for a side door of a motor vehicle. It is to be understood that the values of such parameters vary and should be suitably determined, depending upon the type of the structural member and the type or model of the motor vehicle.

In a first preferred form of the hollow structural member according to the second aspect of this invention, the thick-walled portion consists of at least one solid partition wall each of which separates a space within the hollow structure of the reinforcement into two longitudinal sections. In this case, the hollow structural member has a sufficient degree of buckling resistance.

In a second preferred form of the hollow structural member according to the second aspect of the invention, the hollow body portion has a generally tubular structure, and the reinforcement has a generally tubular structure having an outer surface in substantially close contact with an inner surface of the generally tubular structure of the hollow body portion. The thick-walled portion consists of at least one solid partition wall each of which separates a space within the generally tubular structure of the reinforcement into two longitudinal sections, and each decreasing-thickness portion has an inside diameter which increases in the longitudinal direction from the thick-walled portion toward the longitudinal end, so that the wall thickness of each decreasing-thickness portion linearly decreases in the longitudinal direction. The solid partition wall permits the tubular structural member to provide a sufficient degree of buckling resistance, while the decreasing-thickness portions whose wall thickness linearly decrease as described above are relatively easy to manufacture.

In the above preferred form of the hollow structural member, the inside diameter of each decreasing-thickness portion increases in the longitudinal direction from the thick-walled portion toward the corresponding longitudinal end of the reinforcement, so that the wall thickness linearly decreases in this longitudinal direction. However, the wall thickness may be determined so as to change following the stress distribution on the hollow structural member upon application of an impact load thereto in the lateral direction.

In a third preferred form of the hollow structural member according to the second aspect of the invention, the thick-walled portion has a wall thickness which non-linearly changes according to a stress distribution on the hollow body portion when the the hollow body portion is subject to an impact load upon collision of the motor vehicle. The non-linear change of the wall thickness of the thick-walled portion permits the structural member to have an effectively improved strength, while minimizing the amounts of increase in the weight and cost of the structural member due to the provision of the reinforcement.

In one advantageous arrangement of the second preferred form of the second aspect of the invention described above, each solid partition wall has opposite part-spherical surfaces each of which has a curvature having a center lying on a centerline of the generally tubular structure of each reinforcement, and each part-spherical surface is smoothly contiguous with the inner surfaces of the two decreasing-thickness portions. In this arrangement, the hollow structural member has a bending rigidity characteristic similar to a stress distribution (as shown in FIGS. 9 and 10) on the structural member when the hollow body portion is subjected to an impact load upon collision of the vehicle. Like the structural member according to the third preferred form of the invention, the present structural member has an effectively improved strength, with minimum amounts of increase in the weight and cost of the structural member due to the provision of the reinforcement. This arrangement may be considered as one arrangement of the third preferred form of the invention described above. It is also noted that the part-spherical surfaces of the partition wall whose curvatures lie on the centerline of the reinforcement are relatively easy to form. In addition, the smooth connection of the part-spherical surfaces to the inner surfaces of the decreasing-thickness portions results in a continuous decrease of the wall thickness of the reinforcement in the longitudinal direction from the partition wall to the decreasing-thickness end portions. In this case, the reinforcement may be easily formed at a relatively low cost, in a process including a forging step wherein a blank is forged into a plate from which the reinforcement is formed.

The stress distribution indicated above, which changes with the specific types, material, wall thickness, diameter and length of the hollow structural member, may be obtained for the specific structural member in question, by a suitable method such as FEM (finite-element method) analysis.

In an advantageous arrangement of the first or second preferred form of the second aspect of the invention, the reinforcement further includes two constant-thickness portions formed between the solid partition wall and the two decreasing-thickness portions, each of the constant-thickness portion having a constant wall thickness and cooperating with the solid partition wall to define therebetween a fillet having a predetermined radius of curvature. In this instance, the longitudinal dimension of each constant-thickness portion is determined depending upon the longitudinal length of the hollow body portion of the structural member, which varies with the specific type or model of the vehicle.

According to one preferred form of the first and second aspects of the present invention, the reinforcement is formed as an integral part of the hollow body portion. In this case, a bonding adhesive such as a resin adhesive is not necessary for fixing the reinforcement within the hollow body portion, and the mechanical strength of the structural member is improved, whereby the weight of the structural member is reduced. Further, the required number of process steps for manufacturing the structural member is significantly reduced, leading to reduced cost of its manufacture.

Where the hollow body portion of the hollow structural member is a generally tubular member having a substantially circular transverse cross sectional shape, for instance, the structural member may be manufactured in a process comprising the steps of: (a) rolling a blank into a plate corresponding to a development of the hollow structural member in question along a straight line parallel to the centerline of the structural member, the plate having a changing-thickness portion corresponding to the reinforcement portion; (b) forming a plurality or multiplicity of notches in the surface of the changing-thickness portion of the plate, which surface has been shaped by rolling in the above step (a), so that the plate can be bent into a tube such that the above-indicated surface having the notches provides an inner surface of the tube; and (c) bending the notched plate into the tubular structural member which has a tubular reinforcement as an integral part of the tubular body portion. However, the hollow structural member having the integrally formed reinforcement may be formed in other processes including a forging step or a machining step.

According to another preferred form of the first or second aspect of this invention, the reinforcement is disposed as an intermediate reinforcement in a longitudinally intermediate portion of the hollow body portion, and the hollow structural member further comprising an end reinforcement having a hollow structure having an outer surface and disposed in at least one of longitudinally opposite end portions of the hollow body portion, such that the outer surface of the hollow structure is in substantially close contact with an inner surface of the hollow body portion. The end reinforcement includes a decreasing-thickness portion as one of longitudinally opposite end portions thereof which is on the side of the longitudinally intermediate portion of the hollow body portion. The decreasing-thickness portion has an inner surface which is formed such that a wall thickness of the decreasing-thickness portion continuously decreases in a longitudinal direction from the other of the longitudinally opposite end portions toward the above-indicated one of the longitudinally opposite end portions and such that the wall thickness of the end reinforcement is substantially zero at a longitudinal end of the above-indicated one end portion of the decreasing-thickness portion.

In the above form of the hollow structural member, the end reinforcement disposed in at least one of the opposite ends of the hollow body portion increases the buckling resistance and bending strength at a portion of the structural member at which the structural member is fixed through an appropriate fixing portion to a frame or other part of the motor vehicle. This end reinforcement cooperates with the intermediate reinforcement to further increase the overall impact resistance and shock absorbing capability of the hollow structural member. Further, the decreasing-thickness portion which is provided as a longitudinally inner end portion of the end reinforcement has a wall thickness which continuously decreases in the direction from the outer end toward the inner end of the end reinforcement such that the wall thickness at the inner end of the end reinforcement is substantially zero. This decreasing-thickness portion is effective to prevent stress concentrations and consequent cracking or fracture of the body portion near the inner end of the end reinforcement.

The end reinforcement may be a hollow member which is closed by a bottom portion located at the outer end of the hollow body portion. In this case, the decreasing-thickness portion is formed adjacent to the bottom portion such that the wall thickness of the decreasing-thickness portion continuously decreases in the longitudinal direction from the closed end (bottom portion) toward the inner open end of the end reinforcement. The wall thickness of the bottom portion is suitably determined depending upon the required strength of the bottom portion. The bottom portion may have a through-hole, for reducing the weight of the end reinforcement. It will be understood that the end reinforcement need not include such a bottom portion, namely, may be formed so as to have different wall thickness values at the opposite ends. The end reinforcement may be provided in only one of the opposite end portions of the body portion, or alternatively in both of the end portions of the body portion of the structural member. In the latter case, the intermediate reinforcement indicated above is disposed between the two end reinforcements.

The hollow structural member according to the present invention may be suitably used as an impact beam fixedly disposed in a side door of the motor vehicle, so as to extend in a running direction of the vehicle. Alternatively, the hollow structural member may be used as any other structural member of the motor vehicle, which may be selected from among a center pillar, a side door waist, a side sill, a front pillar, a front cross member, a front side member and a bumper reinforcing beam of the motor vehicle. These structural members are given for illustrative purpose only.

The second object indicated above may be achieved according to a third aspect of this invention, which provides a reinforcement fixedly disposed in a hollow structural member including a hollow body portion fixedly disposed on a motor vehicle, the reinforcement has a hollow structure which has an outer surface and which is fixedly disposed within the hollow body portion such that the outer surface of the hollow structure is in substantially close contact with an inner surface of the hollow body portion, the reinforcement comprises: (a) a longitudinally central portion having a highest bending rigidity; and (b) longitudinally opposite end portions each having bending rigidity which continuously decreases in a longitudinal direction from the longitudinally central portion toward a longitudinal end of a corresponding one of the longitudinally opposite end portions, such that the bending rigidity at the longitudinal end is substantially zero.

The reinforcement according to the third aspect of the invention has substantially the same advantage as described above with the hollow structure member according to the first aspect of the invention.

The second object may also be achieved according to a fourth aspect of this invention, which provides a reinforcement fixedly disposed in a hollow structural member including a hollow body portion fixedly disposed on a motor vehicle, the reinforcement has a hollow structure which has an outer surface and which is fixedly disposed within the hollow body portion such that the outer surface of the hollow structure is in substantially close contact with an inner surface of the hollow body portion, the reinforcement comprises: (a) a thick-walled portion as a longitudinal central portion thereof; and (b) two decreasing-thickness portions as longitudinally opposite end portions thereof disposed on opposite sides of the thick-walled portion, each of the two decreasing-thickness portions having an inner surface which is formed such that a wall thickness of each decreasing-thickness portion continuously decreases in a longitudinal direction from the thick-walled portion toward a longitudinal end of a corresponding one of the longitudinally opposite end portions and such that the wall thickness at the longitudinal end is substantially zero.

The reinforcement according to the fourth aspect of the invention has substantially the same advantage as described above with respect to the hollow structural member according to the second aspect of the invention.

In one preferred form of the above fourth aspect of the invention, the reinforcement comprises: (a) a first piece constituting a first part of the thick-walled portion and including a first and a second engaging portion at longitudinally opposite ends thereof; (b) a second piece including one of the two decreasing-thickness portions and constituting a second part of the thick-walled portion which is adjacent to the one of the two decreasing-thickness portions, the second piece including an engaging end portion which is remote from the one of the two decreasing-thickness portions and which engages the second engaging portion of the first piece; and (c) a third piece including the other of the two decreasing-thickness portions and constituting a third part of the thick-walled portion which is adjacent to the other of the two decreasing-thickness portions, the third piece including an engaging end portion which is remote from the other of the two decreasing-thickness portions and which engages the first engaging portion of the first piece, the first, second and third parts constituting the thick-walled portion.

The reinforcement according to the above preferred form of the fourth aspect of this invention comprises the three different pieces. The reinforcement may include two or more first pieces engaging each other such that the first engaging portion of one of the first pieces engages the second engaging portion of the adjacent one of the other first piece or pieces and such that the first and second engaging portions of the two outer first pieces engage the third and second pieces, respectively. In this case, the longitudinal dimension of the thick-walled portion of the reinforcement can be adjusted by changing the number of the mutually engaging first pieces. Thus, the present reinforcement is effective to permit the structural member to provide an increased bending rigidity over the desired longitudinal dimension, which changes depending upon the specific length of the body portion of the structural member. All of the first, second and third pieces may be formed of the same material. However, the first, second and third pieces may be formed of different materials. For instance, the second and third pieces having the decreasing-thickness portions which are the opposite end portions of the reinforcement may be formed of a material whose rigidity is lower than that of the first piece.

It will be understood that the reinforcement may consist of one piece, or a plurality of pieces which are arranged around the centerline of the body portion and assembled together into a reinforcement. It will also be understood that a plurality of reinforcements each consisting of a single piece may be arranged in the longitudinal direction of the body portion, such that the reinforcements are disposed adjacent to each other or in spaced-apart relation with each other.

In another preferred form of the fourth aspect of this invention, the hollow body portion has a generally tubular structure and the thick-walled portion consists of a solid partition wall, as described above with respect to the second preferred form of the second aspect of the invention, and each solid partition wall has opposite part-spherical surfaces each of which has a curvature having a center lying on a centerline of the generally tubular structure of each reinforcement and is smoothly contiguous with the two decreasing-thickness portions. The reinforcement is manufactured in a process including a forging step of cold-forging a blank into a plate from which the reinforcement is formed.

In the above preferred form of the invention wherein the reinforcement is manufactured in the process including the cold-forging step, the reinforcement can be more easily and inexpensively manufactured than where the reinforcement is manufactured by machining. Further, the thus manufactured reinforcement has a sufficiently high mechanical strength with a comparatively small wall thickness and an accordingly reduced weight. In addition, the decreasing-thickness portions have continuously decreasing wall thickness can be comparatively easily formed by forging a suitable blank such as a cylindrical blank, with a relatively small number of forging actions, so that the life of the forging die can be accordingly increased.

However, the reinforcement according to the present invention may be manufactured in any other process including a machining step or casting (e.g., aluminum die casting). Where the reinforcement is manufactured in a process including a cold-forging step as described above, the reinforcement is preferably formed of a material which can easily flow during the forging operation.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 11 is a graph indicating a load-displacement relationship obtained as a result of a bending test on an impact beam provided with the reinforcement of FIG. 8;

FIGS. 12(a) and 12(b) are views for explaining the manner of manufacturing the reinforcement of FIG. 8 by cold forging;

FIG. 17(a) and 17(b) are a front elevational view and a bottom plan view of an elongate strip used for forming the impact beam of FIG. 13;

FIG. 17(c) is a cross sectional view taken along line 17(c)—17(c) in FIG. 17(a);

FIG. 24 is a view indicating the results of the bending tests on the reinforcements of FIGS. 3, 8, 18, 20 and 21;

FIG. 27 is a longitudinal cross sectional view of a second piece of the reinforcement of FIG. 25, the view being taken in a plane including the centerline O of the reinforcement;

FIG. 28 is a longitudinal cross sectional view of a third piece of the reinforcement of FIG. 25, the view being taken in a plane including the centerline O of the reinforcement;

FIG. 29(a) is an end elevational view of a reinforcing piece of the reinforcement of FIG. 25;

FIG. 29(b) is a cross sectional view of the reinforcing piece of FIG. 29(a), the view being taken in a plane including the centerline of the piece;

FIG. 39(a) is a perspective view of a front portion of the structure of FIG. 35 including a front pillar;

FIG. 39(b) is a cross sectional view taken along line Db—Db of FIG. 39(a);

FIG. 39(c) is a cross sectional view taken along line Dc—Dc of FIG. 39(b);

DESCRIPTION OF THE PREFERRED EMBODIMENTS

Figures 1A, 1B, 1C:
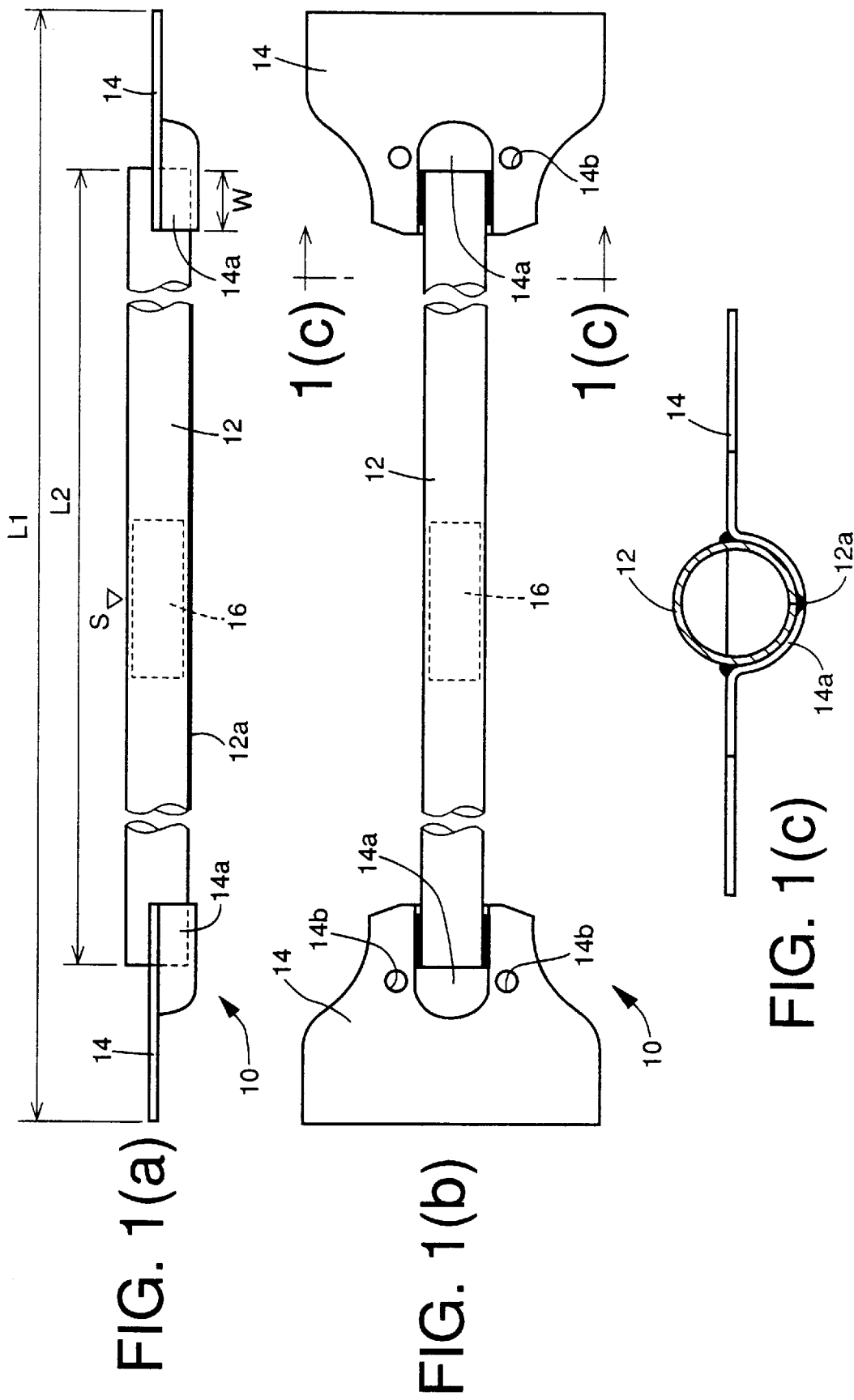
FIGS. 1(a) and 1(b) are a front elevational view and a plan view of an impact beam of a side door of a motor vehicle, which is constructed according to one embodiment of this invention.
FIG. 1(c) is a cross sectional view taken along line 1(c)—1(c) of FIG. 1(b)

Referring first to FIGS. 1(a), 1(b) and 1(c), there is shown an impact beam 10 of a side door of a motor vehicle, which is constructed according to one embodiment of the present invention. It is noted that the cross sectional view of FIG. 1(c) is enlarged two times with respect to the views of FIGS. 1(a) and 1(b). The impact beam 10 includes a tubular body portion 12 having a circular transverse cross sectional shape as shown in FIG. 1(c), a pair of fixing portions 14 fixed to the opposite longitudinal ends of the tubular body portion 12, and a reinforcement 16 fixedly disposed within a longitudinally central part of the tubular body portion 12, as indicated in FIGS. 1(a) and 1(b).

The impact beam 10 is attached to a frame of the side door of the vehicle such that the tubular body portion 12 extends in the longitudinal or running direction of the vehicle, while the upper side of the impact beam 10 as seen in FIG. 1(a) faces toward the laterally outward direction of the vehicle so that the above-indicated upper side receives a load upon collision of the vehicle at its side door with a certain object. The impact beam 10 has an overall length L1 of about 1104 mm, and the tubular body portion 12 has a length L2 of about 950 mm. The end portions of the tubular body portion 12 are inserted into the respective fixing portions 14 over a length W of about 30 mm, and are welded to the fixing portions 14 over a length of about 25 mm, by arc welding, for example.

The tubular body portion 12 is formed from a straight rectangular steel plate, for example, a steel plate SPFC1270Y, JIS (Japanese Industrial Standard) having a tensile strength of about 130 kgf/mm$^2$ and a thickness of 1.6 mm. Described more specifically, the steel plate is formed into a tubular shape having a high degree of roundness, such that the opposite long-side edges are butted together. The thus formed tube is welded by arc welding, for example, at a longitudinally middle section of the tube over a length of 400 mm along the butted edges such that the welded section 12a extends over 200 mm from a longitudinal center point S of the tube in the opposite longitudinal directions. The thus obtained tubular body portion 12 has an outside diameter of about 31.8 mm. The tubular body portion 12 is fixed to the fixing portions 14 so that the lower side of the body portion 12 as seen in FIG. 1(a) faces in the laterally inward direction of the vehicle.

Each of the fixing portions 14 is formed from a hot-dip zinc-coated steel plate, for example, steel plate SGC440, JIS having a tensile strength of 45 kgf/mm$^2$ and a thickness of 1.2 mm. Described more particularly, the steel plate is formed by pressing into the fixing portion 14 having an opening 14a which has a semi-circular bottom whose radius of curvature is substantially equal to that of the outer circumferential surface of the tubular body portion 12. That is, the width of the opening 14a as measured in the direction perpendicular to the thickness direction of the fixing portion 14 is substantially equal to the outside diameter of the tubular body portion 12. The opposite end portions of the tubular body portion 12 are received in the openings 14a of the fixing portions 14 and secured to the fixing portions 14 by arc welding, for example. Each fixing portion 14 has a pair of holes 14b, which are pilot holes formed through the steel plate and used in a pressing operation to form the fixing portion 14. These holes 14b are filled by welding. The length and position of welding of the welded portion 12a of the tubular body portion 12 may be changed as needed. The welded portion 12a may be provided over the entire length of the body portion 12.

Figure 2A:
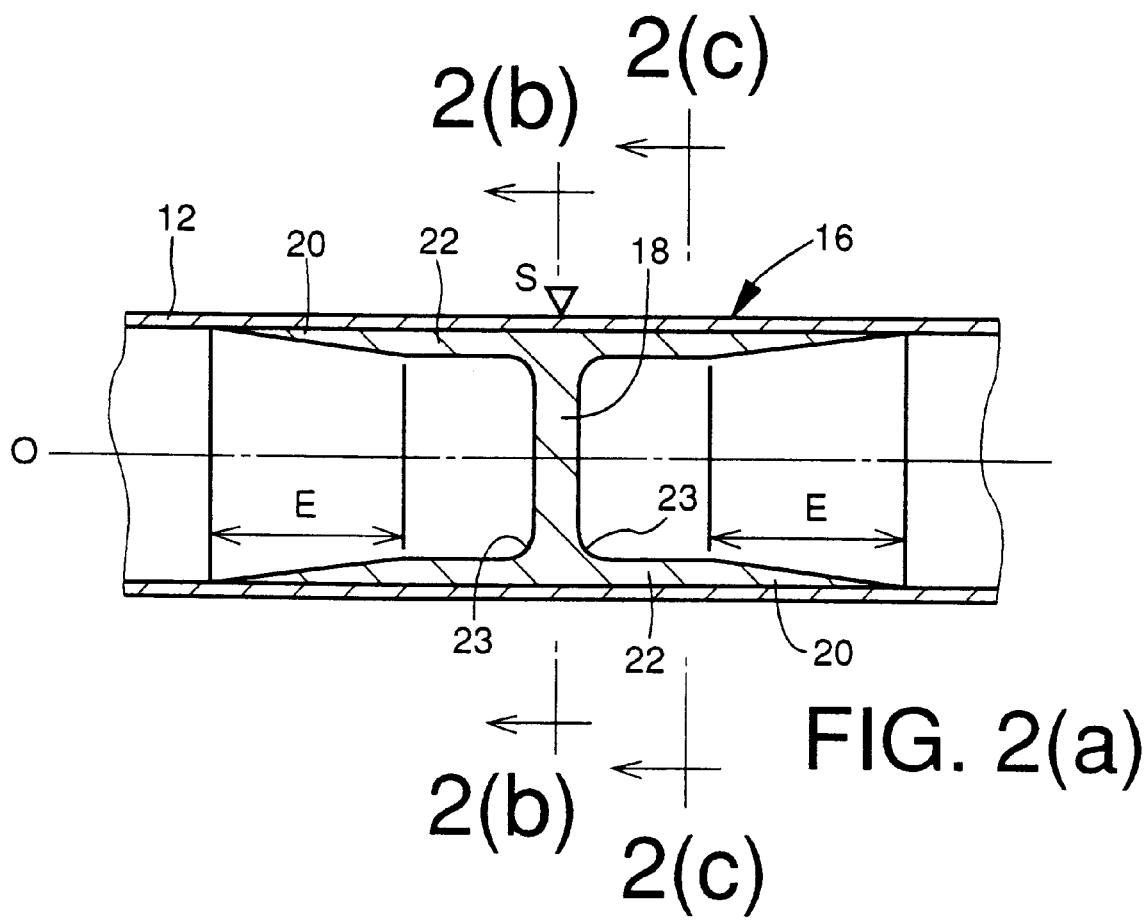
FIG. 2(a) is a longitudinal cross sectional view of a longitudinally central part of the impact beam at which a reinforcement is provided, the view being taken in a place including a centerline O of the impact beam.
Figures 2B, 2C:
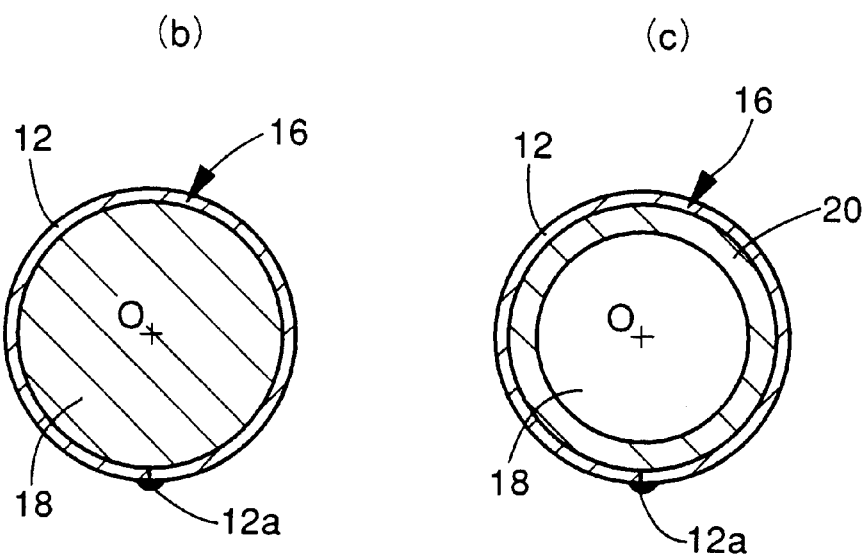
FIGS. 2(b) and 2(c) are transverse cross sectional views taken along line 2(b)—2(b) and line 2(c)—2(c) of FIG. 2(a)

Referring next to FIGS. 2(a), 2(b) and 2(c), the reinforcement 16 will be described. The reinforcement 16 is a tubular member which has a circular transverse cross sectional shape as indicated in FIGS. 2(b) and 2(c), and an outside diameter substantially equal to the inside diameter of the tubular body portion 12. The tubular reinforcement 16 is disposed within the tubular body portion 12 such that the reinforcement is held in close contact at its outer circumferential surface with the inner circumferential surface of the body portion 12. The reinforcement 16 includes a thick-walled portion in the form of a solid partition wall 18 formed in a longitudinally or axially central portion thereof such that the partition wall 18 extends in the radial direction, so that the interior of the reinforcement is separated by the partition wall 18 into two longitudinal sections. The partition wall 18 has a thickness determined to give the reinforcement 16 a sufficient degree of bending strength or rigidity. The thickness is the dimension in the longitudinal direction of the reinforcement 16.

The reinforcement 16 further includes opposite end portions in the form of decreasing-thickness portions 20, 20 each formed over a predetermined length E up to the corresponding outer end such that the two decreasing-thickness portion 20, 20 are symmetrical with each other with the partition wall 18 interposed therebetween in the longitudinal direction of the reinforcement 16. Each decreasing-thickness portion 20 has a tapered inner circumferential surface such that the inside diameter increases in the longitudinal direction from the partition wall 18 toward the corresponding outer end, so that the wall thickness of the decreasing-thickness portion 20 linearly decreases in the above-indicated longitudinal direction until the wall thickness is substantially zeroed at the outer end so as to form an edge.

The reinforcement 16 also includes two constant-thickness portions 22 each formed between the partition wall 18 and the corresponding one of the two decreasing-thickness portions 20 described above. Each constant-thickness portion 22 has a constant wall thickness over its entire length in the longitudinal direction of the reinforcement 16. The rate of change or decrease of the wall thickness (taper angle) and the length E of the decreasing-thickness portions 20, and the wall thickness at the outer ends of these portions 20 are determined so that the bending rigidity of the reinforcement 16 smoothly decreases in the longitudinally outward directions and is almost zeroed at the outer ends (edges), in order to avoid cracking or fracture of the tubular body portion 12 due to stress concentration at the end portions of the reinforcement 16. Between the partition wall 18 and the constant-thickness portions 22, there are formed annular fillets 23 having a suitable radius of curvature, in order to avoid sudden changes of the bending rigidity of the reinforcement 16 and consequent stress concentration at the parts between the partition wall 18 and the constant-thickness portions 22.

Figure 3:
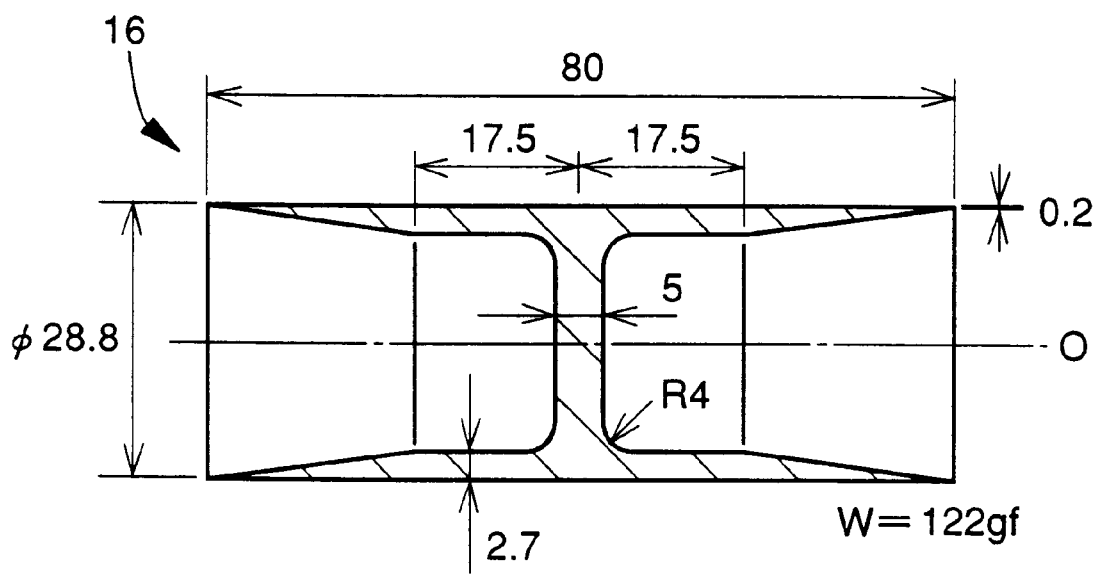
FIG. 3 is a view indicating dimensions of the reinforcement shown in FIGS. 2(a), 2(b) and 2(c)

The reinforcement 16 is symmetrical with respect to its centerline O in all radial directions. Namely, the wall thickness of the reinforcement 16 at any longitudinal position thereof is constant in the circumferential direction. Therefore, the reinforcement 16 can be disposed within the tubular body portion 12, without specific positioning of the reinforcement 16 relative to the tubular body portion 12 in the circumferential direction. The wall thickness values of the portions 18, 20, 22 and the radius of curvature of the fillets 23 may be determined as needed depending upon the material of the reinforcement 16. In the present specific embodiment, the reinforcement 16 is formed of a carbon steel (used for structural members), for example, SC45, JIS, and has the dimensions (in mm) as indicated in FIG. 3 and a weight W of about 122 gf. The reinforcement 16 may be formed by cold forging or machining. In the present embodiment, the reinforcement 16 is formed by machining, and press-fitted into the tubular body portion 12 through one of the opposite open ends of the body portion 12 before the fixing portions 14 are welded to the body portion 12. When the reinforcement 16 is press-fitted in the tubular body portion 12, the reinforcement 16 is positioned in the longitudinal direction relative to the body portion 12, by a suitable positioning jig inserted into the body portion 12 through the other open end of the body portion 12, such that the longitudinal center point (partition wall 18) of the reinforcement 16 is substantially aligned with or located at the longitudinal center point S of the body portion 12, as indicated in FIG. 2(*a*). In the present embodiment, the reinforcement 16 is fixed in the body portion 12 by means of only an interference fit therebetween. However, the reinforcement 16 may be fixed to the body portion 16 by other means such as welding or a bonding agent such as a resin material.

As described above, the impact beam 10 according to the present embodiment is reinforced by the reinforcement 16 which has the partition wall 18 at its longitudinally central portion, and the decreasing-thickness portions are 20 as the longitudinally opposite end portions each formed over the length E such that the wall thickness of each decreasing-thickness portion 20 linearly decreases in the longitudinally outward direction toward the end so that the thickness at the end is almost zero. The reinforcement 16 is fixed at the longitudinally central portion of the tubular body portion 12, so that the impact beam 10 has a sufficiently high buckling resistance around the longitudinal center point S of the body portion 12, and does not suffer from stress concentration around the ends of the reinforcement 16. Thus, the bending strength of the impact beam 10 is effectively increased to a practically satisfactory value, without considerable amounts of increase in the weight and cost of manufacture of the impact beam 10 due to the provision of the reinforcement 16.

Further, the thick-walled portion in the form of the partition wall 18 gives the reinforcement 16 a significantly increased resistance to buckling, while the decreasing-thickness portions 20 whose wall thickness value linearly decreases can be comparatively easily and economically formed. In addition, the constant-thickness portions 22 having a constant wall thickness and formed between the partition wall 18 and the decreasing-thickness portions 20 so as to define the fillets 23 therebetween with a suitable radius of curvature make it possible to give the reinforcement 16 a desired bending rigidity, depending upon the length dimension of the constant-thickness portions 22. Accordingly, by suitably determining the length dimension of the constant-thickness portions 22, the reinforcement 16 can be used for various impact beams 10 whose tubular body portions 12 have different length dimensions.

Figure 4:
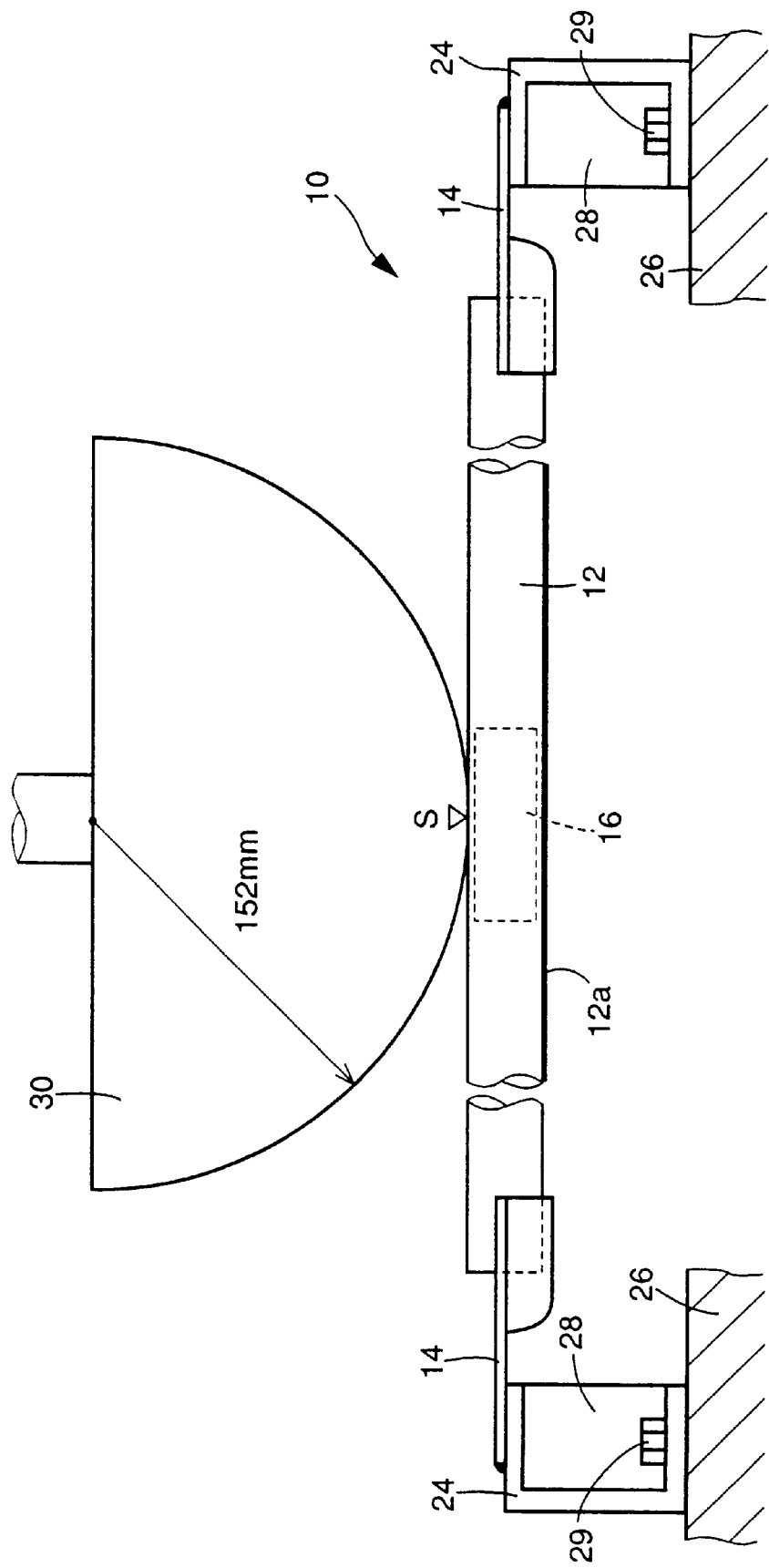
FIG. 4 is a view for explaining a bending test on the impact beam of FIGS. 1(a)–1(c)

To further clarify the advantage of the present embodiment, a bending test was conducted on the impact beam 10, using a testing apparatus as shown in FIG. 4. To conduct the bending test, the impact beam 10 was set on the testing apparatus, by first securing the two fixing portions 14 to respective metal support members 24 by arc welding, and then fastening the support members 24 to a surface plate 26 of the testing apparatus by bolts 29. The two support members 24, each of which has a U shape in cross section, were positioned on the surface plate 26 such that the U-shaped openings of the support members 24 are open toward each other. The support members 24 are reinforced by respective reinforcing plates 28 secured thereto by arc welding, so as to provide highly rigid support structures 24, 28 which undergo substantially no deformation in the bending test. The impact beam 10 was positioned so as to have a substantially horizontal attitude, such that the welded portion 12*a* of the body portion 12 which is to face in the laterally inward direction of the vehicle when installed on the vehicle is located on the lower side of the impact beam 10 or faces downward.

In this condition, the pendulum 30 having a semi-circular cross sectional shape as shown in FIG. 4 was lowered substantially in the vertical direction, onto the tubular body portion 12 at the longitudinal center point S of the latter. The pendulum 30 has a radius of curvature of 152 mm and a thickness of 40 mm. The amount of downward displacement of the body portion 12 at the center point S (namely, the amount of downward movement of the pendulum 30) was measured at different values of the load which acts on the body portion 12 through the pendulum 30.

Figure 5:
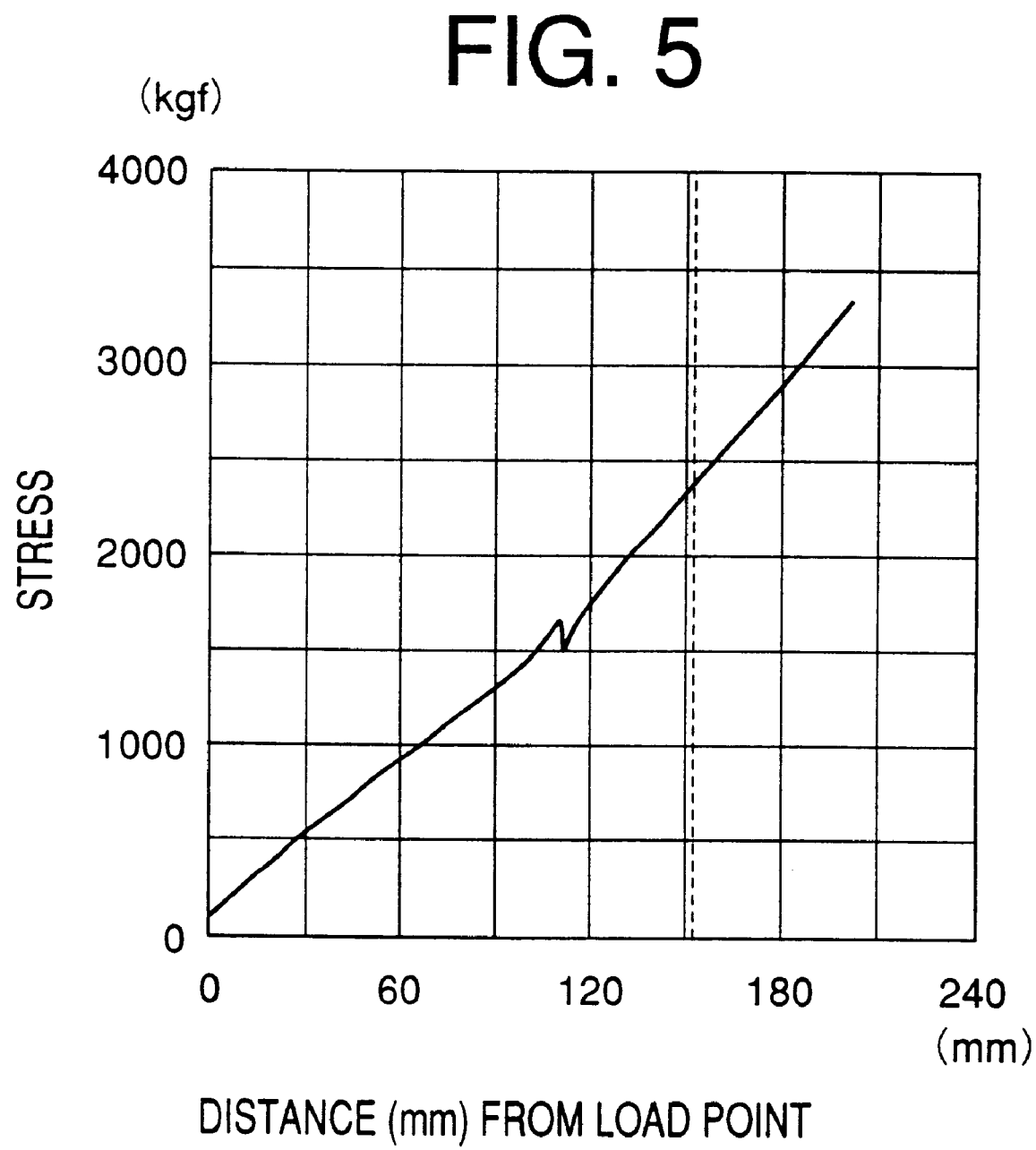
FIG. 5 is a graph indicating a result of the bending test of the impact beam.

The graph of FIG. 5 indicates a relationship between the amount of displacement and the load. The pendulum 30 was lowered over its maximum operating stroke of 202.3 mm, that is, lowered to its lower stroke end, without fracture or buckling of the impact beam 10. The maximum load measured at the lower stroke end of the pendulum 30 was 3367 kgf. As indicated in row No. 1 of the table of FIG. 24, the amount of energy absorption by the impact beam 10 by the time the pendulum 30 was lowered to its lower stroke end was 318.7 kgf·m, and the average load was 1576.9 kgf. The energy absorption amount is an integral of the load values by the time the pendulum 30 was lowered to a given point (to the lower stroke end in the above case), and the average load is obtained by dividing the energy absorption amount by the displacement. The row No. 1 of the table of FIG. 24 also indicates the energy absorption amount and the average load when the displacement was 152 mm (6 inches). The broken line shown in the graph of FIG. 5 indicates this displacement value of 152 mm.

There will be described various other embodiments of this invention, wherein the same reference numerals as used in the first embodiment will be used to identify the functionally corresponding elements, and redundant descriptions of those elements will not be provided.

Figure 6:
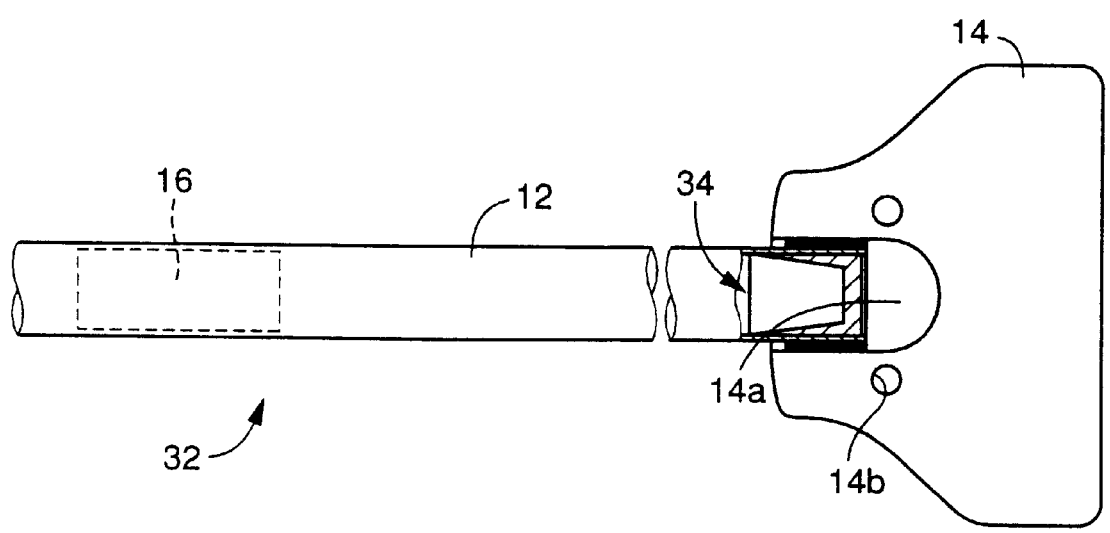
FIG. 6 is a partly cut-away view of an impact beam according to another embodiment of the invention.

Referring to the partly cut-away view of FIG. 6, there is shown an impact beam 32 for a side door of a motor vehicle, which is constructed according to a second embodiment of this invention. The impact beam 32 is substantially identical in construction with the impact beam 10 of FIGS. 1(*a*)–1(*c*), except for the provision of an end reinforcement 34 disposed in each of the opposite axial end portions of the tubular body portion 12, in addition to the intermediate reinforcement 16.

Figure 7A:
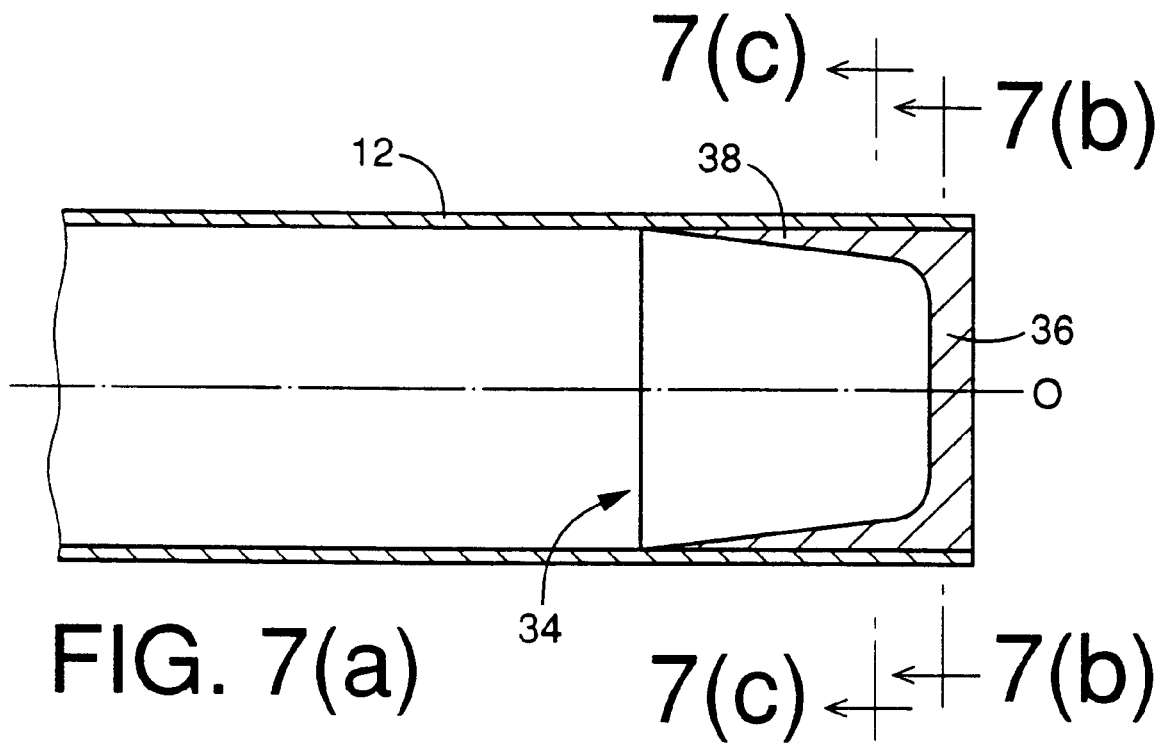
FIG. 7(a) is a fragmentary longitudinal cross sectional view of the impact beam of FIG. 6, showing in enlargement an end reinforcement.
Figures 7B, 7C:
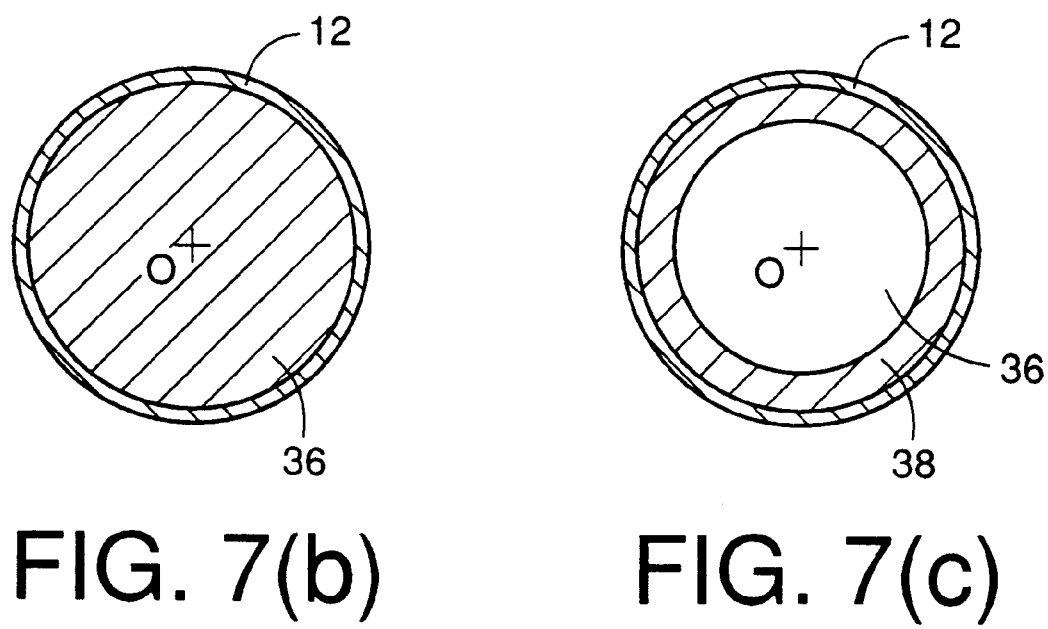
FIGS. 7(b) and 7(c) are transverse cross sectional views taken along line 7(b)—7(b) and line 7(c)—7(c) of FIG. 7(a)

The end reinforcement 34 is shown in enlargement in FIGS. 7(*a*), 7(*b*) and 7(*c*). This end reinforcement 34 is a tubular member which has an outside diameter substantially equal to the inside diameter of the tubular body portion 12. The end reinforcement 34 is disposed such that its outer circumferential surface is held in substantially close contact with the inner circumferential surface of the tubular body portion 12. The tubular member of the end reinforcement 34 is closed by a bottom portion 36 at one axial end thereof, which closes the corresponding end of the tubular body portion 12. The bottom portion 36 has a wall thickness determined to have a desired bending rigidity or strength. The end reinforcement 34 further has a decreasing-thickness portion 38 whose inner circumferential surface is tapered such that the wall thickness linearly decreases in the axial direction from the bottom portion 36 at the above-indicated one axial end toward the other open inner axial end, namely, toward the axially central portion of the body portion 12. The thickness of the decreasing-thickness portion 38 is substantially zero at the inner axial end. The rate of decrease of the wall thickness (taper angle) of the decreasing-thickness portion 38 and the thickness at the inner axial end of the portion 38 are determined so that the bending rigidity or strength smoothly decreases in the above-indicated axial direction such that the bending rigidity at the inner axial end of the portion 38 is substantially zero, in order to prevent cracking or fracture of the tubular body portion 12 due to stress concentrations around the inner axial end of the portion 38. The end reinforcement 34 is secured within the body portion 12 by suitable means such as a bonding adhesive such that the outer end surface of the bottom portion 36 is substantially flush with the corresponding end face of the body portion 12. The axial dimension of the end reinforcement 34 is determined so that its inner end is spaced from the inner end of the corresponding fixing portion 14 by a suitable distance in the axial direction toward the central portion of the body portion 12. The end reinforcement 34 is formed of a material similar to that of the reinforcement 16. For instance, the end reinforcement 34 is formed of a carbon steel generally used for structural members.

The impact beam 32 according to the present second embodiment of the invention has the advantage described above with respect to the first embodiment. Further, the present impact beam 32 including the end reinforcements 34 disposed within the opposite end portions of the body portion 12 has an additional advantage in the buckling resistance and bending strength at the opposite end portions of the tubular body portion 12 at which the body portion 12 is fixed to the fixing portions 14 through which the load is received by the frame member of the side door. As explained above, each end reinforcement 34 is a tubular member including the bottom portion 36 at its one axial end and the decreasing-thickness portion 38 whose wall thickness linearly decreases in the axial direction from the bottom portion 36 toward the other or inner axial end such that the wall thickness at the inner axial end is substantially zero. The end reinforcements 34 cooperate with the central reinforcement 16 for reinforcing the central portion of the body portion 12 to improve the overall impact resistance and impact energy absorption characteristic. In addition, the continuous reduction of the wall thickness of the end reinforcement 34 to a substantially zero value at the inner end of the end reinforcement 34 is effective to prevent the stress concentration around the inner end of the end reinforcement 34, thereby minimizing the possibility of cracking and fracture of the body portion 12 near the inner end of the end reinforcement 34.

Figure 8:
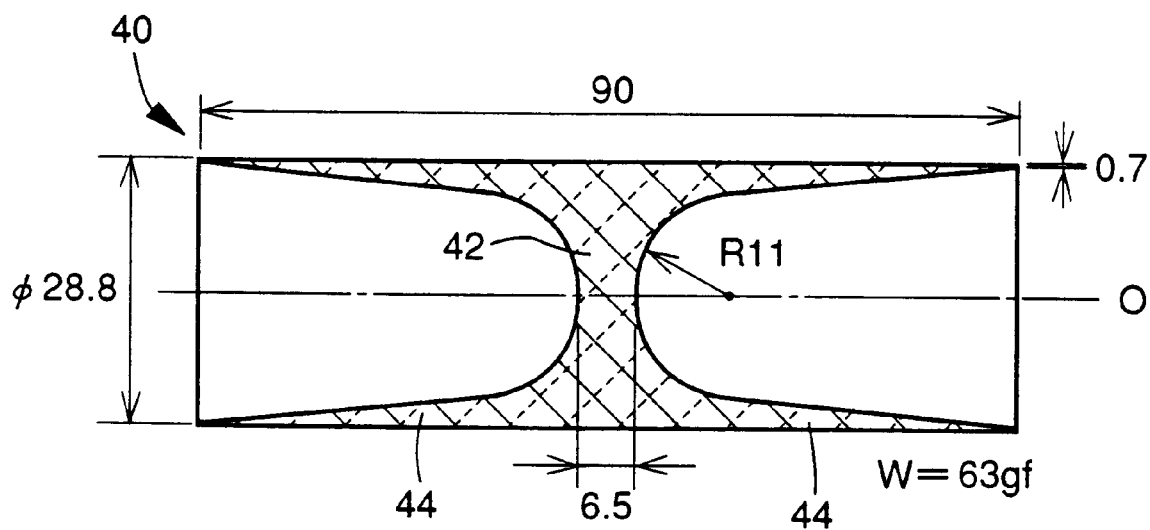
FIG. 8 is a longitudinal cross sectional view of a reinforcement according to a further embodiment of this invention, the view being taken in a plane including a centerline O of the reinforcement.

Referring to FIG. 8, there is shown a reinforcement 40 constructed according to a third embodiment of this invention. The reinforcement 40 includes a thick-walled portion in the form of a solid partition wall 42, and two decreasing-thickness portions 44 on the opposite sides of the partition wall 42. The wall thickness of the partition wall 42 changes non-linearly following a pattern of stress distribution when the impact beam is subject to a load. Described in detail, each of the opposite surfaces of the partition wall 42 is a part-spherical surface having a suitable curvature with its center being located on the centerline O of the tubular reinforcement 40. The thickness of the partition wall 42 is minimum on the centerline O and non-linearly increases in the radially outward direction so that the partition wall 42 is smoothly contiguous, at its radially outer end, with the large-thickness ends of the decreasing-thickness portions 44 whose wall thickness linearly changes with its inside diameter linearly increasing in the opposite longitudinal directions from the partition wall 42 toward the ends of the reinforcement 40. The reinforcement 40 is symmetrical with respect to the centerline O and with respect to the partition wall 42.

Figure 9:
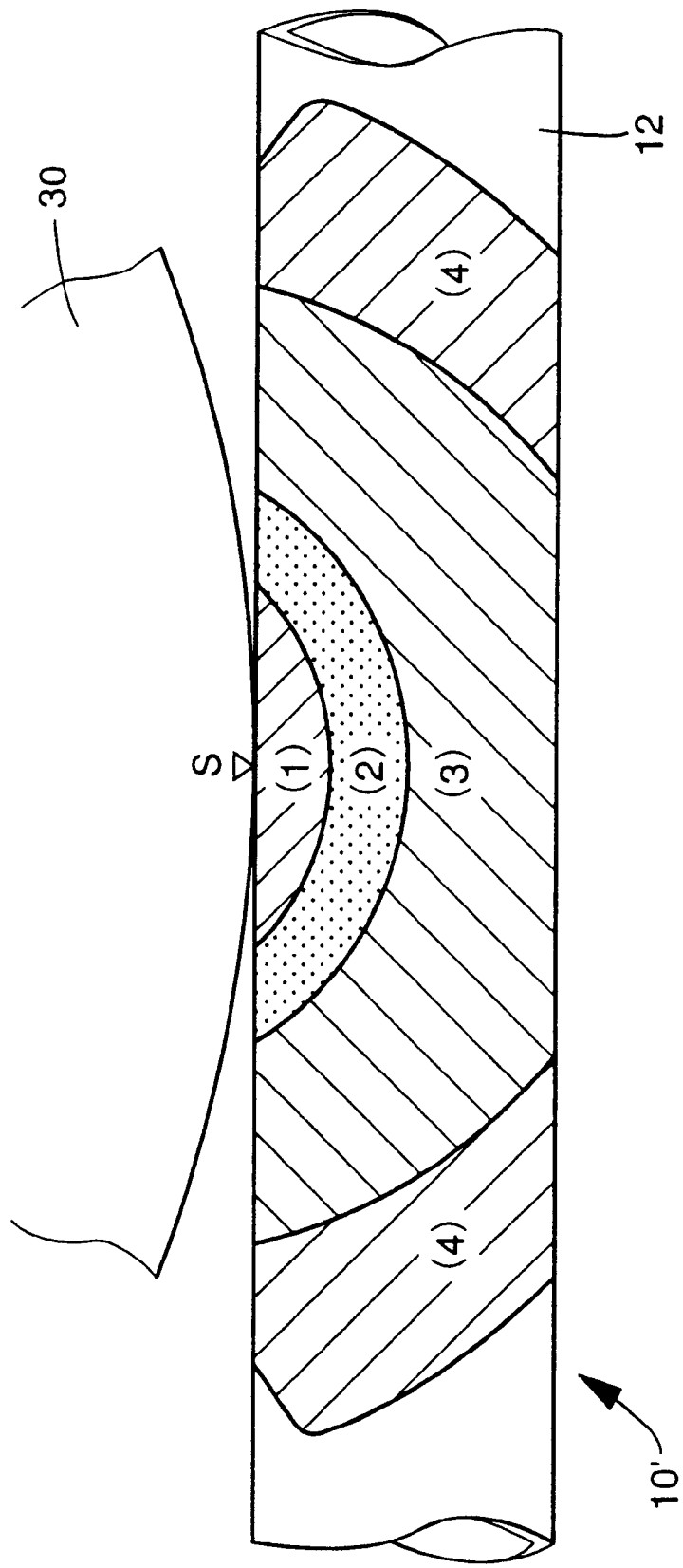
FIG. 9 is a view indicating a stress distribution on an impact beam not provided with a reinforcement, which was obtained by FEM (finite-element method) analysis when the impact beam was subjected to a load.
Figure 10:
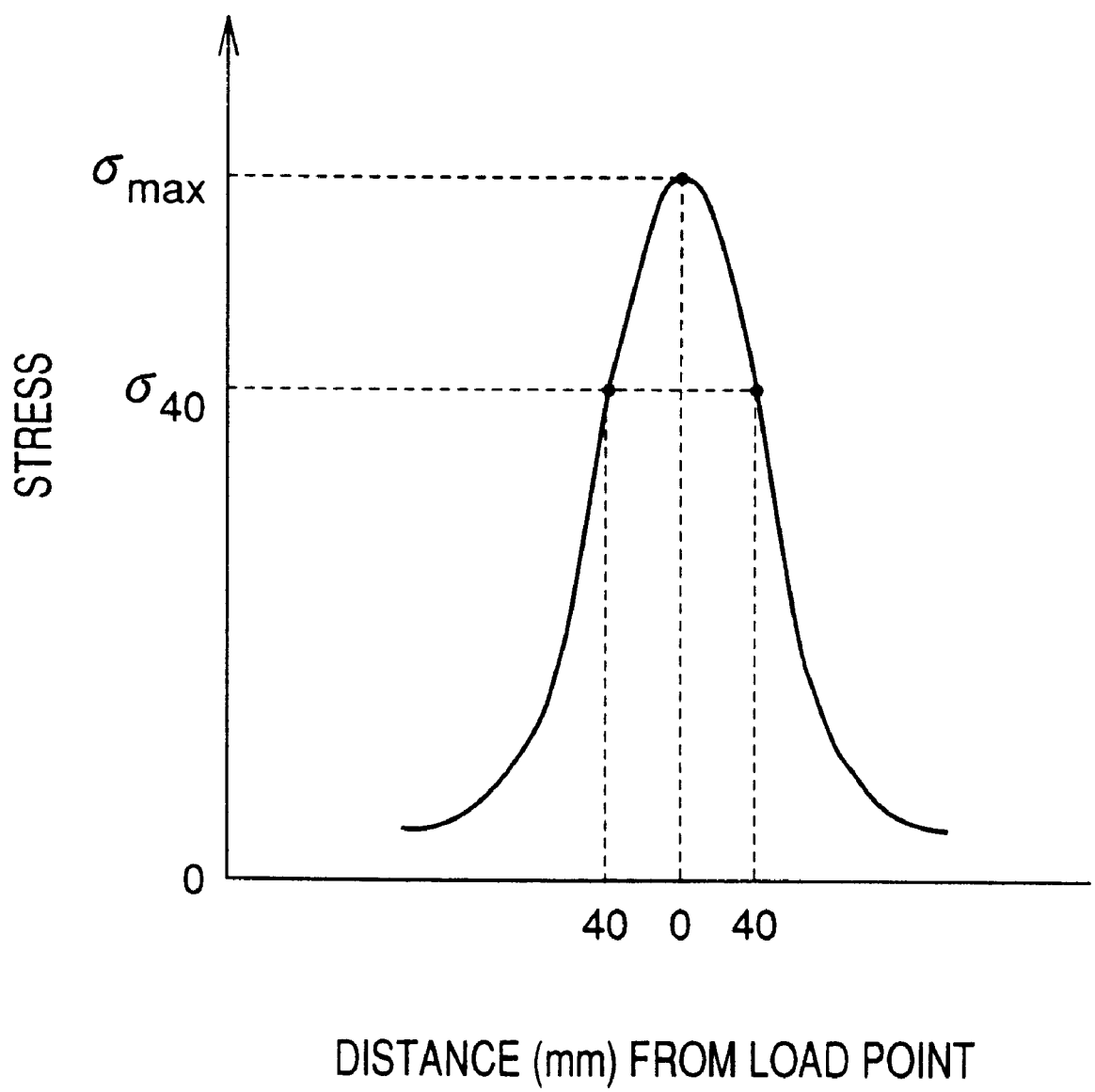
FIG. 10 is a graph indicating the stress distribution of FIG. 9, with respect to a distance from a point of application of the load at which a maximum stress value amax was obtained.

FIG. 9 shows a stress distribution on an impact beam 10' which consists of the tubular body portion 12 and the fixing portions 14 but does not include any reinforcement. This stress distribution was obtained by a FEM (finite-element method) analysis when the end face of the pendulum 30 was forced onto the impact beam 10', at the longitudinal center point S, as in the bending test of FIG. 4. In this stress distribution, the stress continuously decreases in the opposite longitudinal directions of the impact beam 10', with an increase in the distance from the load application point (S), as indicated at (1) through (4) in FIG. 9. The stress has a maximum value σmax at the load application point or center point S, as indicated in the graph of FIG. 10. In this graph, the distance (mm) from the load application point S is taken along the abscissa (right and left direction in FIG. 9), while the value of the stress on the upper side of the impact beam 10' is taken along the ordinate. It will be understood from the graph of FIG. 10 that the stress non-linearly changes with the distance from the load application point S. The radius of curvature of the opposite part-spherical surfaces of the partition wall 42 of the reinforcement 40 is determined so that the bending strength or rigidity of the impact beam provided with the reinforcement 40 follows the stress distribution of FIG. 10 as much as practical.

The reinforcement 40 is formed of an aluminum alloy, more specifically, an aluminum alloy A5056, JIS, and has dimensions (mm) as indicated in FIG. 8 and a weight W of about 63 gf. Like the reinforcement 16 of FIG. 2(a), the reinforcement 40 is formed by machining and fixed by press fitting within the tubular body portion 12, at the longitudinal center point S of the body portion 12.

Like the reinforcement 16 used in the first and second embodiments of FIGS. 2 and 6, the reinforcement 40 according to the third embodiment of FIG. 8 gives an increased buckling resistance around the longitudinal center point S of the body portion 12 of the impact beam, while preventing stress concentration near the opposite ends of the reinforcement 40, so that the bending strength of the impact beam is effectively improved to a practically satisfactory level, while minimizing the amounts of increase in the weight and cost of manufacture of the impact beam due to the use of the reinforcement 40. In particular, the use of an aluminum alloy considerably reduces the weight of the reinforcement 40, that is, to about a half that of the reinforcement 16 formed of a carbon steel. Further, the thick-walled portion in the form of the partition wall 42 whose wall thickness non-linearly changes provides an increased buckling resistance, while the decreasing-thickness portions 44 whose wall thickness linearly changes provides are comparatively easy to manufacture, like the decreasing thickness portions 20, 38.

Since the opposite part-spherical surfaces of the partition wall 42 are smoothly contiguous with the inner surfaces of the decreasing-thickness portions 44, the reinforcement 40 has a bending rigidity distribution similar to the stress distribution indicated in FIG. 10, so that the bending strength is most effectively increased while minimizing the amounts of increase in the weight and cost of the impact beam. In addition, the center of the curvature of each part-spherical surface of the partition wall 42 lies on the centerline O of the reinforcement 40, the partition wall 42 is comparatively easy to manufacture.

A bending test was conducted on the impact beam in which the reinforcement 40 rather than the reinforcement 16 is press-fitted in the tubular body portion 12. The test was conducted in the same manner used in the bending test of FIG. 4. The test of this impact beam showed a load-displacement relationship as indicated in the graph of FIG. 11. In this test in which the holes 14b in the fixing portions 14 were not filled, the fixing portions 14 were fractured at the open holes 14b when the displacement increased to 185.4 mm with the application of a load of 2944 kgf. As indicated in row No. 2 of the table of FIG. 24, the amount of energy absorption by the impact beam at the maximum load (maximum displacement of 2944 kgf) was 265.3 kgf·m, and the average load was 1431.0 kgf. The maximum load values in FIG. 24 corresponds to the bending strength.

Although the reinforcement 40 of FIG. 8 is formed by machining, it may be formed by cold forging as shown in FIGS. 12(a) and 12(b). The cold forging is effected by using a forging die 46 which has a forming hole 48 having an inside diameter substantially equal to the outside diameter of the reinforcement 40. The forging die 46 is adapted to receive a knock-out 52 and a punch 56 in a bottom portion of the forming hole 48, as indicated in FIG. 12(a). The knock-out 52 has an outer forming surface 50 which is formed so as to follow the part-spherical surface of the partition wall 42 and the inner circumferential surface of the decreasing-thickness portion 44. The knock-out 52 is vertically movable in the forming hole 48. The forging die 46 is further adapted to receive a punch 56 in an upper portion of the forming hole 48. The punch 56 has a forming surface 54 identical with the forming surface 50 of the knock-out 52, as indicated in FIG. 12(b). In a forging operation, the punch 56 is lowered into the forming force 48, to a predetermined lower stroke end thereof toward the knock-out 52 held in a predetermined position.

To form the reinforcement 40 by cold forging, a solid cylindrical blank 58 of aluminum alloy A5056, JIS whose outside diameter and volume (mass) are substantially equal to those of the reinforcement 40 is inserted into the forming hole 48 of the forging die 46, while the punch 56 is located at a fully retracted position above the die 46 and the knock-out 52 is located at the predetermined position, as indicated in FIG. 12(a). The blank 58 is subjected to a bonderizing or other treatment as needed, before the forging operation. In the state of FIG. 12(a), the punch 56 is lowered to its lower stroke end within the forging hole 48, with the forming surface 54 facing the blank 58, so that the blank 58 is forged between the forming surfaces 50, 54 of the knock-out 52 and punch 56, as indicated in FIG. 12(b), whereby the reinforcement 40 is formed. Then, the knock-out 52 is moved upward, forcing the formed reinforcement 40 out of the forming hole 48. While the blank 58 may be forged into the reinforcement 40 by a single forging action, two or more forging actions may be performed to forge the blank 58 into the reinforcement 40. If necessary or desired, the reinforcement as forged may be subjected to a finish machining operation.

The cold forging operation to manufacture the reinforcement 40 is easier and less costly than a machining operation, and ensures a higher mechanical strength, making it possible to reduce the required wall thickness of the reinforcement 40, thereby resulting in a reduced weight of the reinforcement 40. Further, since the reinforcement 40 is shaped with its wall thickness continuously decreasing in the opposite axial directions from the partition wall 42 toward the opposite ends of the reinforcement 40, the forging operation can be easily achieved with relatively small loads acting on the forging die 46, punch 56, etc. This leads to a prolonged life of the forging die 46, and a reduced number of forging actions required for forging the cylindrical blank 58 into the reinforcement 40. The forging operation is further facilitated by the use of an aluminum alloy material which flows relatively easily during the forging operation.

Figure 13:
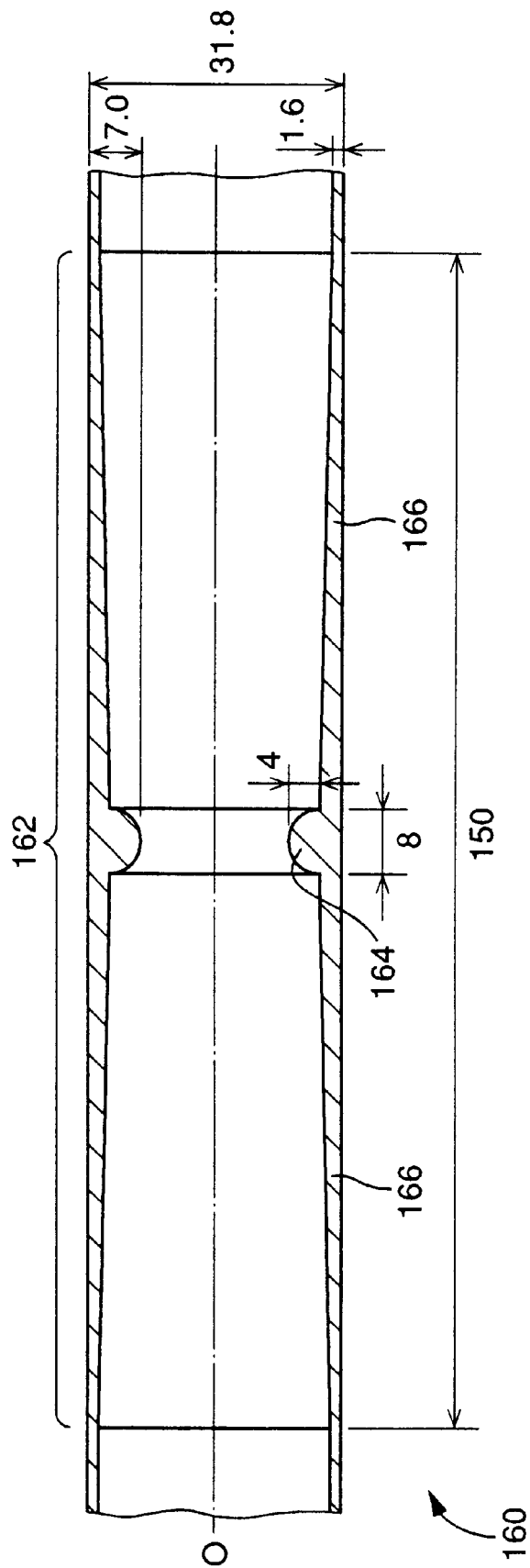
FIG. 13 is a longitudinal cross sectional view of an impact beam of a side door of a motor vehicle, which impact beam is constructed according to a still further embodiment of this invention and which has an integrally formed reinforcement portion, the view being taken in a place including a centerline O of the impact beam.

Referring to FIG. 13, there is shown an impact beam 160 for a side door of a motor vehicle, in cross section taken in a plane including the centerline O of the impact beam 160. This impact beam 160, which is constructed according to a fourth embodiment of the invention, is a generally tubular member including a reinforcement portion 162 integrally formed as a longitudinally central portion thereof. The reinforcement portion 162 has an annular projection 164 formed on the inner circumferential surface, at a longitudinally central part thereof. This annular projection 164 has a semi-circular shape in cross section as shown in FIG. 13. The reinforcement portion 162 further has two decreasing-thickness portions 166, 166 on the opposite sides of the annular projection 164. The inner circumferential surface of each decreasing-thickness portion 166 is tapered such that the wall thickness of the decreasing-thickness portion 166 is maximum at one end thereof adjacent to the annular projection 164 and linearly decreases in the axial direction from the above-indicated one end to the other end. In this embodiment, the reinforcement portion 162 has a length of about 150 mm, and the impact beam 160 has an outside diameter of about 31.8 mm. The wall thickness of the impact beam 160 at its portions other than the reinforcement portion 162 is about 1.6 mm. The wall thickness of the reinforcement portion 162 at the axial center of the annular projection 164 is about 7.0 mm. That is, the radial dimension from the outer circumferential surface of the impact beam 160 to the tip of the annular projection 164 is about 7.0 mm. The annular projection 164 has a radius of curvature of about 4 mm. Like the tubular body portion 12 of the impact beam 10, the impact beam 160 is formed from a steel plate having a high tensile strength.

Figure 14:
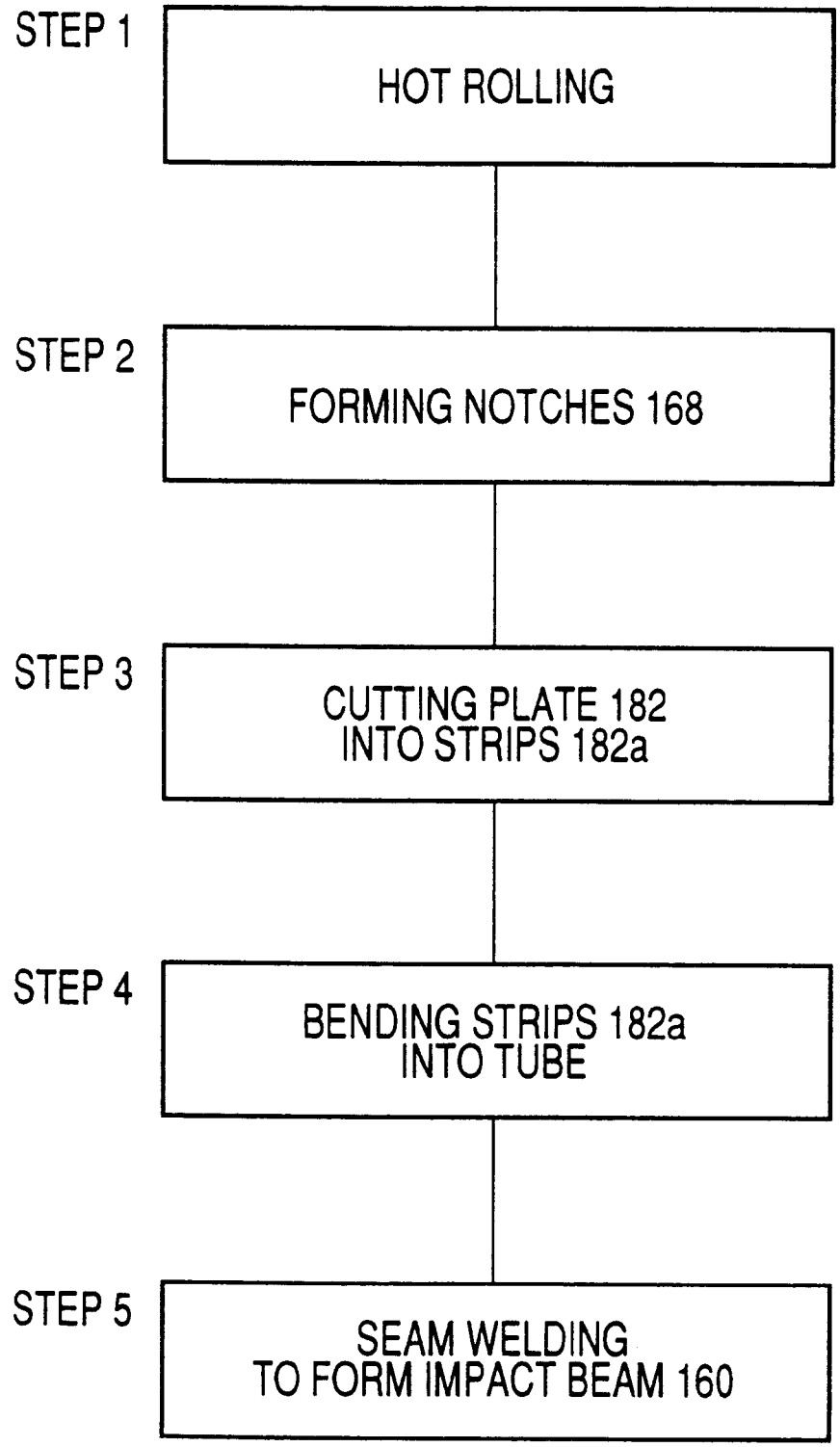
FIG. 14 is a view for explaining process of manufacturing the impact beam of FIG. 13.
Figure 15:
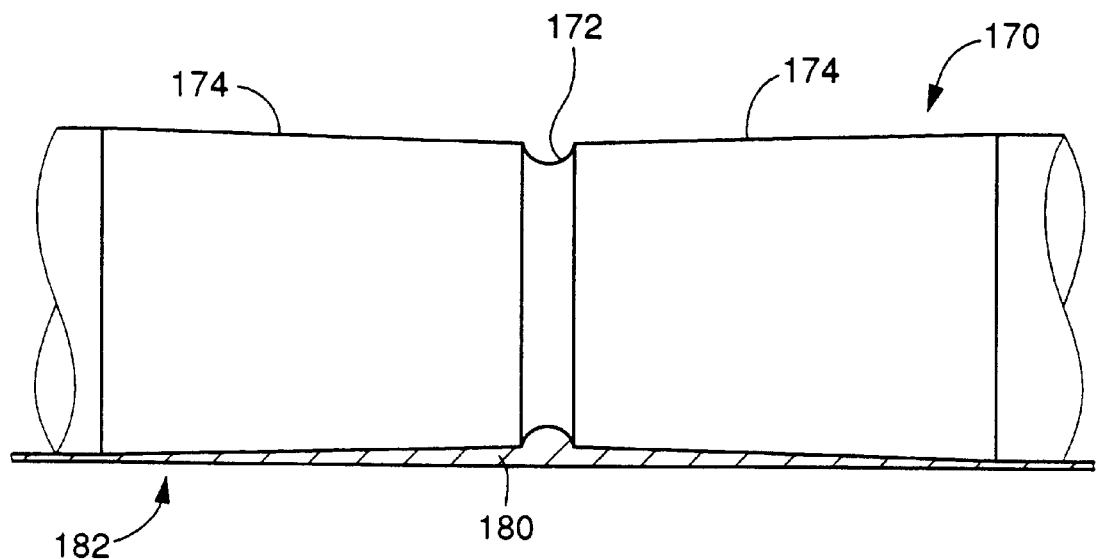
FIG. 15 is a view for explaining step 1 (hot rolling step) in the process of FIG. 14.

An example of a process of manufacturing the impact beam 160 will be described by reference to the flow chart of FIG. 14. The process is initiated with step 1 in which a blank is hot-rolled by a rolling roller 170, into a plate 182 which corresponds to a plurality of developments of the impact beam 160 along a straight line parallel to the axis or centerline O. As shown in FIG. 15, the plate 182 has a changing-thickness portion 180 corresponding to the reinforcement portion 162. The changing-thickness portion 180 has the same thickness variation as the wall thickness variation of the reinforcement portion 162. The roller 170 has an annular groove 172 formed in a longitudinal central part thereof, and a pair of tapered portions 174 formed on the opposite sides of the annular groove 172. The annular groove 172 has a semi-circular shape in cross section, and each tapered portion 174 has an outside diameter which continuously increases in the axial direction from the annular groove 172 toward its end remote from the annular groove 172.

Figure 16:
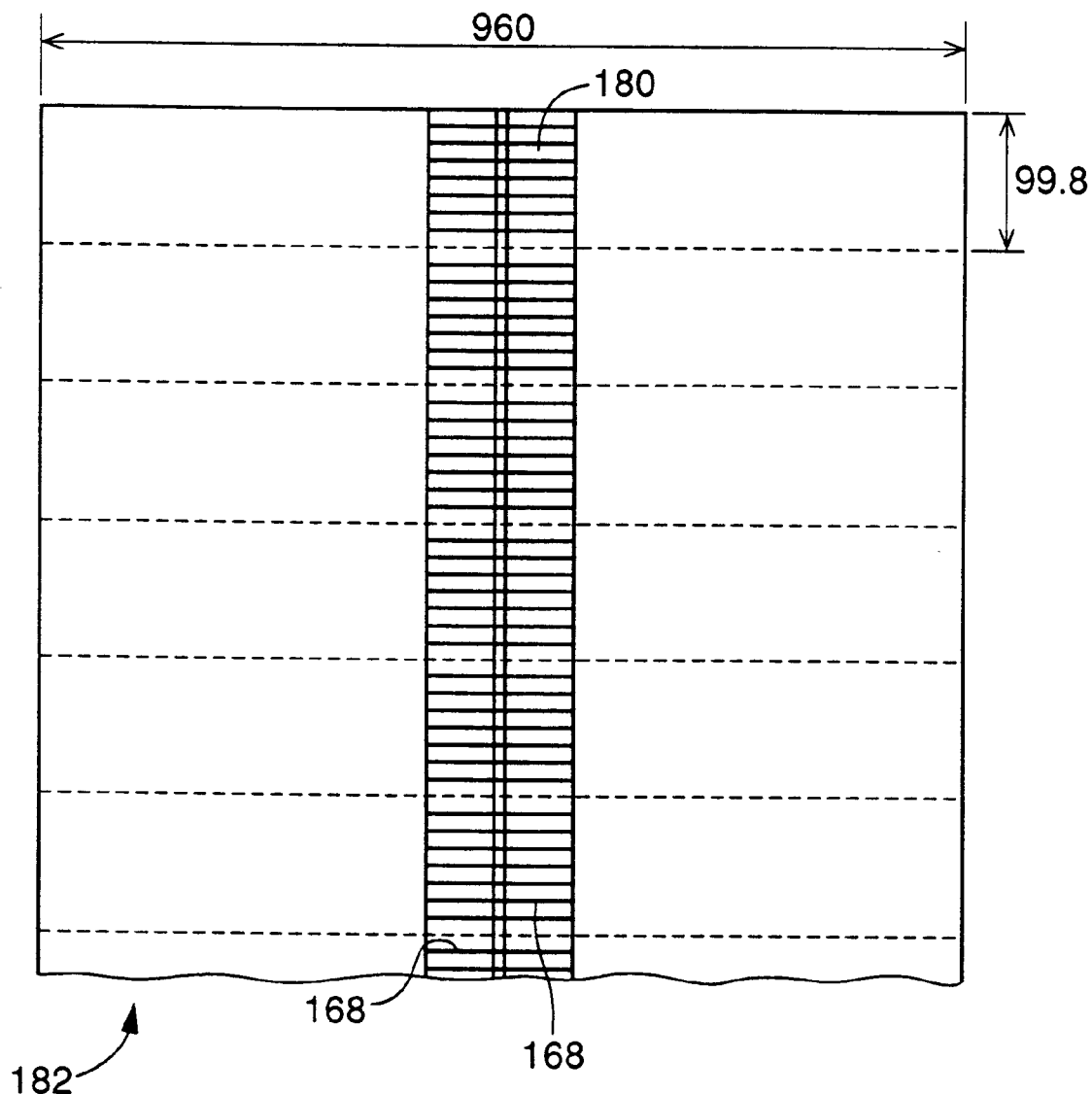
FIG. 16 is a view for explaining step 3 (cutting step) in the process of FIG. 14.

In the next step 2, a plurality of parallel notches 168 are formed, as shown in FIG. 16, in the surface of the changing-thickness portion 180 of the plate 182, which surface was shaped by the roller 170 in the roller step 1. The notches 168 are formed at a predetermined interval in the changing-thickness portion 180, by a notching roller having a plurality of blades or teeth for forming the notches 168. The blades or teeth are formed so as to extend in the axial direction of the notching roller, and the notching roller is disposed downstream of the rolling roller 170 such that the axes of the rolling and notching rollers are parallel to each other. With these rollers rotated synchronously with each other, the notching step 2 to form the notches 168 in the changing-thickness portion 180 of the plate 182 is performed following the rolling step 1 in which the plate 182 is formed by the rolling roller 170. The notches 168 may be formed after the plate 182 is cut in the following step 3 into elongate strips 182a. In this case, the notches 168 may be formed in each strip 182a by a rotary cutter, for example.

In the step 3, the plate 182 in which the notches 168 have been formed in the step 2 is cut by a suitable cutter, along parallel cutting lines at a predetermined interval, for example, at an interval of 99.8 mm, as indicated in FIG. 16. Thus, the plate 182 is cut into a plurality of elongate strips 182a, one of which is shown in FIGS. 17(a), 17(b) and 17(c) taken long line 17(c)—17(c) of FIG. 17(a), the notches 168 are grooves which have a V shape in cross section. The angle of the V-grooves 168 is determined so that the opposed surfaces of each V-groove 168 come into contact with each other when the elongate strip 182a is formed into a tube in the following step 4.

In the step 4, each elongate strip 182a is first subjected to a bending operation on a press so that the strip 182a is formed into a U-shaped structure. Then, the U-shaped structure is subjected to a bending operation so that the U-shaped structure is formed into a tube wherein the opposite long-side edges of the strip 182a are butted together, while the opposite surfaces of each V-grooves notch 168 contact each other. Then, step 5 is implemented to effect seam welding along the butted edges of the tube. This seam welding may be effected by arc welding, for example. Thus, the impact beam 160 having the integrally formed reinforcement 162 at its longitudinally central portion is manufactured. The impact beam 160 may be subjected to a suitable heat treatment such as hardening or annealing.

The impact beam 160 having the integral reinforcement portion 162 does not require a bonding adhesive such as a resin material for fixing the reinforcement portion 162, and accordingly has an increased mechanical strength and a reduced weight. Further, the number of the required process steps is significantly reduced and the cost of manufacture of the impact beam 160 is accordingly reduced.

Figure 18:
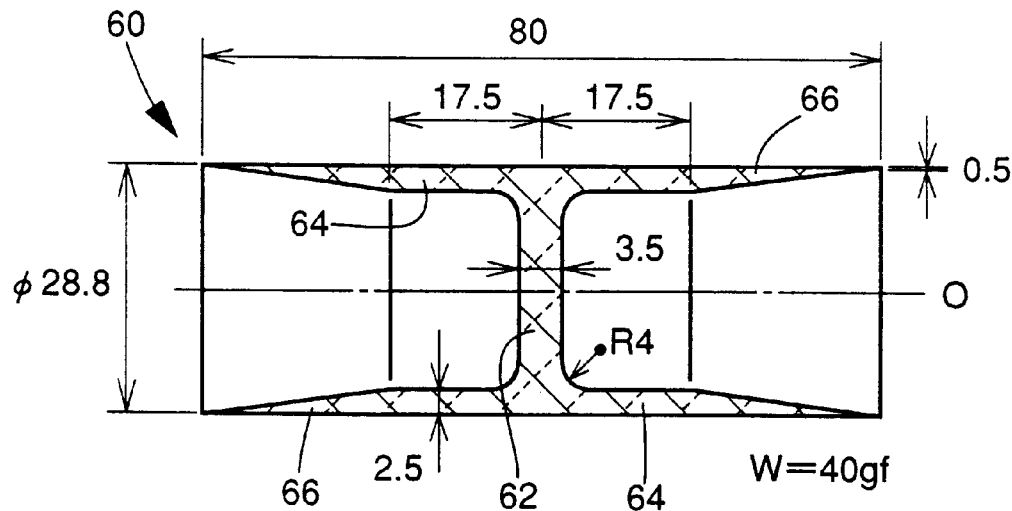
FIG. 18 is a longitudinal cross sectional view of a reinforcement according to a yet further embodiment of the invention, the view being taken in a plane including a centerline O of the reinforcement.

Referring to FIG. 18, there will be described a reinforcement 60 according to a fifth embodiment of this invention. Like the reinforcement 16 of the first embodiment, the reinforcement 60 consists of a thick-walled portion in the form of a solid partition wall 62, two constant-thickness portions 64 and two decreasing-thickness portions 66. The reinforcement 60 is formed of an aluminum alloy, that is, more specifically, alloy A5056, JIS, and has dimensions (mm) as indicated in FIG. 18. The reinforcement 60 has a weight W of about 40 gf. Like the reinforcement 16, the reinforcement 60 is formed by machining, and is press-fitted within the tubular body portion 12, at the longitudinally center point S. The reinforcement 60 is symmetrical with respect to the centerline O and with respect to the partition wall 62.

The reinforcement 60 of this fifth embodiment has substantially the same advantage as the reinforcement 16 of the first embodiment. In addition, the reinforcement 60 formed of an aluminum alloy such that the wall thickness values of the portions 62, 64, 66 are reduced to the minimum values required to assure the desired bending strength, so that the impact beam 60 has the weight W as small as about 40 gf.

Figure 19:
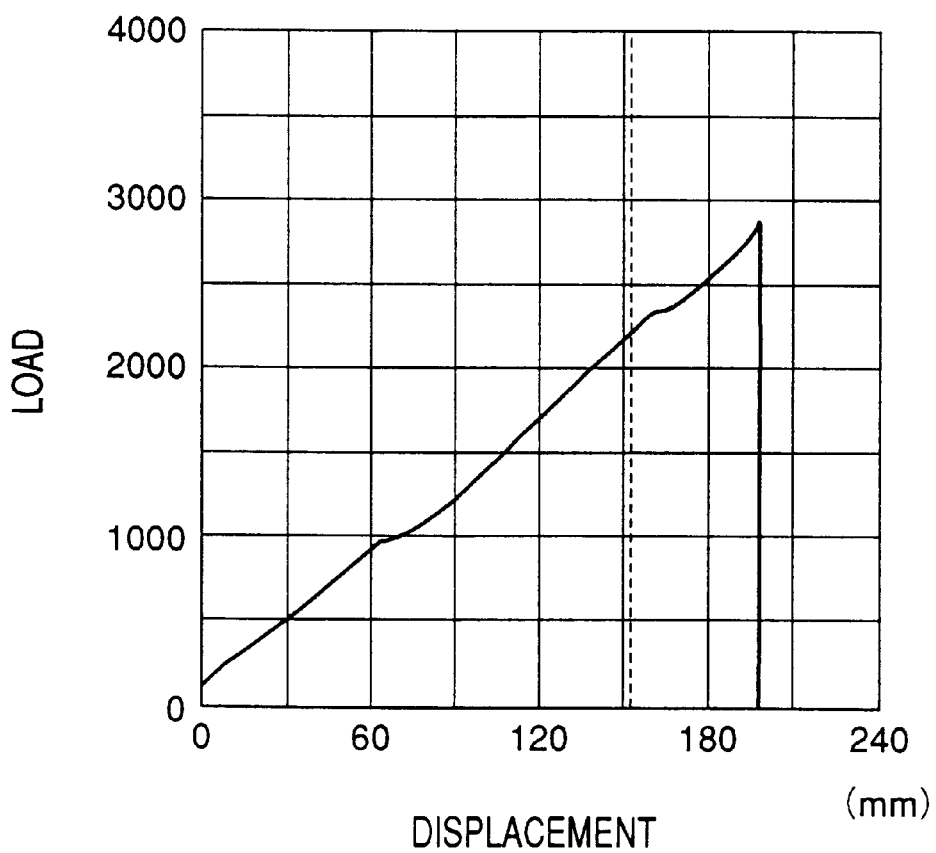
FIG. 19 is a view indicating a load-displacement relationship obtained as a result of a bending test on the reinforcement of FIG. 18.

A bending test was conducted on the impact beam in which the reinforcement 60 rather than the reinforcement 16 is press-fitted in the tubular body portion 12. The test was conducted on the testing apparatus of FIG. 4. The test of this impact beam showed a load-displacement relationship as indicated in the graph of FIG. 19. In this test, the support members 24 of the testing apparatus were fixed by the bolts 29 to the surface plate 26 such that the U-shaped openings of the support members 24 were open outwardly of the apparatus. The support members 24 were fractured at their portions welded to the reinforcing plates 28, when the displacement increased to 196.7 mm with the application of a load of 2833 kgf. As indicated in row No. 3 of the table of FIG. 24, the amount of energy absorption by the impact beam at the maximum load (maximum displacement of 2833 kgf) was 276.5 kgf·m, and the average load was 1405.7.0 kgf. The length of the welded sections 12a of the body portion 12 was 500 mm.

Figure 20:
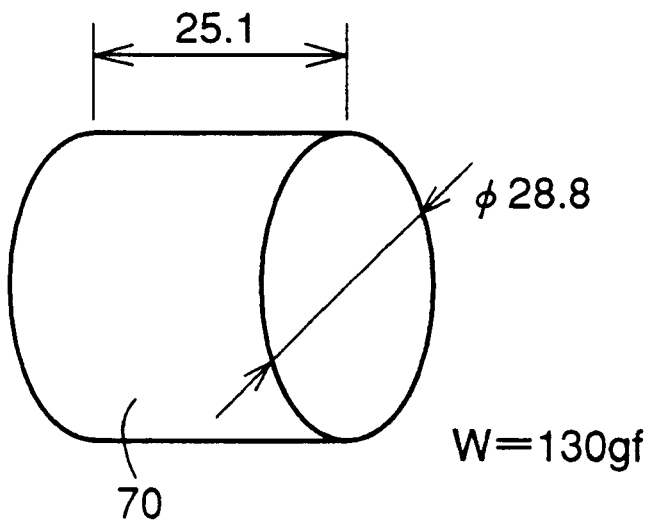
FIG. 20 is a perspective view of a cylindrical solid reinforcement as a comparative example, which has substantially the same weight of the reinforcement of FIG. 3.
Figure 21:
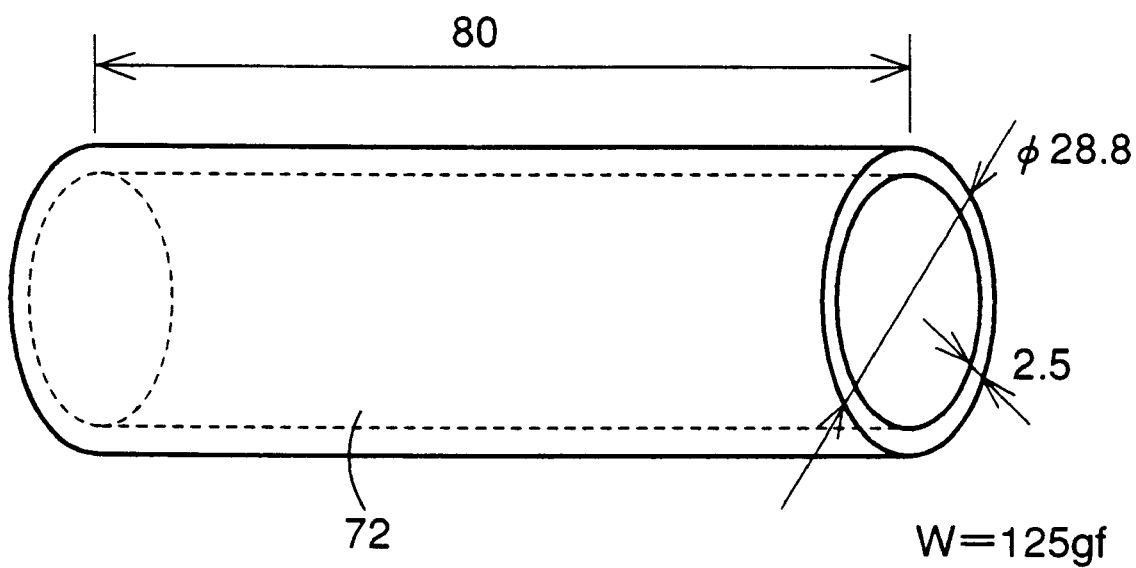
FIG. 21 is a perspective view of a tubular reinforcement as another comparative example, which has substantially the same weight of the reinforcement of FIG. 20.

Reference is now made to FIGS. 20 and 21 showing comparative reinforcements 70 and 72. The reinforcement 70 shown in FIG. 20 is a solid cylindrical member, while the reinforcement 72 shown in FIG. 21 is a tubular member. The reinforcements 70, 72 are both formed of carbon steel S45C, JIS, and have the dimensions as indicated in FIGS. 20 and 21, so that these two reinforcements 70, 72 have substantially the same weight W as the reinforcement 16.

Figure 22:
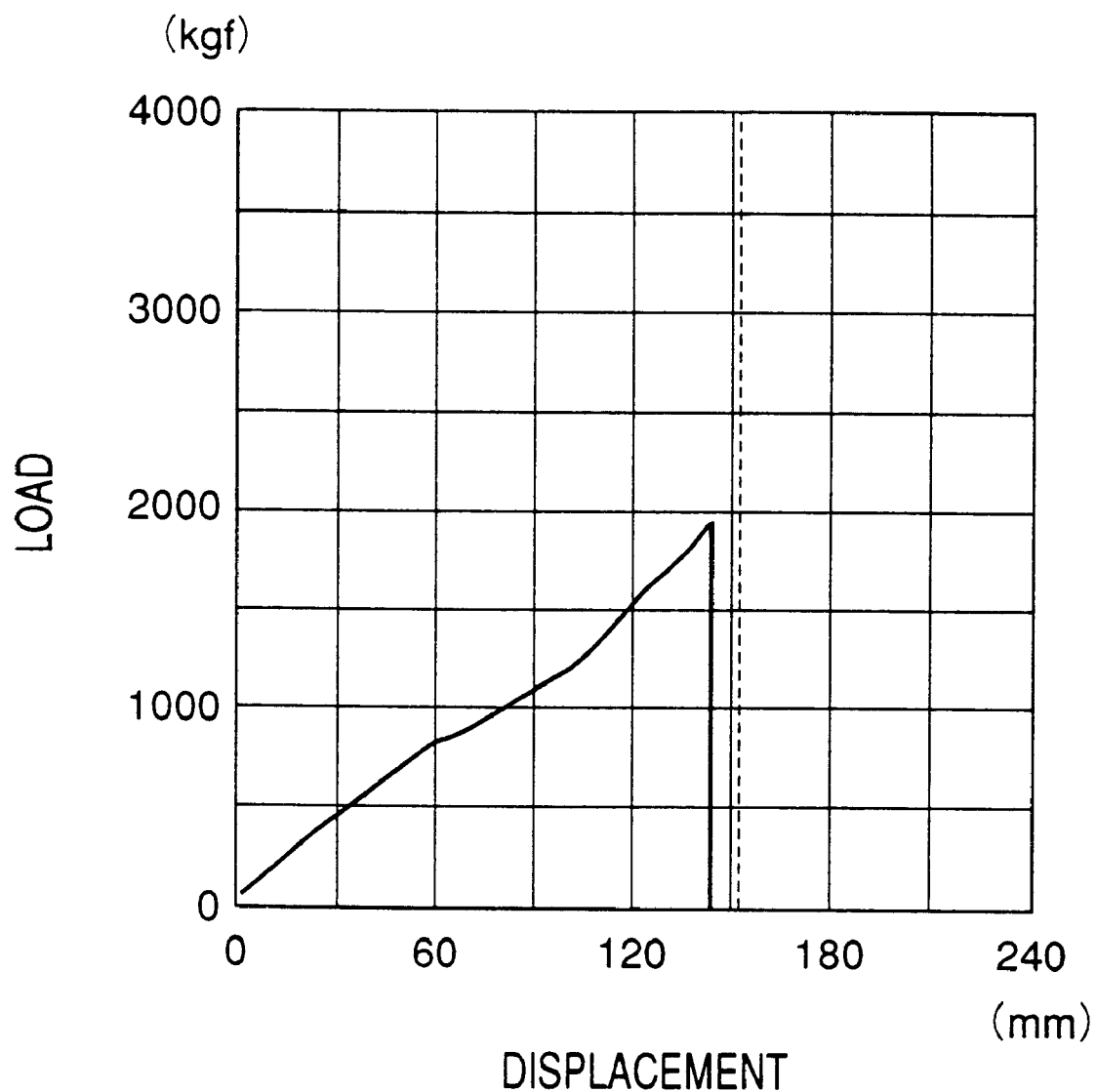
FIG. 22 is a view indicating a load-displacement relationship obtained as a result of a bending best on the comparative reinforcement of FIG. 20.
Figure 23:
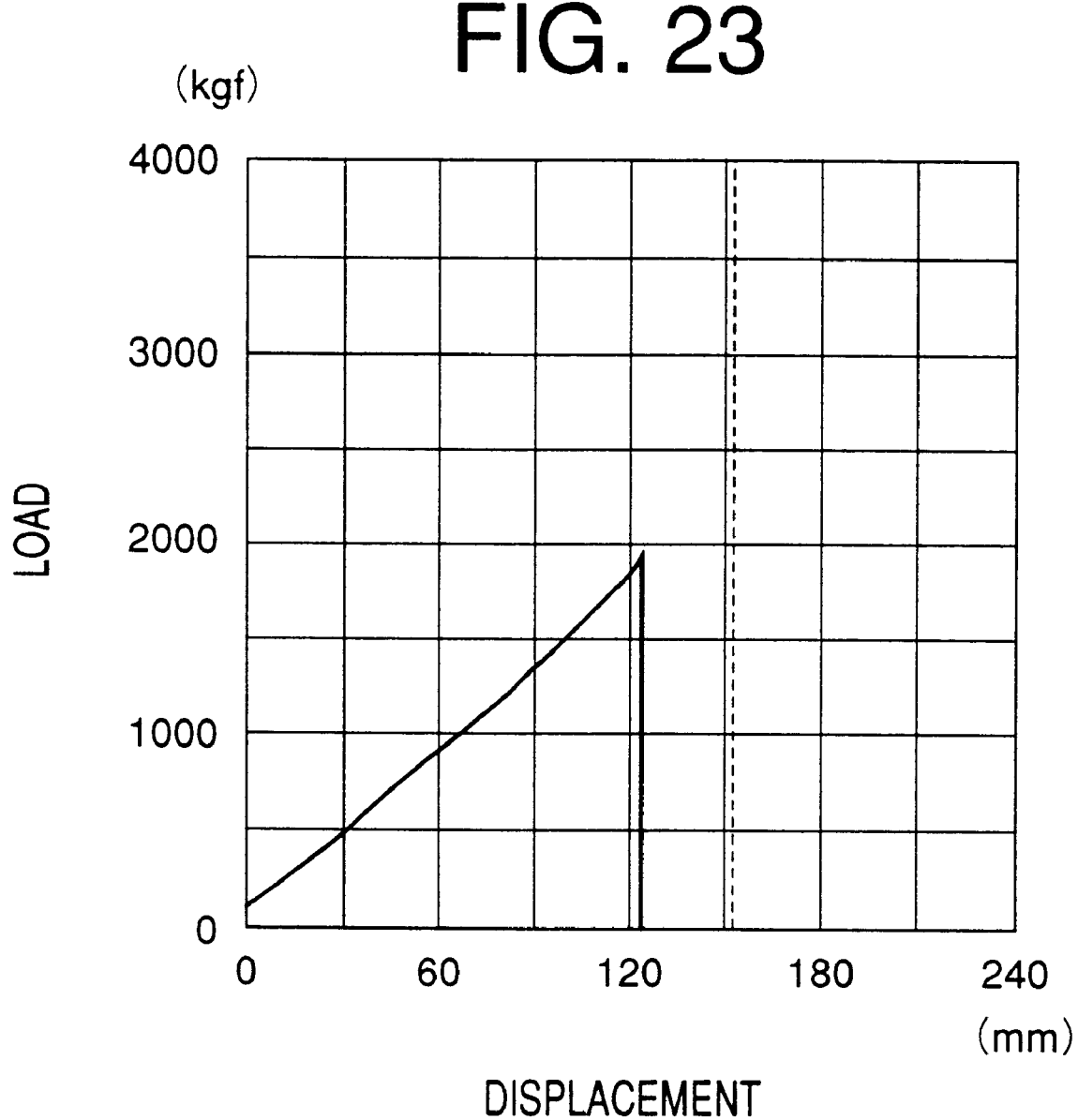
FIG. 23 is a view indicating a load-displacement relationship obtained as a result of a bending test on the comparative reinforcement of FIG. 21.

Bending tests were also conducted on the impact beams in which the reinforcements 70, 72 rather than the reinforcement 16 were press-fitted in the tubular body portion 12. The tests were conducted in the same manner as in the test of FIG. 4. The tests showed load-displacement relationships as indicated in the graphs of FIGS. 22 and 23, respectively. The two impact beams were both fractured due to stress concentration near the ends of the reinforcement 70, 72. The reinforcement 70 had a maximum displacement of 143.0 mm and a maximum load of 1958 kgf, while the reinforcement 72 had a maximum displacement of 121.9 mm and a maximum load of 1876 kgf. As indicated in rows Nos. 4 and 5 of the table of FIG. 24, the amounts of energy absorption by the impact beams at the maximum load were 131.9 kgf·m (reinforcement 70) and 112.3 kgf·m (reinforcement 72), and the average load values were 922.3 kgf (reinforcement 70) and 921.2 kgf (reinforcement 72).

It will be understood that the maximum load value of the impact beam provided with the reinforcement 16 (indicated in the row No. 1 of FIG. 24) is about 1.7–1.8 times those of the impact beams provided with the reinforcements 70, 72, and that the energy absorption amounts of the former is about 2.4–2.8 times those of the latter. In this respect, it is noted that the reinforcement 16 is formed of the same material as the reinforcements 70, 72. It will also be understood that the maximum load values and the energy absorption amounts of the impact beams provided with the reinforcement 40 (indicated in the row No. 2) and the reinforcement 60 (indicated in the row No. 3) are considerably improved over those of the impact beams provided with the comparative reinforcements 70, 72.

Figure 25:
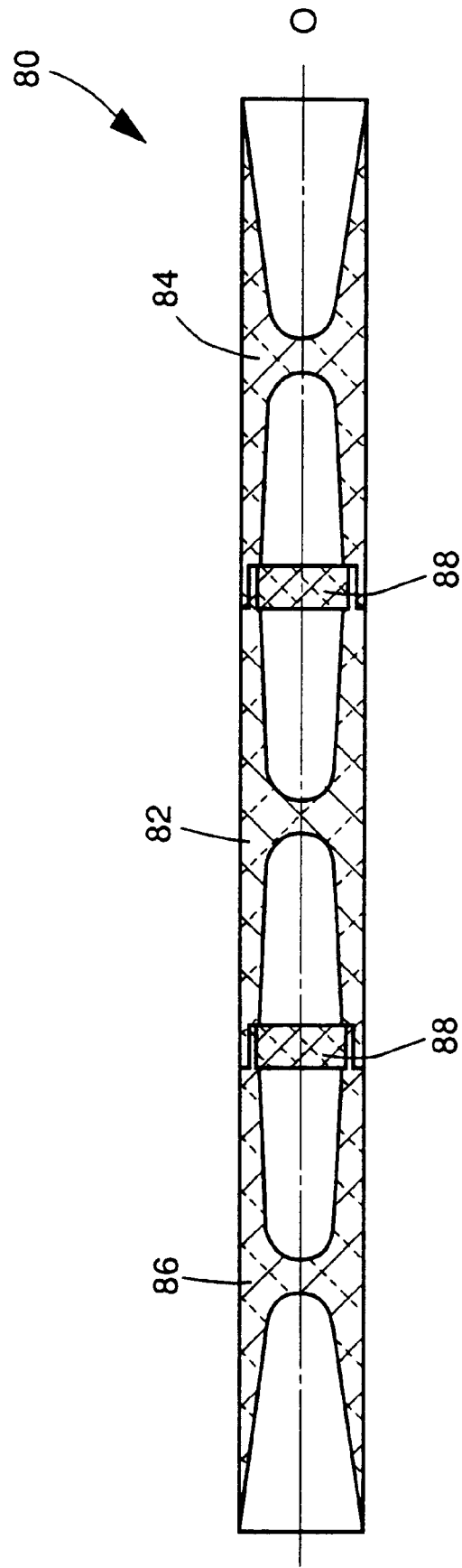
FIG. 25 is a longitudinal cross sectional view of a reinforcement according to still another embodiment of this invention, the view being taken in a plane including a centerline O of the reinforcement.
Figure 26A:
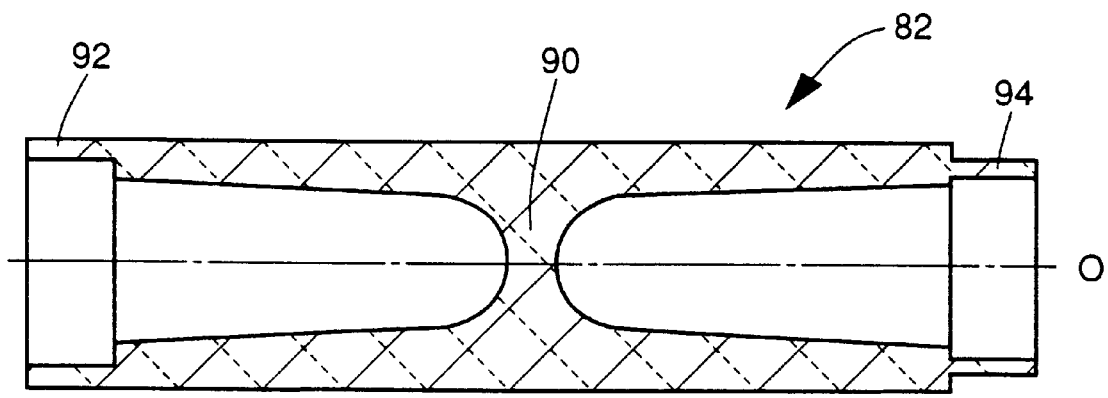
FIG. 26(a) is a longitudinal cross sectional view of a first piece of the reinforcement of FIG. 25, the view being taken in a plane including a centerline O of the reinforcement.
Figure 26B:
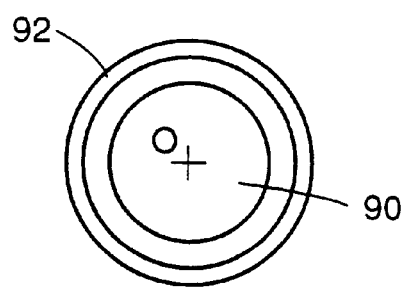
FIGS. 26(b) and 26(c) are end elevational views of the first piece of FIG. 26 taken in directions toward first and second engaging portions 92, 94 of the first piece, respectively.
Figure 26C:
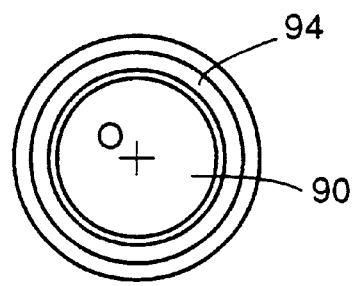

Referring to FIG. 25, there is shown a reinforcement 80 constructed according to a sixth embodiment of this invention, which consists of a first piece 82, a second piece 84, a third piece 86, and two auxiliary pieces 88 disposed at mutually engaging end portions of the three pieces 82, 84, 86. As shown in FIGS. 26(a), 26(b) and 26(c), the first piece 82 is a tubular member having an outside diameter substantially equal to the inside diameter of the tubular body portion 12. This tubular member includes a partition wall 90 at an axially central portion thereof, and a first engaging portion 92 at one of opposite axial ends thereof and a second engaging portion 92 at the other axial end. The first engaging portion 92 has an inside diameter substantially equal to an outside diameter of the second engaging portion 94. The partition wall 90 has opposite part-spherical surfaces each of which has a suitable curvature having a center lying on the centerline O of the first piece 80. The inner circumferential surfaces between the partition wall 90 and the first and second engaging portions 92, 94 are tapered such that the wall thickness continuously decreases in the opposite axial directions from the partition wall 90 toward the engaging portions 92, 94. Each of the engaging portions 92, 94 has an axial length of about 10 mm and a wall thickness of about 2 mm. The first piece 82 has an overall axial length of about 120 mm (including the lengths of the engaging portions 92, 94). The radius of curvature of each part-spherical surface of the partition wall 90 is about 8 mm. FIG. 26(a) is a longitudinal or axial cross sectional view taken in a plane including the centerline O, while FIGS. 26(b) and 26(c) are end elevational views taken in the opposite axial directions toward the first and second engaging portions 92, 94, respectively. While the portions between the partition wall 90 and the engaging portions 92, 94 are decreasing-thickness portions with the tapered inner circumferential surfaces, they may be constant-thickness portions having constant inner and outer diameters.

As shown in FIG. 27, the second piece 84 is also a tubular member having an outside diameter substantially equal to the inside diameter of the body portion 12. This tubular member includes a partition wall 96 at an axially central portion thereof, and a decreasing-thickness portion 98 on one side of the partition wall 96. The decreasing-thickness portion 98 has a tapered inner circumferential surface such that the wall thickness linearly decreases in the axial direction from the partition wall 96 toward one end of the second piece 84, at which the wall thickness is substantially zero. The partition wall 96 has opposite part-spherical surfaces each of which has a curvature having a center lying on the centerline O. One of these part-spherical surfaces is smoothly contiguous with the inner surface of the decreasing-thickness portion 98. The axial portion of the second piece 84 on the other side of the partition wall 96 (remote-from the decreasing-thickness portion 98) is identical in size and shape with the axial portion of the first piece 82 which includes the first engaging portion 92. This axial portion of the second piece 84 includes an engaging portion 100 identical with the first engaging portion 92. The engaging portion 100 is engageable with the second engaging portion 94 of the first piece 82 such that the inner circumferential surface of the engaging portion 100 is in substantially close contact with the outer circumferential surface of the engaging portion 94.

As shown in FIG. 28, the third piece 86 is also a tubular member paving an outside diameter substantially equal to the inside diameter of the body portion 12. This tubular member includes a partition wall 102 at an axially central portion thereof, and a decreasing-thickness portion 104 on one side of the partition wall 102. The decreasing-thickness portion 104 has a tapered inner circumferential surface such that the wall thickness linearly decreases in the axial direction from the partition wall 96 toward one end of the third piece 86, at which the wall thickness is substantially zero. The partition wall 102 has opposite part-spherical surfaces each of which has a curvature having a center lying on the centerline O. One of these part-spherical surfaces is smoothly contiguous with the inner surface of the decreasing-thickness portion 104. The axial portion of the third piece 84 on the other side of the partition wall 96 (remote from the decreasing-thickness portion 104) is identical in size and shape with the axial portion of the first piece 82 which includes the second engaging portion 94. This axial portion of the third piece 86 includes an engaging portion 106 identical with the second engaging portion 94. The engaging portion 106 is engageable with the first engaging portion 92 of the first piece 82 such that the outer circumferential surface of the engaging portion 106 is in substantially close contact with the inner circumferential surface of the engaging portion 92.

Each of the two auxiliary pieces 88 is a solid disk-shaped member having a circular cross sectional shape, as shown in FIGS. 29(a) and 29(b). These auxiliary pieces 88 are engageable with the inner surfaces of the second engaging portion 94 of the first piece 82 and the engaging portion 106 of the third piece 86, respectively.

The first, second and third pieces 82, 84, 86 and the auxiliary pieces 88 are all formed of an aluminum alloy, more specifically, an aluminum alloy A5056, JIS, by cold forging or machining. When the reinforcement 80 is assembled in the tubular body portion 12, the third piece 86 is initially forced into the body portion 12 with the decreasing-thickness portion 104 leading the other portions, until the engaging portion 106 is located close to the appropriate open end of the body portion 12. Then, one of the auxiliary pieces 88 is brought into engagement with the inner circumferential surface of the engaging portion 106 of the third piece 86, and the first engaging portion 92 of the first piece 82 is brought into engagement with the outer circumferential surface of the engaging portion 106. The first piece 82 is forced into the body portion 12, together with the third piece 86, until the second engaging portion 92 of the first piece 82 is located close to the open end of the body portion 12. Then, the other auxiliary piece 88 is brought into engagement with the inner circumferential surface of the second engaging portion 94 of the first piece 82, and the engaging portion 100 of the second piece 84 is brought into engagement with the outer circumferential surface of the second engaging portion 94 of the first piece 82. Finally, the second piece 84 is forced into the body portion 12, together with the first and third pieces 82, 86, until the reinforcement 80 consisting of the pieces 82, 84, 86, 88 is located at a predetermined axial position of the body portion 12.

Where the side door has a relatively large size and the body portion 12 of the impact beam is accordingly long, the reinforcement 80 may include two more more first pieces 82 connected to each other at the first and second engaging portions 92, 94.

In the reinforcement 80 assembled as shown in FIG. 25, the axial portion between the partition wall 96 of the second piece 84 and the partition wall 102 of the third piece 86 functions as a long thick-walled portion having a relatively high bucking resistance, and the decreasing-thickness portions 98, 104 at the opposite end portions of the reinforcement 80, which portions 98, 104 are effective to prevent stress concentration near the opposite axial ends of the reinforcement 80. Thus, the bending strength of the impact beam is effectively increased by the reinforcement 80. Further, a desired number of first pieces 82 can be connected to each other, so that bending strength of the impact beam can be improved over a desired length. In other words, the length of the reinforcement 80 can be adjusted by changing the number of the first pieces 82, depending upon the length of the tubular body portion 12 of the impact beam, which changes with the specific types or models of the vehicle.

Figure 30:
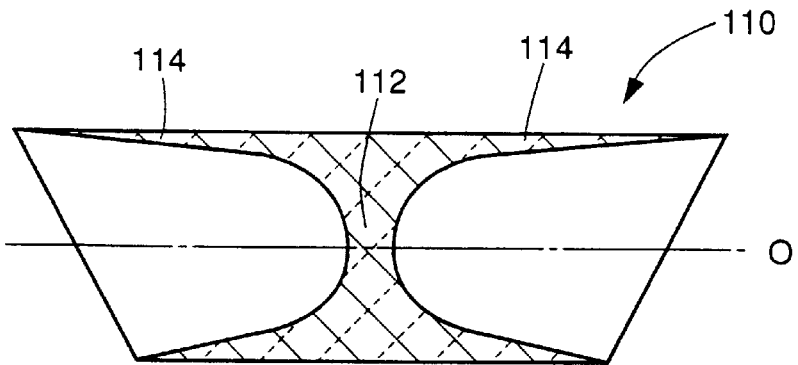
FIG. 30 through FIG. 34 are longitudinal cross sectional views of reinforcements according to further embodiments of this invention, each of these views being taken in a plane including a centerline O of the reinforcement.

A reinforcement 110 constructed according to a seventh embodiment of the invention is shown in FIG. 30. This reinforcement 110, which is basically similar in shape to the reinforcement 40, includes a thick-walled portion in the form of a partition wall 112, and decreasing-thickness portions 114, 114. However, the reinforcement 110 is asymmetric with respect to the centerline O. Namely, the reinforcement 110 has a shorter axial dimension at a lower part as seen in FIG. 30, in view of the stress distribution indicated in FIG. 9. The lower part of the reinforcement 110 is located on the laterally inner side of the vehicle when the impact beam provided with the reinforcement 110 is installed in the side door of the vehicle. Thus, the reinforcement 110 has a reduced weight, while assuring a sufficiently high bending strength with respect to a load which acts on the reinforcement 110 in the downward direction as seen in FIG. 30, that is, in the laterally inward direction of the vehicle.

Figure 31:
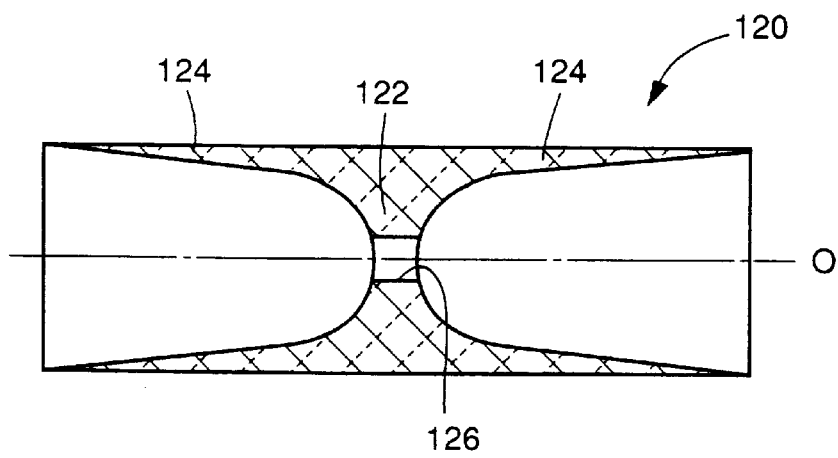

A reinforcement 120 according to an eighth embodiment of the invention is shown in. FIG. 31. This reinforcement 40, which is also basically similar in shape to the reinforcement 40, includes a thick-walled portion in the form of a partition wall 122, and decreasing-thickness portions 124. However, the partition wall 122 has a center through-hole 126, for optimizing the bending strength of the partition wall 122.

Figure 32:
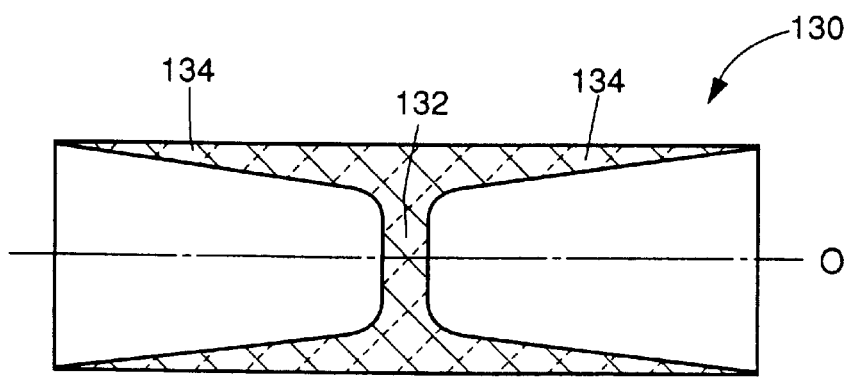

A reinforcement 130 according to a ninth embodiment of the invention is shown in FIG. 32. Like the reinforcement 16, the reinforcement 130 includes a constant-thickness partition wall 232. However, the reinforcement 130 does not have constant-thickness portions between the partition wall 122 and decreasing-thickness portions 134. That is, the decreasing-thickness portion 134 are formed so as to extend from the partition wall 132. The partition wall 132 and the decreasing-thickness portions 134 cooperate to define therebetween fillets having a suitable radius R of curvature.

Figure 33:
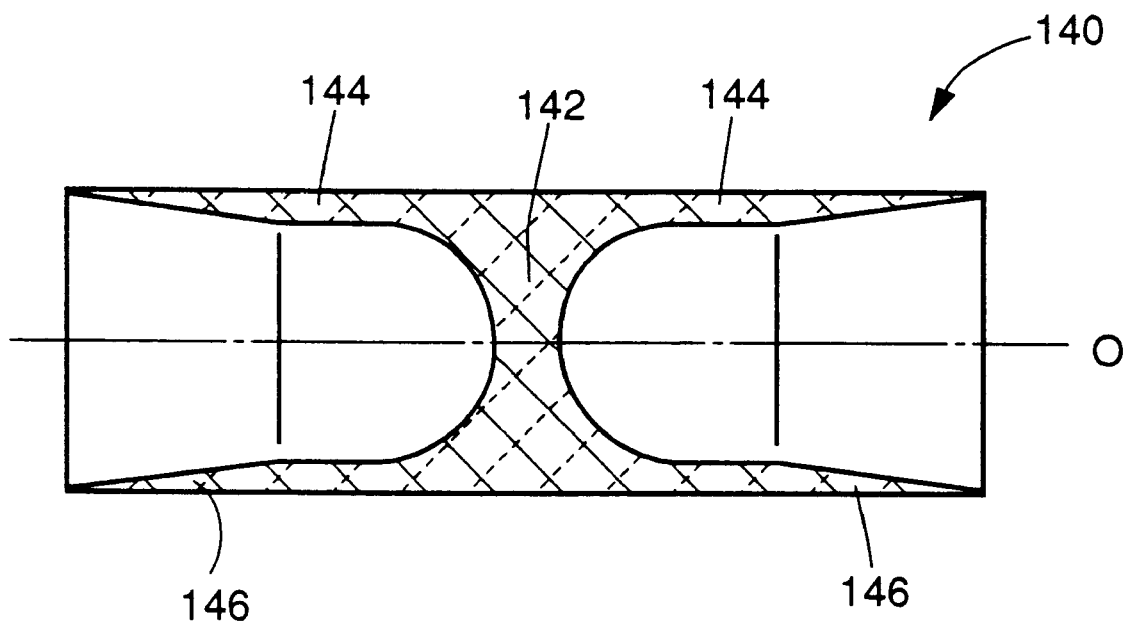

A reinforcement 140 according to a tenth embodiment of the invention is shown in FIG. 33. This reinforcement 140 includes a thick-walled portion in the form of a partition wall 142, constant-thickness portions 144 adjacent to the partition wall 142, and decreasing-thickness portions 146 adjacent to the constant-thickness portions 144. The partition wall 142 has opposite part-spherical surfaces each of which has a curvature having a center lying on the centerline O of the reinforcement 140. These part-spherical surfaces are smoothly contiguous with the inner surfaces of the constant-thickness portions 144.

Figure 34:
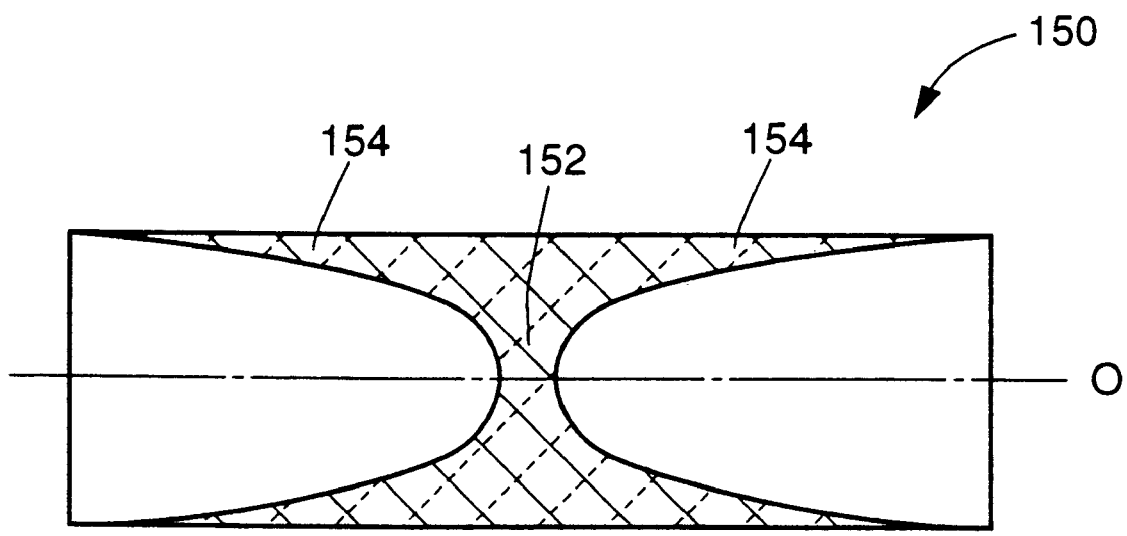

A reinforcement 150 according to an eleventh embodiment of the invention is shown in FIG. 34. This reinforcement 150 includes a thick-walled portion in the form of a partition wall 152, and decreasing-thickness portions 154. The partition wall 152 cooperates with the inner surface of each decreasing-thickness portions 154 to define a curvature corresponding to the stress distribution of FIG. 10, so that the wall thickness of the decreasing-thickness portion nonlinearly decreases in the axial direction from the partition wall 152 toward the corresponding end of the reinforcement 150, whereby the bending strength of the impact beam including this reinforcement 150 changes so as to follow the stress distribution of FIG. 10 as much as possible.

While the various reinforcements for the impact beams for side doors of motor vehicle have been described, there will be described various reinforcements for other tubular structural members for the vehicles, such as center pillars, side waists, side sills, front pillars, front cross members, front side members and bumper reinforcing beams.

Figure 35:
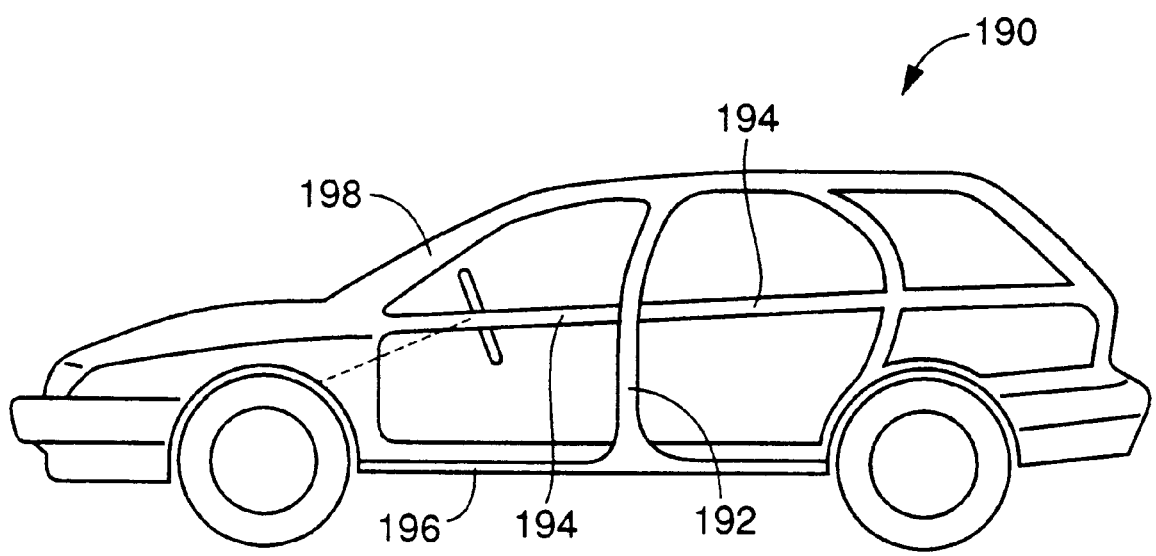
FIG. 35 is a side elevational view of a structural arrangement of a motor vehicle.

Referring to FIG. 35, there is schematically illustrated a structural arrangement of a motor vehicle 190, including center pillars 192, side door waists 194, side sills 196, and front pillars 198. The center pillars 192 extend in the vertical direction, on the opposite lateral sides and at a longitudinally middle portion of the vehicle 190. The side door waists 194 are provided on respective side doors so as to extend substantially horizontally, at a vertically middle portion of each side door. The side sills 196 extend in the horizontal direction from the lower ends of the center pillars 192, and the front pillars 198 are disposed at the laterally opposite ends of the front window of the vehicle 190.

Figure 36A:
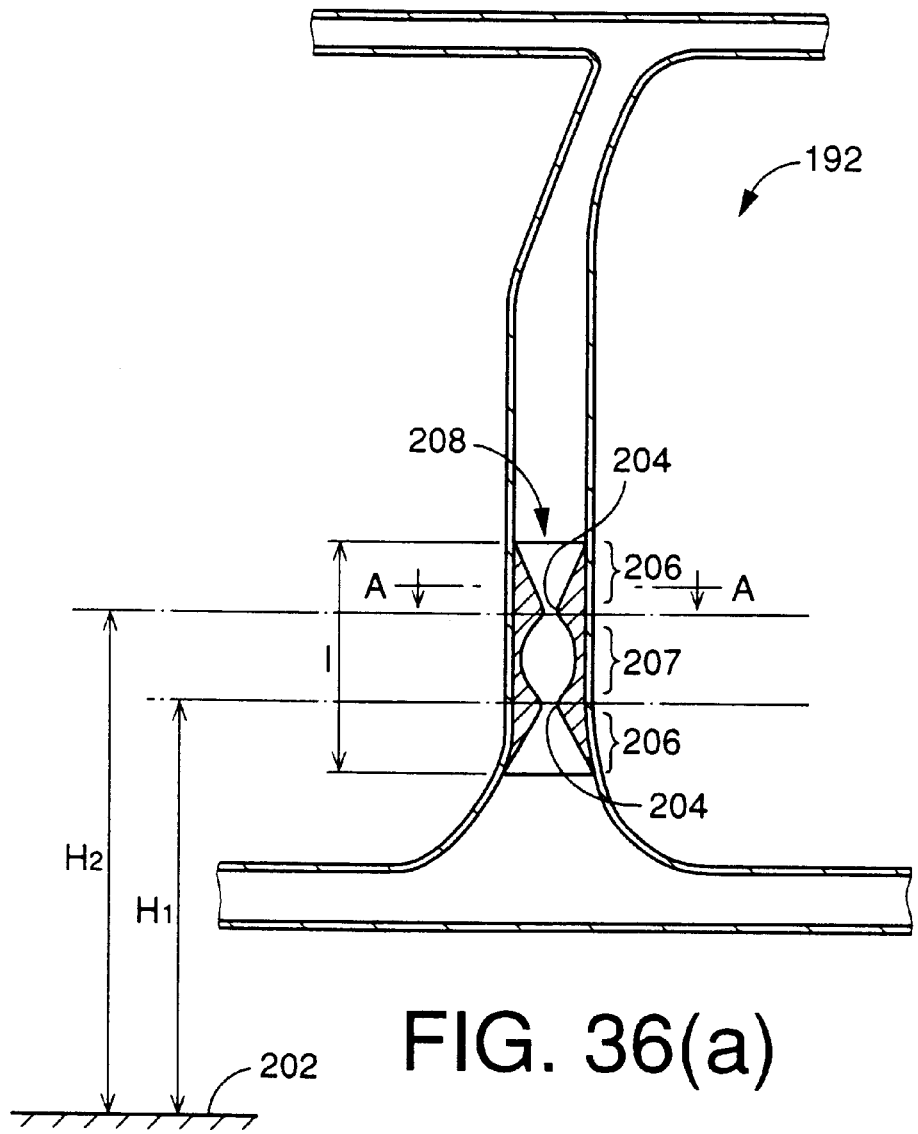
FIG. 36(a) is a longitudinal cross sectional view of a center pillar of the structure of FIG. 35.
Figure 36B:
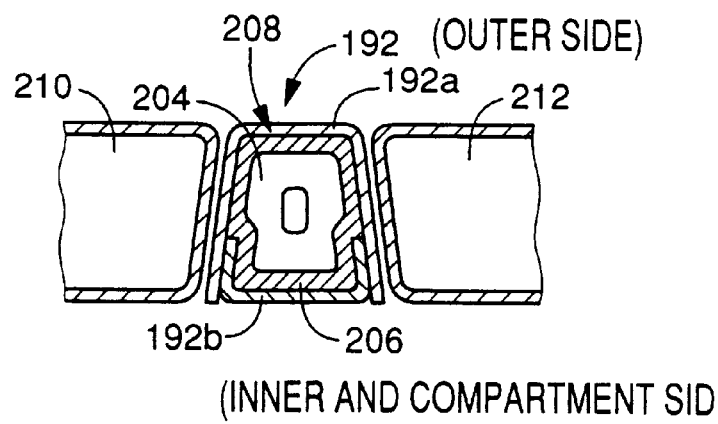
FIG. 36(b) is a transverse cross sectional view taken along line A—A of FIG. 36(a)

FIG. 36(a) is a longitudinal cross sectional view of the right-hand side center pillar 192 of the vehicle 190, while FIG. 36(b) is a cross sectional view taken along line A—A of FIG. 36(a). The center pillar 192, which is constructed according to a twelfth embodiment of this invention, is a hollow structural member which extends substantially vertically between a front side door 210 and a rear side door 212 and which has a substantially trapezoid shape in transverse cross section as shown in FIG. 36(b). The center pillar 192 includes a main panel 192a, and a reinforcing panel 192b which is fixed to the main panel 192a by welding, for example. The main panel 192a is a structural member which is formed integrally with the side sill 196 and which has a substantially U shape in transverse cross section and therefore has a U-shaped opening open in the laterally inward direction of the vehicle. The reinforcing panel 192b closes the U-shaped opening of the main panel 192a, and carries a belt anchor attached thereto.

The center pillar 192 further includes a reinforcement 208 disposed within a generally rectangular space defined by the panels 192a, 192b. The reinforcement 208 includes a pair of thick-walled portions 204 which extend inwardly to a position close to the center of the rectangular space. The reinforcement 208 is positioned relative to the panels 192a, 192b such that the two thick-walled portions 204 are located at respective heights H1 and H2 from a ground surface 202. The reinforcement further includes a pair of decreasing-thickness portions 206 as opposite upper and lower end portions thereof, and a decreasing-thickness portion 207 as an intermediate portion thereof between the thick-walled portions 204. Each decreasing-thickness portion 206 has a tapered inner surface so that the wall thickness linearly decreases in the upward or downward direction from the corresponding thick-walled portion 204 toward the upper or lower end of the reinforcement 208, at which the wall thickness is substantially zero. The decreasing-thickness portion 207 has an arcuate shape in longitudinal cross section so that the wall thickness is minimum at the longitudinally central part of the portion 207 and continuously decreases in the opposite longitudinal directions from the thick-walled portions 204 toward the central part of the portion 207. The height H1 is substantially the same as the height of the bumper of a small-sized vehicle, and the height H2 is substantially the same as the height of the bumper of a large-sized vehicle. The transverse cross sectional shape of the reinforcement 208 at its outer surface is substantially the same as the generally trapezoid shape of the inner surface of the hollow structure consisting of the panels 192a, 192b. The reinforcement 208 is disposed within the hollow structure 192a, 192b such that the outer surface of the reinforcement 208 is in substantially close contact with the outer surface of the hollow structure 192a, 192b. The reinforcement 208 is formed of a metal having a relatively low specific gravity and a relatively high tensile strength, for instance, an aluminum alloy A5056, JIS. The reinforcement 208 may be fabricated in a process similar to that which has been described above by reference to FIG. 14. The reinforcement 208 is fixedly disposed within the U-shaped opening of the main panel 192a, and the reinforcing panel 192b is welded to the main panel 192a and the reinforcement 208.

With the center pillar 192 provided with the reinforcement 208, the thick-walled portion 204 located at the height H1 which is substantially the same as the height of a small-sized vehicle is effective to absorb an impact load upon collision of the center pillar 192 with the bumper of the small-sized vehicle, while the thick-walled portion 204 located at the height H2 which is substantially the same as the height of the bumper of a large-sized vehicle is effective to absorb an impact load upon collision of the center pillar 192 with the bumper of the large-sized vehicle. Thus, the center pillar 192 has a sufficient high buckling resistance. Further, the provision of the upper and lower decreasing-thickness portions 206 is effective to prevent stress concentration around the ends of the reinforcement 208, permitting the center pillar 192 to be protected from breakage or fracture near the load application points, while minimizing amounts of increase in the weight and cost of the center pillar 192 due to the use of the reinforcement 208. An impact load test on the center pillar 192 shows an approximately two-fold increase of the maximum load of the center pillar 192 as compared with that of a conventional center pillar, and a two- to three-fold increase of the energy absorption amount of the center pillar 192 as compared with that of the conventional center pillar.

Figure 37A:
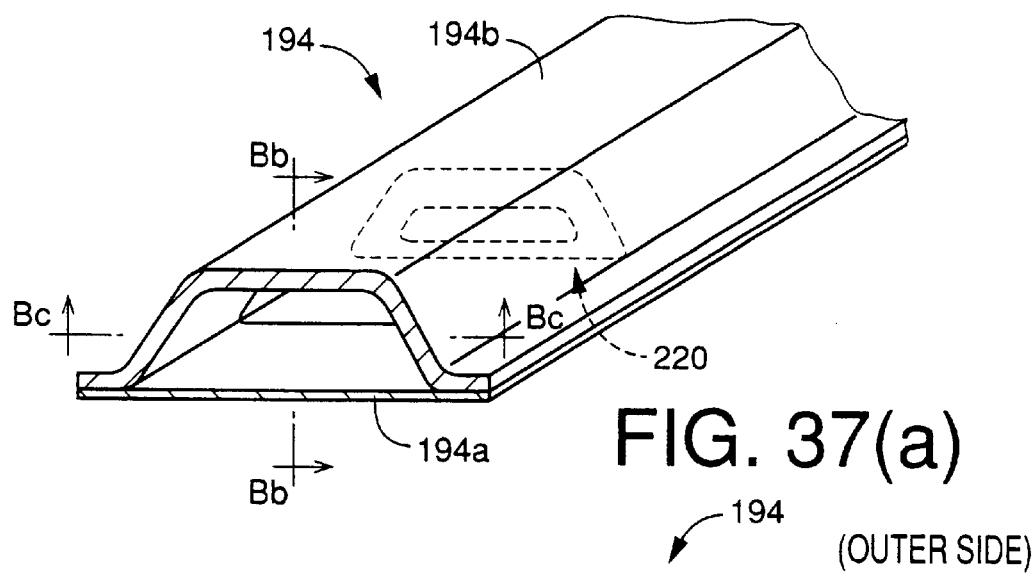
FIG. 37(a) is a perspective view of a side door waist of the structure of FIG. 35, showing a transverse cross sectional shape of the side door waist.
Figure 37B:
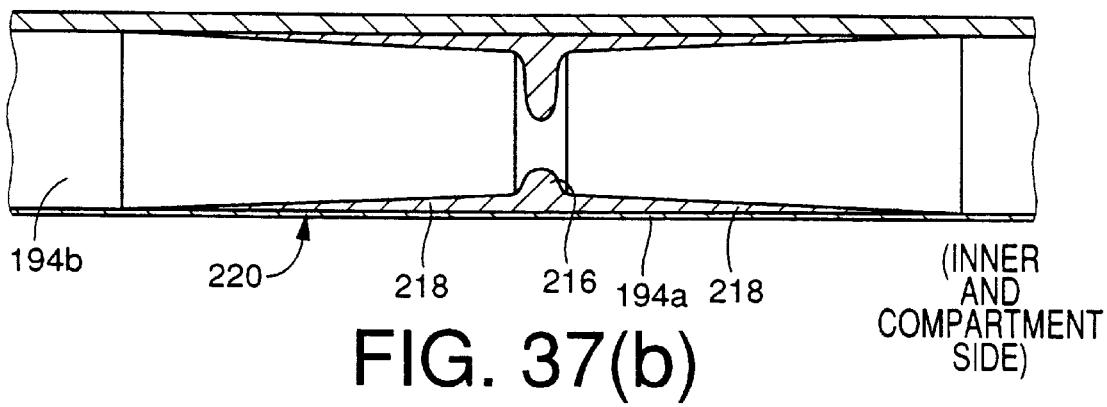
FIGS. 37(b) and 37(c) are cross sectional views taken alone line Bb—Bb and line Bc—Bc of FIG. 36(a)
Figure 37C:
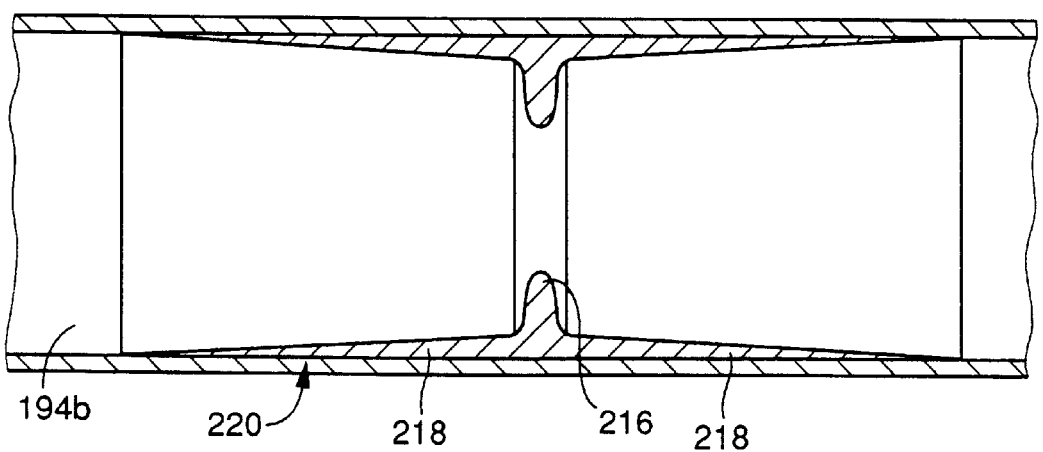

FIG. 37(*a*) is a perspective view of the side door waist 194, showing a transverse cross sectional shape of the side door waist 194 taken in a plane perpendicular to the longitudinal direction of the side door waist 194. FIGS. 37(*b*) and 37(*c*) are cross sectional views of the side door waists 194 taken along lines Bb—Bb and Bc—Bc of FIG. 37(*a*). The side door waist 194, which is constructed according to a thirteenth embodiment of this invention, includes a straight main panel 194*a*, and a reinforcing panel 194*b* which has a slightly larger thickness than the main panel 194*a* and which is bent so as to cooperate with the main panel 194*a* to define a hollow structure having a generally trapezoid shape in transverse cross section. The reinforcing panel 194*b* is secured at its widthwise ends to the main panel 194*a*. The side door waist 194 is disposed on the vehicle such that the reinforcing panel 194*b* is located on the laterally outer side of the vehicle. The side door waist 194 further includes a reinforcement 220 fixedly disposed in a longitudinally central portion thereof. The reinforcement 220 is a hollow structure whose outer surface has a substantially trapezoid shape in transverse cross section, which is substantially the same as the transverse cross sectional shape of the inner surface of the hollow structure consisting of the panels 194*a*, 194*b*. The reinforcement 220 is forced into the hollow structure 194*a*, 194*b* through one of its opposite open ends, and is held in position such that the outer surface of the reinforcement 220 is in substantially close contact with the inner surface of the hollow structure 194*a*, 194*b*.

The reinforcement 220 includes a thick-walled portion 216 as a longitudinally central portion thereof, which extends inwardly of the reinforcement 220. The reinforcement 220 further includes decreasing-thickness portions 218 formed on the opposite sides of the thick-walled portion 216. The decreasing-thickness portions 218 have inner surfaces formed such that the wall thickness of each portion 218 linearly decreases in the longitudinal direction from the thick-walled portion 216 toward the corresponding end of the reinforcement 220, at which the wall thickness is substantially zero. As indicated in FIG. 37(*b*), the amount of inward extension of the thick-walled portion 216 is larger on the laterally outer side of the vehicle 190, namely, at the upper portion of the reinforcement 220 as seen in FIG. 37(*b*), than on the laterally inner side of the vehicle 190, namely at the lower portion of the reinforcement 220 as seen in FIG. 37(*b*). This reinforcement 220 is also formed of a metal having a relatively low specific gravity and a relatively high tensile strength, for instance, an aluminum alloy A5056, JIS. The length of the reinforcement 220 is suitably determined depending upon the specifications of the vehicle. The thick-walled portion 216 may be a solid partition wall which completely separates the interior space of the reinforcement 220 into two sections.

The thick-walled portion 216 is effective to increase the buckling resistance of the side door waist 194, while the decreasing-thickness portions 218 are effective to prevent stress concentration near the ends of the reinforcement 220, so that the breakage or fracture strength of the side door waist 194 upon load application to its central portion is remarkably increased, while the amounts of increase in the weight and cost of the side door waist 194 due to the provision of the reinforcement 220 are minimized. An impact load test on the side door waist 194 shows an approximately two-fold increase of the maximum load of the center pillar 192 as compared with that of a conventional side door waist, and a two- to three-fold increase of the energy absorption amount of the side door waist 194 as compared with that of the conventional side door waist.

Figure 38A:
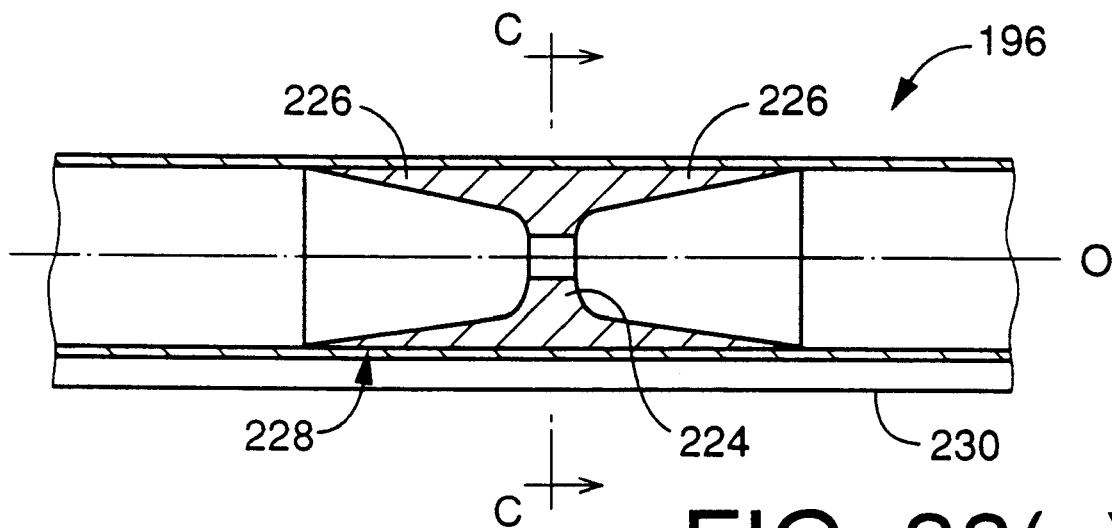
FIG. 38(a) is a longitudinal cross sectional view of a side sill of the structure of FIG. 35, the view being taken in a plane including a centerline of the side sill.
Figure 38B:
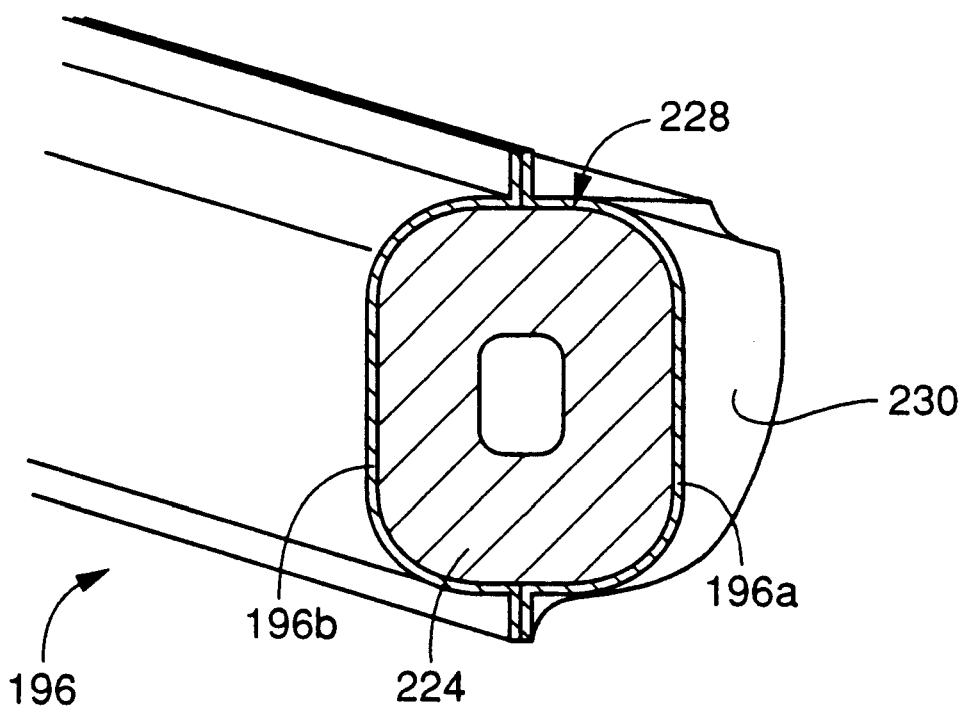
FIG. 38(b) is a perspective view of the side sill of FIG. 38(a), showing a transverse cross sectional shape of the side sill.

FIG. 38(*a*) is a longitudinal cross sectional view of the side sill 196 taken in a plane including the centerline O of the side sill 196, while FIG. 38(*b*) is a cross sectional view of the side sill 196 taken along line C—C of FIG. 38(*a*). The side sill 196, which is constructed according to a fourteenth embodiment of this invention, includes a main panel 196*a* and a reinforcing panel 196*b* which are welded or otherwise fixed together so as to constitute a generally tubular structure. The main panel 196*a* is formed integrally with the center pillar 192 (main panel 192*a*) and has a generally semi-circular transverse cross sectional shape. The reinforcing panel 196*b* also has a generally semi-circular transverse cross sectional shape. To the laterally outer side of the side sill 196, there is fixed a rocker panel 230 by spot welding, for example.

The side sill 196 further includes a reinforcement 228 fixedly disposed within a portion thereof which intersects the center pillar 192 and to which a floor cross member is welded. The reinforcement 228 is a tubular structure having a generally circular transverse cross sectional shape which is substantially the same as the transverse cross sectional shape of the inner surface of the generally tubular structure 194*a*, 194*b*. The reinforcement 228 is disposed such that the outer surface of the reinforcement 228 is in substantially close contact with the inner surface of the tubular structure 194*a*, 194*b*. The reinforcement 228 includes a thick-walled portion 224 as a longitudinally central portion thereof, which extends inwardly of the reinforcement 228 and which has a center through-hole. The reinforcement 228 further includes decreasing-thickness portions 226 formed on the opposite sides of the thick-walled portion 224. The decreasing-thickness portions 226 have inner surfaces formed such that the wall thickness of each portion 226 linearly decreases in the longitudinal direction from the thick-walled portion 224 toward the corresponding end of the reinforcement 228, at which the wall thickness is substantially zero. This reinforcement 220 is formed of a light metal having a relatively low specific gravity and a relatively high rigidity. The thick-walled portion 224 may be a solid partition wall which completely separates the interior space of the reinforcement 228 into two sections. The position at which the reinforcement 228 is disposed in the hollow structure 196*a*, 196*b* may be suitably selected.

The thick-walled portion 224 is effective to increase the buckling resistance of the side sill 196, while the decreasing-thickness portions 226 are effective to prevent stress concentration near the ends of the reinforcement 228, so that the side sill 196 is capable of effectively absorbing an impact energy upon collision of the side sill 196, and is effectively protected against breakage or excessive deformation near the point of application of an impact load, while the amounts of increase in the weight and cost of the side sill 196 due to the provision of the reinforcement 228 are minimized. The weight of the side sill 196 can be reduced by 20–30% of the weight of a conventional side sill which is locally reinforced by a double-panel structure.

FIG. 39(a) is a perspective view showing a structural arrangement of the vehicle 190 including one of the right and left front pillars 198, while FIGS. 39(b) and 39(c) are cross sectional views taken along line Db—Db and line Dc—Dc of FIG. 39(a). Each front pillar 198 includes a first panel 198a and a second panel 198b which are welded or otherwise fixed together so as to constitute a hollow structure having a rectangular transverse cross sectional shape, as shown in FIG. 39(c). The first panel 198a is U-shaped in transverse cross section and is located on the laterally outer side of the vehicle 190, while the second panel 198b is a straight panel located on the laterally inner side of the vehicle 190. The front pillar 198 is bent at a relatively low position such that the lower portion extends substantially vertically. The front pillar 198 shown is connected at its bent portion to the bent portion of the other front pillar (not shown) by an instrument panel reinforcing beam 240.

The front pillar 198 includes a reinforcement 238 disposed within the bent portion. The reinforcement 238 is a hollow structure whose outer surface has a generally rectangular transverse cross sectional shape which is substantially the same as the transverse cross sectional shape of the inner surface of the hollow structure 198a, 198b. The reinforcement 238 is disposed in the hollow structure 198a 198b such that the outer surface of the reinforcement 238 is in substantially close contact with the inner surface of the hollow structure 198a, 198b. The reinforcement 238 includes a thick-walled portion in the form of a partition wall 234 formed at a longitudinal central portion thereof, and a pair of decreasing-thickness portions 236 formed on the opposite sides of the partition wall 234. Each decreasing-thickness portion 236 has an inner surface which is formed such that the wall thickness of the portion 236 linearly decreases in the longitudinal direction from the partition wall 234 toward the corresponding end of the reinforcement 238, at which the wall thickness is substantially zero. The reinforcement 238 is formed of a light metal alloy having a relatively low specific gravity and a relatively high rigidity, for example, an aluminum alloy A5056, JIS.

The bent portion of each of the right and left front pillar 198 is subjected to an impact load transferred through the instrument panel reinforcing beam 240 upon collision of either one of the front pillars. In this event, however, the reinforcement 238 disposed in the bent portion of the front pillar 198 is effective to prevent breakage of the front pillar 198. In particular, the thick-walled portion in the form of the partition wall 234 gives the bent portion of the front pillar 198 an increased buckling resistance, while the decreasing-thickness portions 234 is effective to prevent stress concentration near the ends of the reinforcement 238, so that the front pillar 198 is capable of effectively absorbing an impact energy upon collision of the front pillar 198, and is effectively protected against breakage or excessive deformation near the point of application of an impact load, while the amounts of increase in the weight and cost of the front pillar 198 due to the provision of the reinforcement 238 are minimized. The weight of the front pillar 198 can be reduced by 20–30% of the weight of a conventional front pillar of a double-panel or thick-panel structure.

Figure 40A:
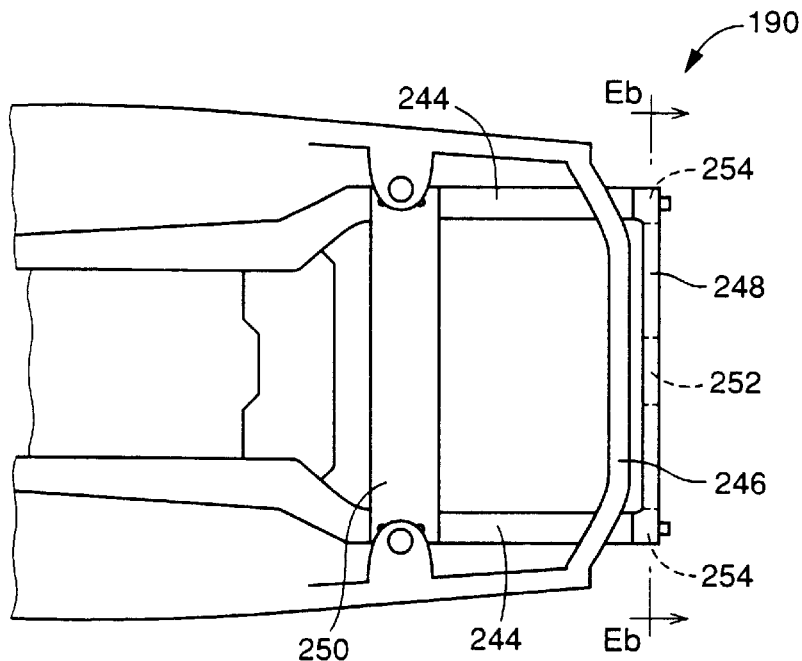
FIG. 40(a) is a front bottom portion of the structure of FIG. 35 including a front cross member.
Figure 40B:
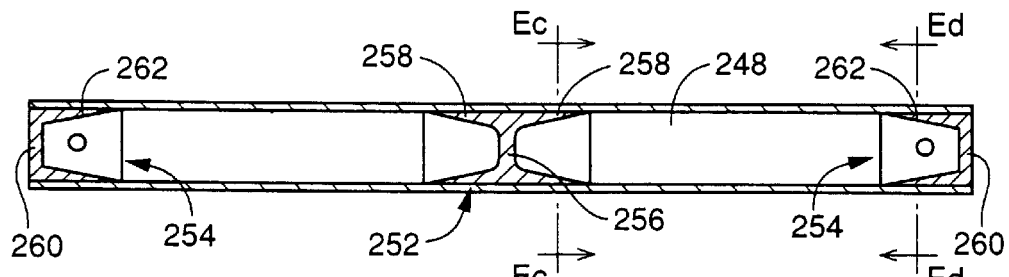
FIG. 40(b) is a cross sectional view taken along line Eb—Eb of FIG. 40(a)
Figures 40C, 40D:
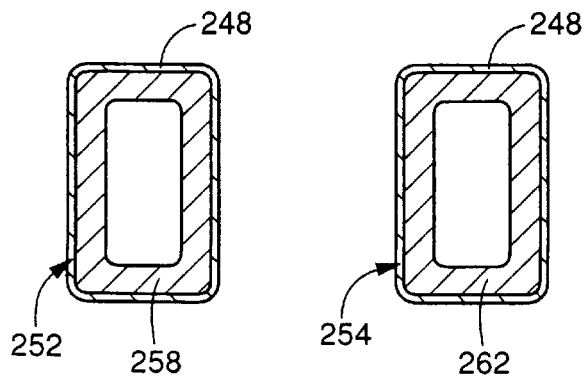
FIGS. 40(c) and 40(d) are cross sectional views taken along line Ec—Ec and Ed—Ed of FIG. 40(b), respectively.

FIG. 40(a) is a view of a structural arrangement at a front part of the vehicle 190, and FIG. 40(b) is a cross sectional view taken along line Eb—Eb of FIG. 40(a), while FIGS. 40(c) and 40(d) are cross sectional views taken along line Ec—Ec and line Ed—Ed of FIG. 40(b). The structural arrangement includes a pair of front side members 244 which are disposed in parallel with each other so as to extend in the longitudinal or running direction of the vehicle 190. These two front side members 244 are connected at their front ends to each other by a tubular front cross member 248 which extends in the lateral direction of the vehicle 190, in front of a front upper side frame 246 which also extends in the lateral direction. Upon collision of the vehicle 190 at its front end and at a lateral position which is offset or spaced from the lateral center point in the right or left direction, an impact load is distributed through the front cross member 248 to the right and left front side members 244. The front side members 244 are connected to each other to each other, also at their middle portions, by a plate-like suspension member 250 extending in the lateral direction of the vehicle 190.

The front cross member 248 includes an intermediate reinforcement 252 disposed at a longitudinally central portion thereof, and a pair of end reinforcements 254 disposed at opposite end portions thereof. The center reinforcement 252 is a hollow member whose outer surface has a generally rectangular transverse cross sectional shape which is substantially the same as the cross sectional shape of the inner surface of the front cross member 248. The center reinforcement 252 is disposed in the front cross member 248 such that the outer surface of the reinforcement 252 is in substantially close contact with the inner surface of the front cross member 248. The center reinforcement 252 includes a thick-walled portion in the form of a partition wall 256, and a pair of decreasing-thickness portions 258 each of which has an inner surface formed such that the wall thickness linearly decreases in the longitudinal direction from the partition wall 256 toward the corresponding end of the reinforcement 252, at which the wall thickness is substantially zero. The center reinforcement 252 is formed of a light metal having a relatively low specific gravity and a relatively high rigidity, for example, an aluminum alloy A5056, JIS.

On the other hand, each of the end reinforcement 254 is a hollow member whose outer surface has a generally rectangular transverse cross sectional shape which is substantially the same as the transverse cross sectional shape of the inner surface of the front cross member 248. The end reinforcement 254 includes a bottom portion 260 which closes one open end of the above-indicated hollow member and which is located at the corresponding end of the front cross member 248. The end reinforcement 254 further includes a decreasing-thickness portion 262 having an inner surface formed such that the wall thickness linearly decreases in the longitudinal direction of the front cross member 248, from the bottom portion 260 toward the open end of the end reinforcement 254, at which the wall thickness is substantially zero. The end reinforcement 254 is also formed of a light metal having a relatively low specific gravity and a relatively high rigidity, for example, an aluminum alloy A5056, JIS. The front cross member 248 is fixed to the front side members 244, at its end portions in which the end reinforcements 254 are disposed.

The thick-walled portion in the form of the partition wall 256 gives the center reinforcement 252 an increased buckling resistance, while the decreasing-thickness portions 258 are effective to prevent stress concentration near the ends of the reinforcement 256, so that the front cross member 248 is capable of effectively absorbing an impact energy upon collision of the front cross member 248, and is effectively protected against breakage or excessive deformation near at its longitudinal central portion, while the amounts of increase in the weight and cost of the front cross member 248 due to the provision of the center reinforcement 252 are minimized. The end reinforcements 254 are effective to increase the buckling resistance and prevent stress concentration near the open ends of the end reinforcements 254, so as to prevent the breakage or excessive deformation of the front cross member 248 at its end portions and consequent reduction in its impact energy absorbing capability, while the amounts of increase in the weight and cost of the front cross member 248 due to the provision of the end reinforcements 254 are minimized. The weights of the front cross member 248 provided with the center and end reinforcements 252, 254 can be reduced by 20–30% of the weight of a conventional front cross member 248 of a double-panel or thick-panel structure.

Figure 41A:
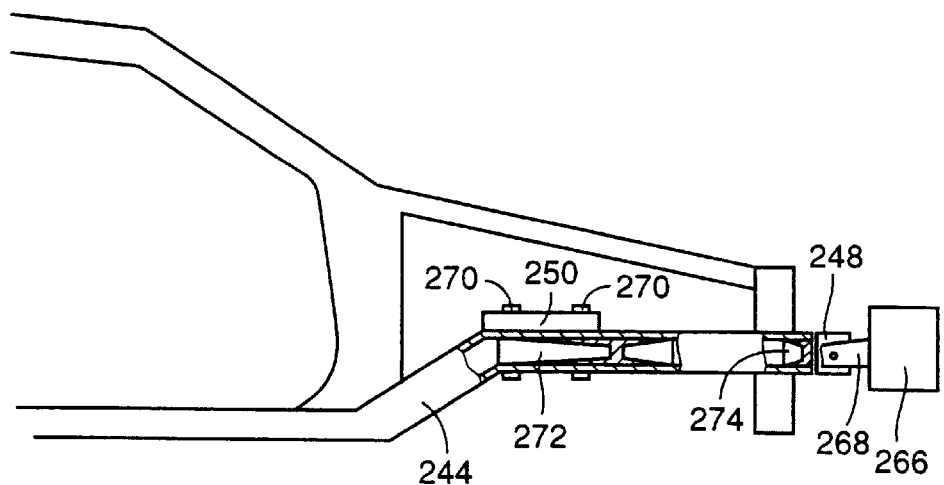
FIG. 41(a) is a view of a front portion of the structure of FIG. 35 including a front side member.
Figure 41B:
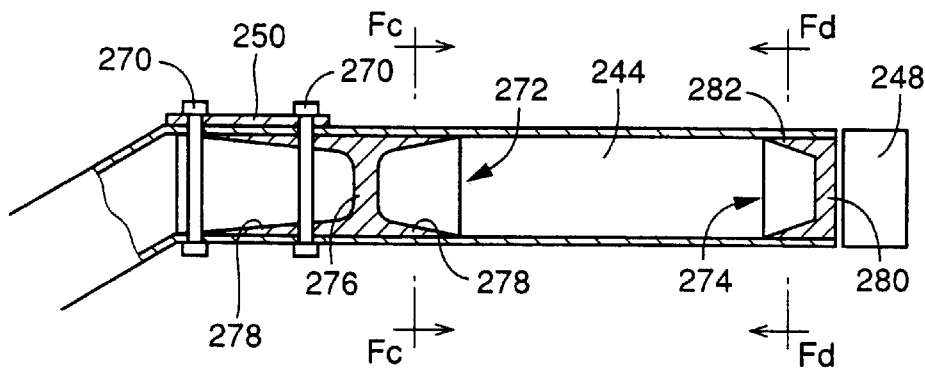
FIG. 41(b) is a fragmentary view showing on an enlarged scale a part of the front portion of FIG. 41(a)
Figure 41C:
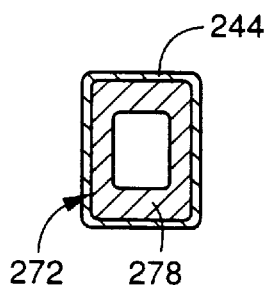
FIGS. 41(c) and 41(d) are cross sectional views taken along line Fc—Fc and line Fd—Fd of FIG. 41(b)
Figure 41D:
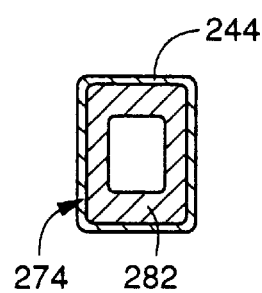

FIG. 41(a) is a view of the front side member 244 partly in longitudinal cross section, and FIG. 41(b) is an enlarged view of the front side member 244, while FIGS. 41(c) and 41(d) are cross sectional views taken along line Fc—Fc and Fd—Fd of FIG. 40(b). The front side member 244 has a rectangular transverse cross sectional shape as shown in FIGS. 40(c) and 40(d), having an upper wall to which the plate-like suspension member 250 is fastened by bolts 270. The front side member 244 (each of the right and left front side members 244) has a bumper stay 268 bolted or otherwise fixed to its front end, at the corresponding end of the front cross member 248, such that the bumper stay 268 extends frontward so as to support a bumper 266.

The front side member 244 includes an intermediate reinforcement 272 disposed in a portion thereof to which the suspension member 250 is fixed, and an end reinforcement 274 disposed in the front end portion. The reinforcement 272 is a hollow member whose outer surface has a generally rectangular transverse cross sectional shape which is substantially the same as the transverse cross sectional shape of the inner surface of the front side member 244. The reinforcement 272 is disposed in the front side member 244 such that the outer surface of the reinforcement 272 is in substantially close contact with the inner surface of the front side member 244. The reinforcement 272 includes a thick-walled portion in the form of a partition wall 276 located a small distance in front of the suspension member 250, and two decreasing-thickness portions 278 on the opposite sides of the partition wall 276. Each of the decreasing-thickness portions 278 has an inner surface formed such that the wall thickness linearly decreases in the longitudinal direction of the front side member 244, from the partition wall 276 toward the corresponding end of the reinforcement 272. The two reinforcements 278 are asymmetric with respect to the partition wall 276. Namely, the front decreasing-thickness portion 278 has a smaller length than the rear decreasing-thickness portion 278. The reinforcement 272 is formed of a light alloy having a relatively low specific gravity and a relatively high rigidity, for example, an aluminum alloy A5056, JIS.

The end reinforcement 274 is a hollow structure whose outer surface has a generally rectangular transverse cross sectional shape which is substantially the same as the transverse cross sectional shape of the inner surface of the front side member 244. The end reinforcement 274 is disposed in the front side member 244 such that the outer surface of the end reinforcement 274 is in substantially close contact with the inner surface of the front side member 244. The end reinforcement 274 includes a bottom portion 280 which closes one of opposite ends of the above-indicated hollow structure and is located at the front end of the front side member 244. The end reinforcement 274 further includes a decreasing-thickness portion 282 whose inner surface is formed such that the wall thickness linearly decreases in the longitudinal direction of the front side member 244, from the bottom portion 280 toward the open end of the end reinforcement 274, at which the wall thickness is substantially zero. The end reinforcement 274 is also formed of a light alloy having a relatively low specific gravity and a relatively high rigidity, for example, an aluminum alloy A5056, JIS.

Conventional front side members are relatively likely to suffer from stress concentration at their portions right in front of their portions connected to the suspension member 250 and consequent bending deformation at those stress-concentrated portions, upon collision of the front side members in a direction at some angle with respect to the longitudinal direction of the vehicle 190, or upon collision of the bumper 266 at a position which is spaced some distance from the longitudinal center point of the bumper 266. However, the present front side member 244 provided with the reinforcement 272 disposed in its portion to which the suspension member 250 is fixed is protected against the bending deformation in the event of the collision indicated above. In particular, the thick-walled portion in the form of the partition wall 276 is effective to give the reinforcement 272 an increased buckling resistance, while the decreasing-thickness portions 276 is effective to prevent stress concentration near the ends of the reinforcement 272, so that the front side member 244 is protected against the bending deformation at its portion right in front of the portion connected to the suspension member 250, while the amounts of increase of the weight and cost of the front side member 244 due to the provision of the reinforcement 272 are minimized. Further, the end reinforcement 274 is also effective to increase the buckling resistance and prevent the stress concentration near the ends of the reinforcement 274, so that the front side member 244 is protected against breakage or bending deformation at its front end portion, while the amounts of increase in the weight and cost due to the provision of the end reinforcement 274 are minimized. The end reinforcement 274 cooperates with the reinforcement 272 to assure increased stability of impact energy absorption. The weight of the front side member 244 provided with the reinforcements 272, 274 can be reduced by about 20–30% of the weight of the conventional front side member of a double-panel or thick-panel structure.

Figure 42A:
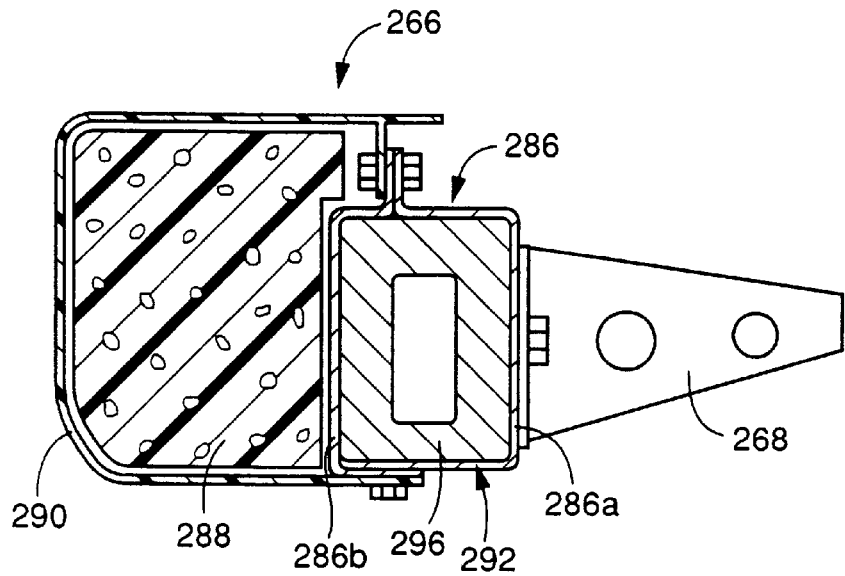
FIG. 42(a) is a transverse cross sectional view of a bumper including a bumper reinforcing beam.
Figure 42B:
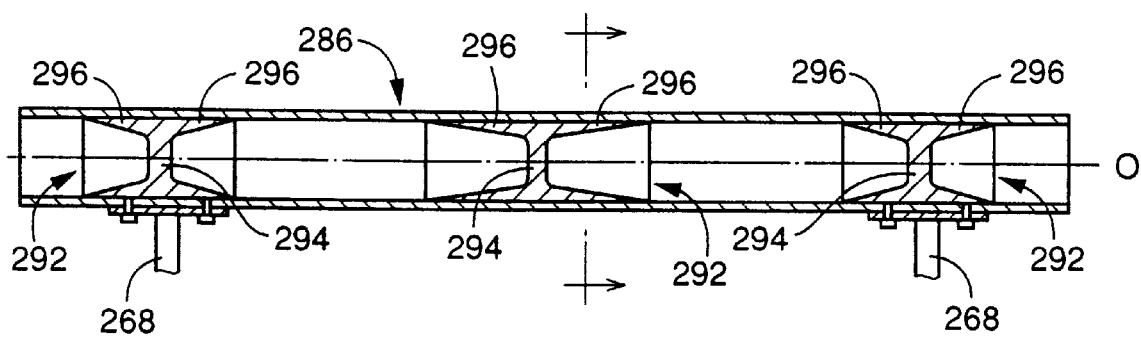
FIG. 42(b) is a longitudinal cross sectional view of the bumper of FIG. 42(a), taken in a plane including a centerline O of the bumper reinforcing beam.

FIG. 42(a) is a transverse cross sectional view of the bumper 266 taken in a plane perpendicular to the longitudinal direction of the bumper 266, while FIG. 42(b) is a longitudinal cross sectional view of a bumper reinforcing beam 286 taken in a plane including the centerline O of the beam 286. The bumper 266 includes the bumper reinforcing beam 382 of a hollow structure extending in the lateral direction of the vehicle 190, and a buffer 288 formed of urethane foam, for example, which is disposed in front of the beam 382. The bumper reinforcing beam 286 includes a pair of U-shaped panels 286a, 286b which are butted and bolted together so as to form a hollow structure having a generally rectangular transverse cross sectional shape. The beam 286 further includes three reinforcements 292 disposed within the hollow structure 286a, 286b. The pair of bumper stays 268 are bolted to the longitudinal opposite end portions of the bumper 266, so as to extend in the backward direction of the vehicle 190.

Each reinforcement 292 is a hollow structure whose inner surface has a generally rectangular transverse cross sectional shape which is substantially the same as the transverse cross sectional shape of the inner surface of the hollow structure 286a, 286b. The reinforcement 292 is disposed in the hollow structure 286a, 286b such that the outer surface of the reinforcement 292 is in substantially close contact with the inner surface of the hollow structure 286a, 286b. The reinforcement 292 has a thick-walled portion in the form of a partition wall 294 as a longitudinally central portion thereof, and two decreasing-thickness portions 296 on the opposite sides of the partition wall 294. Each decreasing-thickness portion 296 has an inner surface which is formed such that the wall thickness linearly decreases in the longitudinal direction from the partition wall 294 toward the corresponding end of the reinforcement 292, at which the wall thickness is substantially zero. The reinforcement 292 is formed of a light alloy having a relatively low specific gravity and a relatively high rigidity, for example, an aluminum alloy A5056, JIS. One of the three reinforcements 292 is located at a longitudinally central portion of the bumper reinforcing beam 286, and the other two reinforcements 292 are located at the opposite end portions of the beam 286 to which the bumper stays 278 are fixed. The central reinforcement 292 has a length slightly larger than those of the end reinforcements 292.

The thick-walled portion in the form of the partition wall 294 is effective to give the reinforcement 292 an increased buckling resistance, while the decreasing-thickness portions 296 are effective to prevent stress concentration around the opposite ends of the reinforcement 292, so that the beam 268 is capable of effectively absorbing an impact energy and is protected against excessive deformation or breakage, while the amounts of increase in the weight and cost of the beam 286 due to the provision of the reinforcement 292 are minimized. The weight of the beam 286 including the reinforcements 292 can be reduced by 30% or more of the weight of a conventional bumper reinforcing beam 286 of a double-panel or thick-panel structure.

While the presently preferred embodiments of this invention have been described in detail by reference to the accompanying drawings, for illustrative purpose only, it is to be understood that the invention may be otherwise embodied with various changes, modifications and improvements, which may occur to those skilled in the art. For instance, the structural members according to the embodiments of FIGS. 35–42 may employ a reinforcement or reinforcements as described above with respect to the impact beams for vehicle side doors, by reference to FIGS. 1–34. Further, the dimensions and materials of the structural members and the reinforcements may be suitably changed as needed.

What is claimed is:

1. A hollow structural member comprising a hollow body portion adapted to be fixedly disposed on a motor vehicle, said hollow structural member further comprising:

a reinforcement having a hollow structure which has an outer surface and which is fixedly disposed within said hollow body portion having an inner surface such that said outer surface of said hollow structure is in substantially close contact with said inner surface of said hollow body portion, and wherein said reinforcement includes a thick-walled portion located at a longitudinal central portion thereof, and two decreasing-thickness portions located at longitudinally opposite end portions thereof disposed on opposite sides of said thick-walled portion, each of said two decreasing-thickness portions having an inner surface which is formed such that a wall thickness of said each decreasing-thickness portion continuously decreases in a longitudinal direction from said thick-walled portion toward a longitudinal end of a corresponding one of said longitudinally opposite end portions and such that said wall thickness at said longitudinal end is substantially zero, and wherein said thick-walled portion comprises at least one solid partition wall which separates a space within said hollow structure of said reinforcement into two longitudinal sections.

2. A hollow structural member according to claim 1, wherein said hollow body portion has a substantially tubular structure, and wherein said reinforcement has a substantially tubular structure having an outer surface in substantially close contact with an inner surface of said substantially tubular structure of said hollow body portion, and wherein each said decreasing-thickness portion has an inside diameter which increases in said longitudinal direction from said thick-walled portion toward said longitudinal end, so that said wall thickness of each said decreasing-thickness portion linearly decreases in said longitudinal direction.

3. A hollow structural member according to claim 1, wherein said thick-walled portion has a wall thickness which non-linearly changes according to a stress distribution on said hollow body portion when said hollow body portion is subject to an impact load upon collision of said motor vehicle.

4. A hollow structural member according to claim 2, wherein said at least one solid partition wall has opposite partially-spherical surfaces each of which has a curvature having a center lying on a centerline of said generally tubular structure of each said reinforcement, said each partially-spherical surface being smoothly contiguous with the inner surfaces of said two decreasing-thickness portions.

5. A hollow structural member according to claim 1, wherein said reinforcement further includes two constant-thickness portions formed between said solid partition wall and said two decreasing-thickness portions, each said constant-thickness portion having a constant wall thickness and cooperating with said solid partition wall to define therebetween a fillet having a predetermined radius of curvature.

6. A hollow structural member according to claim 1, wherein said reinforcement is formed as an integral part of said hollow body portion.

7. A hollow structural member according to claim 1, which is an impact beam fixedly disposed in a side door of said vehicle, so as to extend in a running direction of said vehicle.

8. A hollow structural member according to claim 1, which is one of a center pillar, a side door waist, a side sill, a front pillar, a front cross member, a front side member and a bumper reinforcing beam of said motor vehicle.

9. A reinforcement fixedly disposed in a hollow structural member including a hollow body portion adapted to be fixedly disposed on a motor vehicle, said reinforcement having a hollow structure which has an outer surface and which is fixedly disposed within said hollow body portion such that said outer surface of said hollow structure is in substantially close contact with an inner surface of said hollow body portion, said reinforcement comprising:

a thick-walled portion located at a longitudinal central portion thereof; and two decreasing-thickness portions located at longitudinally opposite end portions thereof disposed on opposite sides of said thick-walled portion, each of said two decreasing-thickness portions having an inner surface which is formed such that a wall thickness of said each decreasing-thickness portion continuously decreases in a longitudinal direction from said thick-walled portion toward a longitudinal end of a corresponding one of said longitudinally opposite end portions and such that said wall thickness at said longitudinal end is substantially zero.

10. A reinforcement according to claim 9, comprising:
a first piece constituting a first part of said thick-walled portion and including a first and a second engaging portion at longitudinally opposite ends thereof;
a second piece including one of said two decreasing-thickness portions and constituting a second part of said thick-walled portion which is adjacent to said one of said two decreasing-thickness portions, said second piece including an engaging end portion which is remote from said one of said two decreasing-thickness portions and which engages said second engaging portion of said first piece; and
a third piece including the other of said two decreasing-thickness portions and constituting a third part of said thick-walled portion which is adjacent to said other of said two decreasing-thickness portions, said third piece including an engaging end portion which is remote from said other of said two decreasing-thickness portions and which engages said first engaging portion of said first piece, said first, second and third parts constituting said thick-walled portion.

11. A reinforcement according to claim 9, wherein said hollow body portion has a generally tubular structure, and wherein said reinforcement has a generally tubular structure having an outer surface in substantially close contact with an inner surface of said generally tubular structure of said hollow body portion,
and wherein said thick-walled portion consists of at least one solid partition wall each of which separates a space within said generally tubular structure of said reinforcement into two longitudinal sections, and said each decreasing-thickness portion has an inside diameter which increases in said longitudinal direction from said thick-walled portion toward said longitudinal end, so that said wall thickness of said each decreasing-thickness portion linearly decreases in said longitudinal direction, said each solid partition wall having opposite part-spherical surfaces each of which has a curvature having a center lying on a centerline of said generally tubular structure of said each reinforcement, said each part-spherical surface being smoothly contiguous with said two decreasing-thickness portions, said reinforcement being manufactured in a process including a forging step of cold-forging a blank into a plate from which said reinforcement is formed.

12. A hollow structural member comprising a hollow body portion adapted to be fixedly disposed on a motor vehicle, said hollow structural member further comprising;
an intermediate reinforcement having a hollow structure which has an outer surface and which is fixedly disposed within a longitudinally intermediate portion of said hollow body portion having an inner surface such that said outer surface of said hollow structure is in substantially close contact with said inner surface of said hollow body portion; and
an end reinforcement having a hollow structure having an outer surface, and being disposed in at least one of longitudinally opposite end portions of said hollow body portion, such that said outer surface of said hollow structure is in substantially close contact with an inner surface of said hollow body portion,
and wherein said intermediate reinforcement includes a longitudinally central portion having a highest bending rigidity, and longitudinally opposite end portions each having bending rigidity which continuously decreases in a longitudinal direction from said longitudinally central portion toward a longitudinal end of a corresponding one of said longitudinally opposite end portions, such that the bending rigidity at said longitudinal end is substantially zero,
and wherein said end reinforcement includes a decreasing-thickness portion located at one of longitudinally opposite end portions thereof which is on the side of said longitudinally intermediate portion of said hollow body portion, said decreasing-thickness portion having an inner surface which is formed such that a wall thickness of said decreasing-thickness portion continuously decreases in a longitudinal direction from the other of said longitudinally opposite end portions toward said one of said longitudinally opposite end portions and such that said wall thickness of said end reinforcement is substantially zero at a longitudinal end of said one of said longitudinally opposite end portions of said decreasing-thickness portion.

13. A hollow structural member comprising a hollow body portion adapted to be fixedly disposed on a motor vehicle, said hollow structural member further comprising:
an intermediate reinforcement having a hollow structure which has an outer surface and which is fixedly disposed within a longitudinally intermediate portion of said hollow body portion having an inner surface such that said outer surface of said hollow structure is in substantially close contact with said inner surface of said hollow body portion; and
an end reinforcement having a hollow structure having an outer surface, and disposed in at least one of longitudinally opposite end portions of said hollow body portion, such that said outer surface of said hollow structure is in substantially close contact with an inner surface of said hollow body portion,
and wherein said intermediate reinforcement includes a thick-walled portion located at a longitudinal central portion thereof, and two decreasing-thickness portions located at longitudinally opposite end portions thereof disposed on opposite sides of said thick-walled portion, each of said two decreasing-thickness portions having an inner surface which is formed such that a wall thickness of said each decreasing-thickness portion continuously decreases in a longitudinal direction from said thick-walled portion toward a longitudinal end of a corresponding one of said longitudinally opposite end portions and such that said wall thickness at said longitudinal end is substantially zero,
and wherein said end reinforcement includes a decreasing-thickness portion located at one of longitudinally opposite end portions thereof which is on the side of said longitudinally intermediate portion of said hollow body portion, said decreasing-thickness portion having an inner surface which is formed such that a wall thickness of said decreasing-thickness portion continuously decreases in a longitudinal direction from the other of said longitudinally opposite end portions toward said one of said longitudinally opposite end portions and such that said wall thickness of said end reinforcement is substantially zero at a longitudinal end of said one of said longitudinally opposite end portions of said decreasing-thickness portion.

14. A hollow structural member comprising a hollow body portion, said hollow structural member further comprising;

a reinforcement having a hollow structure which has an outer surface and which is fixedly disposed within said hollow body portion having an inner surface such that said outer surface of said hollow structure is in substantially close contact with said inner surface of said hollow body portion, and wherein said reinforcement includes a thick-walled portion located at a longitudinal central portion thereof, and two decreasing-thickness portions located at longitudinally opposite end portions thereof disposed on opposite sides of said thick-walled portion, each of said two decreasing-thickness portions having an inner surface which is formed such that a wall thickness of said each decreasing-thickness portion continuously decreases in a longitudinal direction from said thick-walled portion toward a longitudinal end of a corresponding one of said longitudinally opposite end portions and such that said wall thickness at said longitudinal end is substantially zero, and wherein said thick-walled portion comprises at least one solid partition wall each of which separates a space within said hollow structure of said reinforcement into two longitudinal sections.

15. A reinforcement fixedly disposed in a hollow structural member including a hollow body portion, said reinforcement having a hollow structure which has an outer surface and which is fixedly disposed within said hollow body portion such that said outer surface of said hollow structure is in substantially close contact with an inner surface of said hollow body portion, said reinforcement comprising:

a thick-walled portion located at a longitudinal central portion thereof; and two decreasing-thickness portions located at longitudinally opposite end portions thereof disposed on opposite sides of said thick-walled portion, each of said two decreasing-thickness portion having an inner surface which is formed such that a wall thickness of said each decreasing-thickness portion continuously decreases in a longitudinal direction from said thick-walled portion toward a longitudinal end of a corresponding one of said longitudinally opposite end portions and such that said wall thickness at said longitudinal end is substantially zero.

* * * * *